Figure 21:
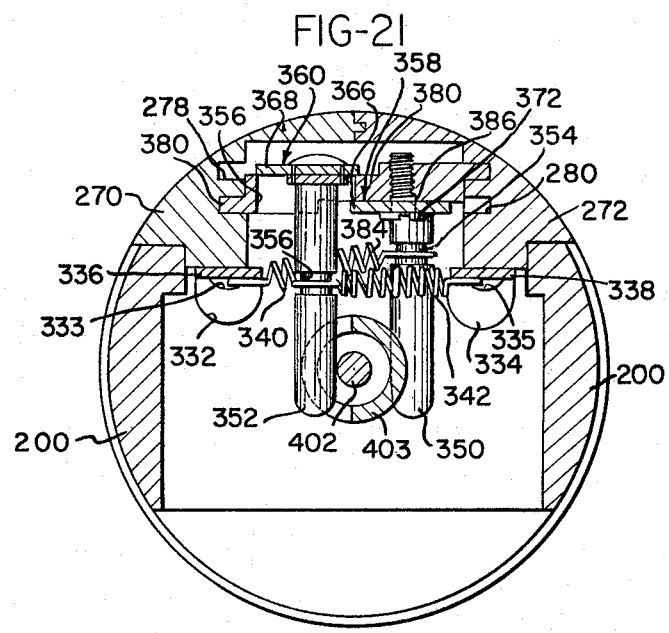

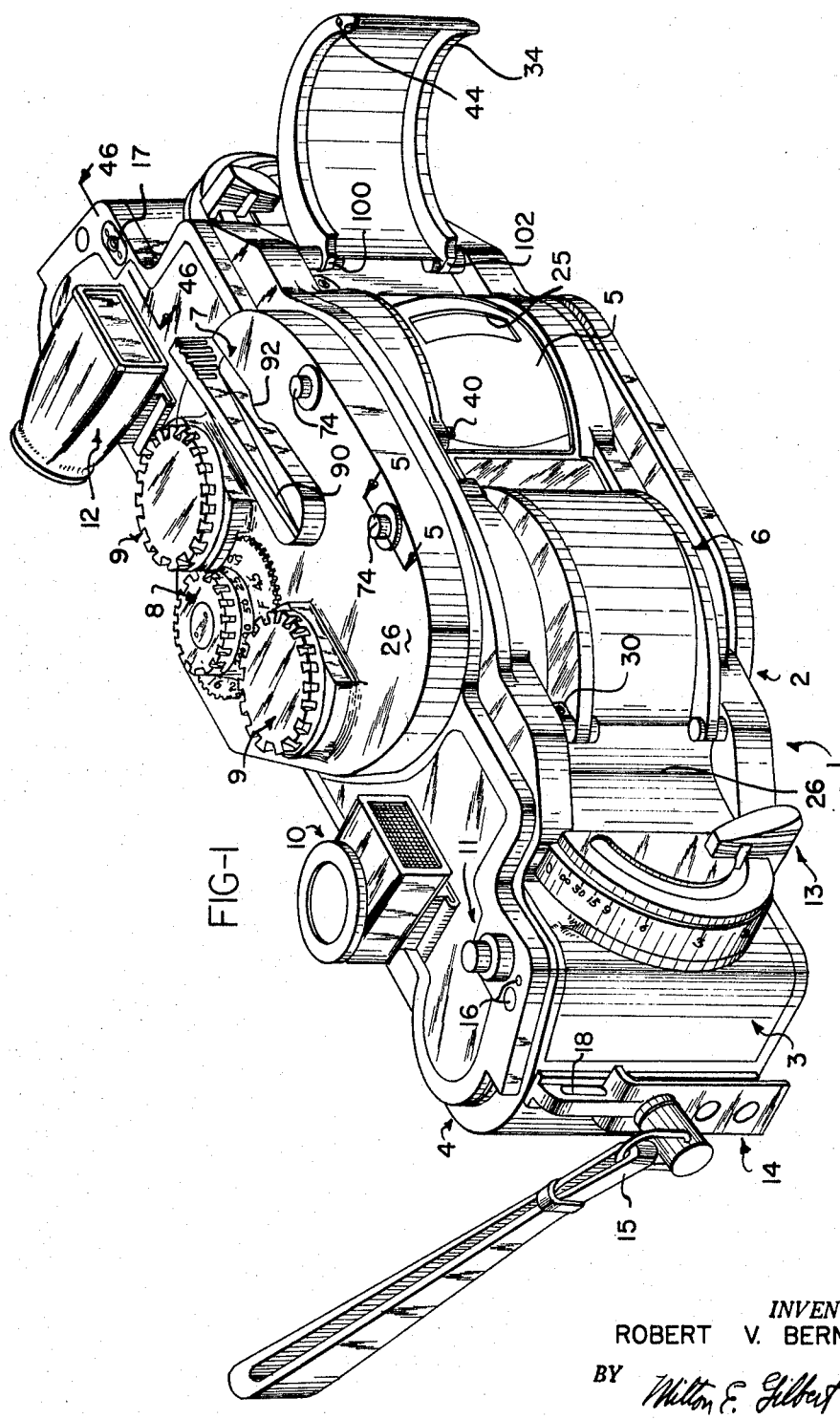

Aug. 30, 1966  R. V. BERNIER  3,269,291
STEREOSCOPIC CAMERA
Filed June 29, 1961  36 Sheets-Sheet 2
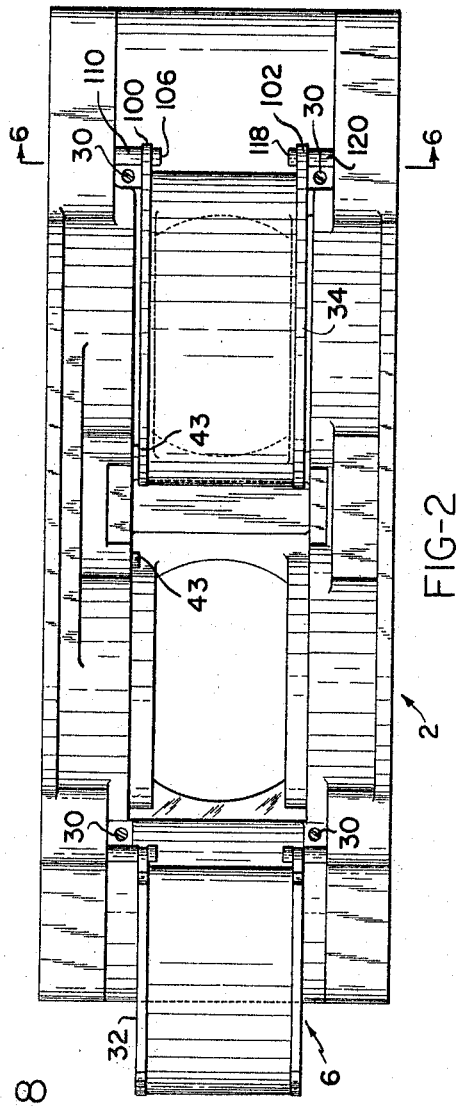
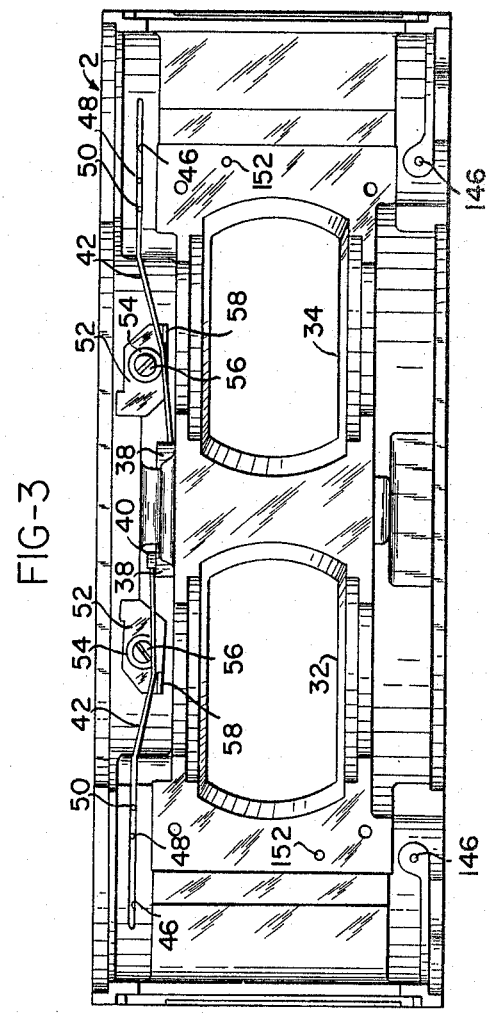
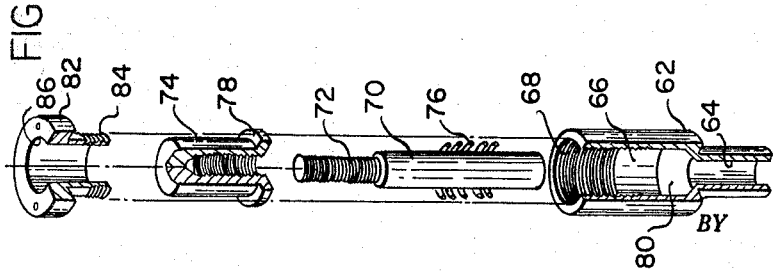
INVENTOR.
ROBERT V. BERNIER
BY
ATTORNEY

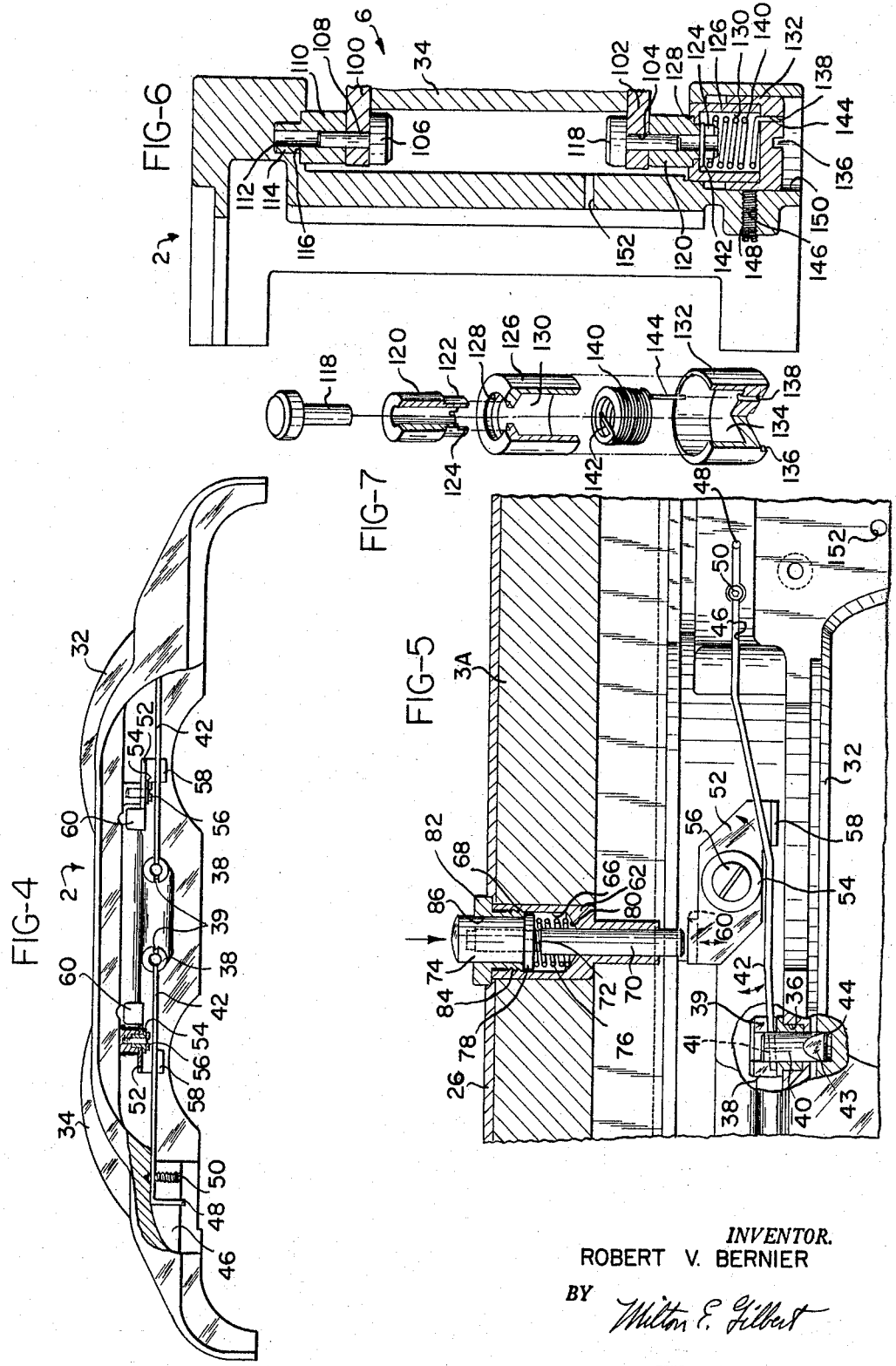

Aug. 30, 1966 R. V. BERNIER 3,269,291
STEREOSCOPIC CAMERA
Filed June 29, 1961 36 Sheets-Sheet 4
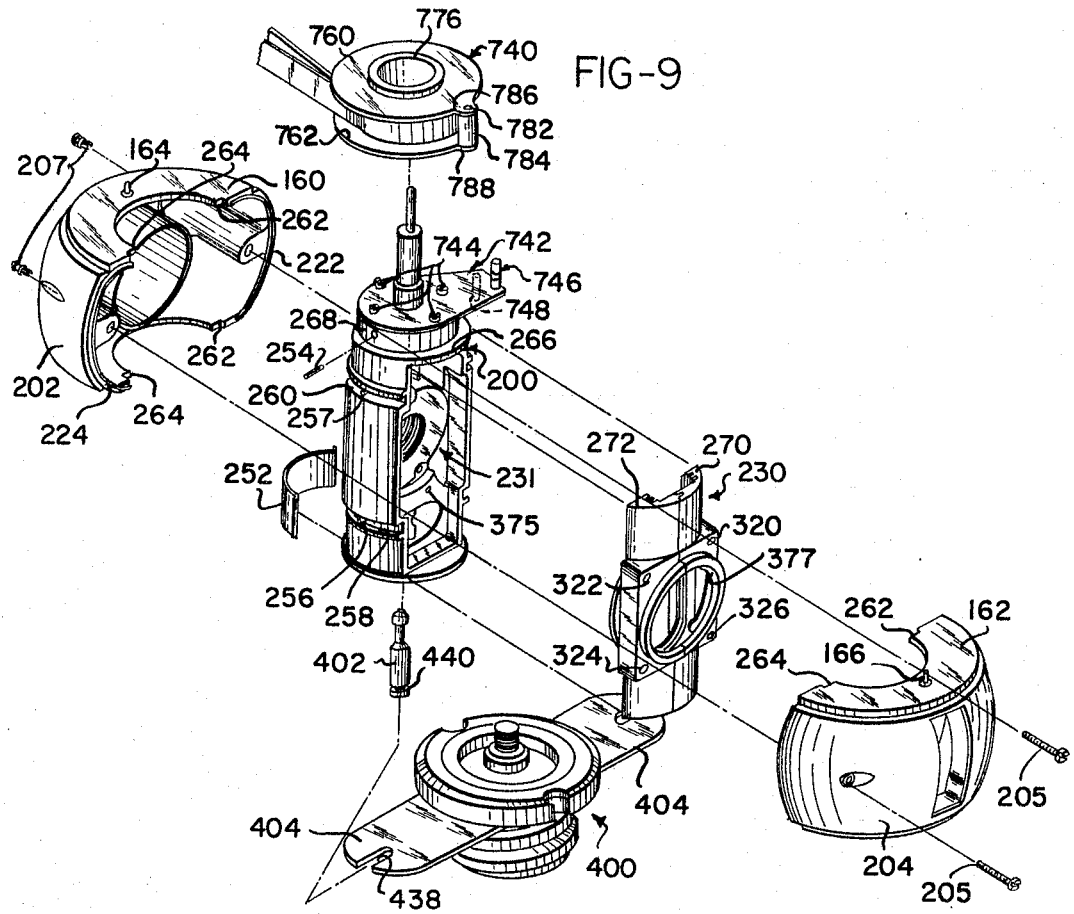
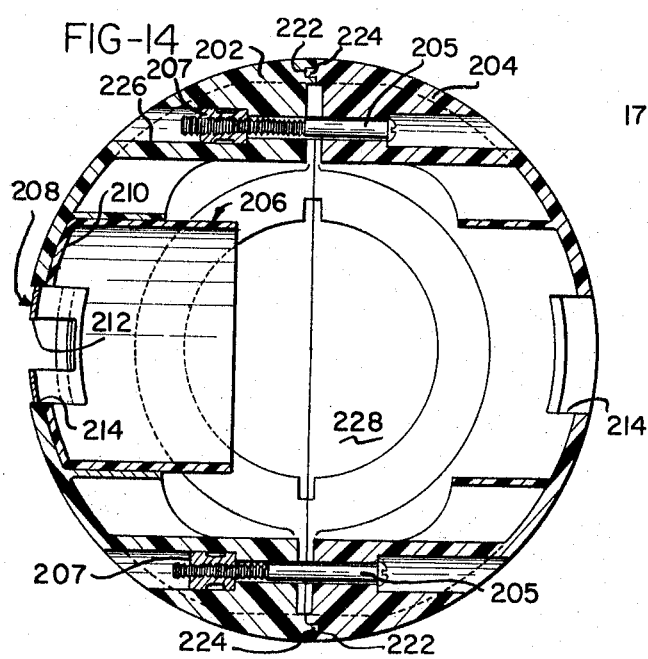
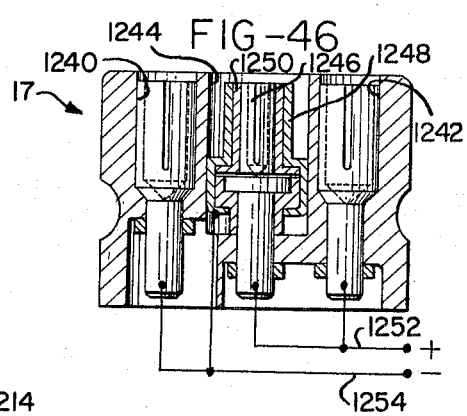
INVENTOR.
ROBERT V. BERNIER
BY
ATTORNEY

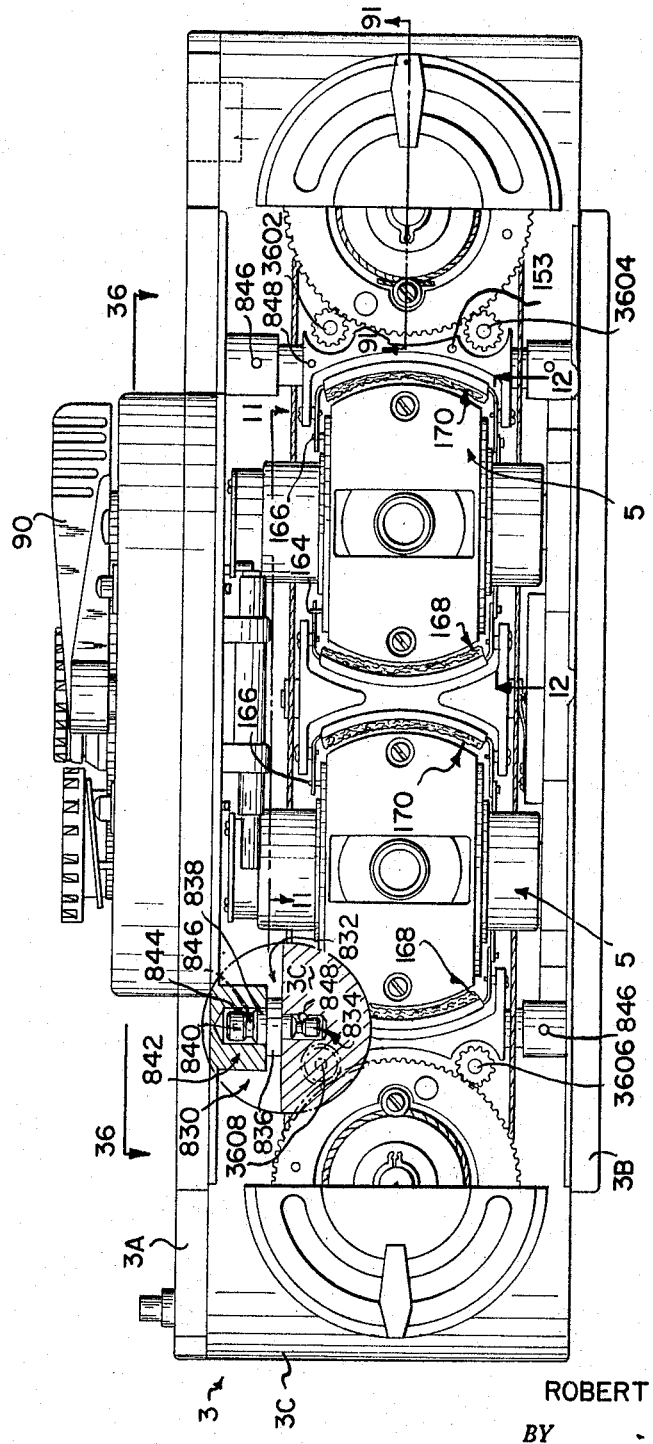

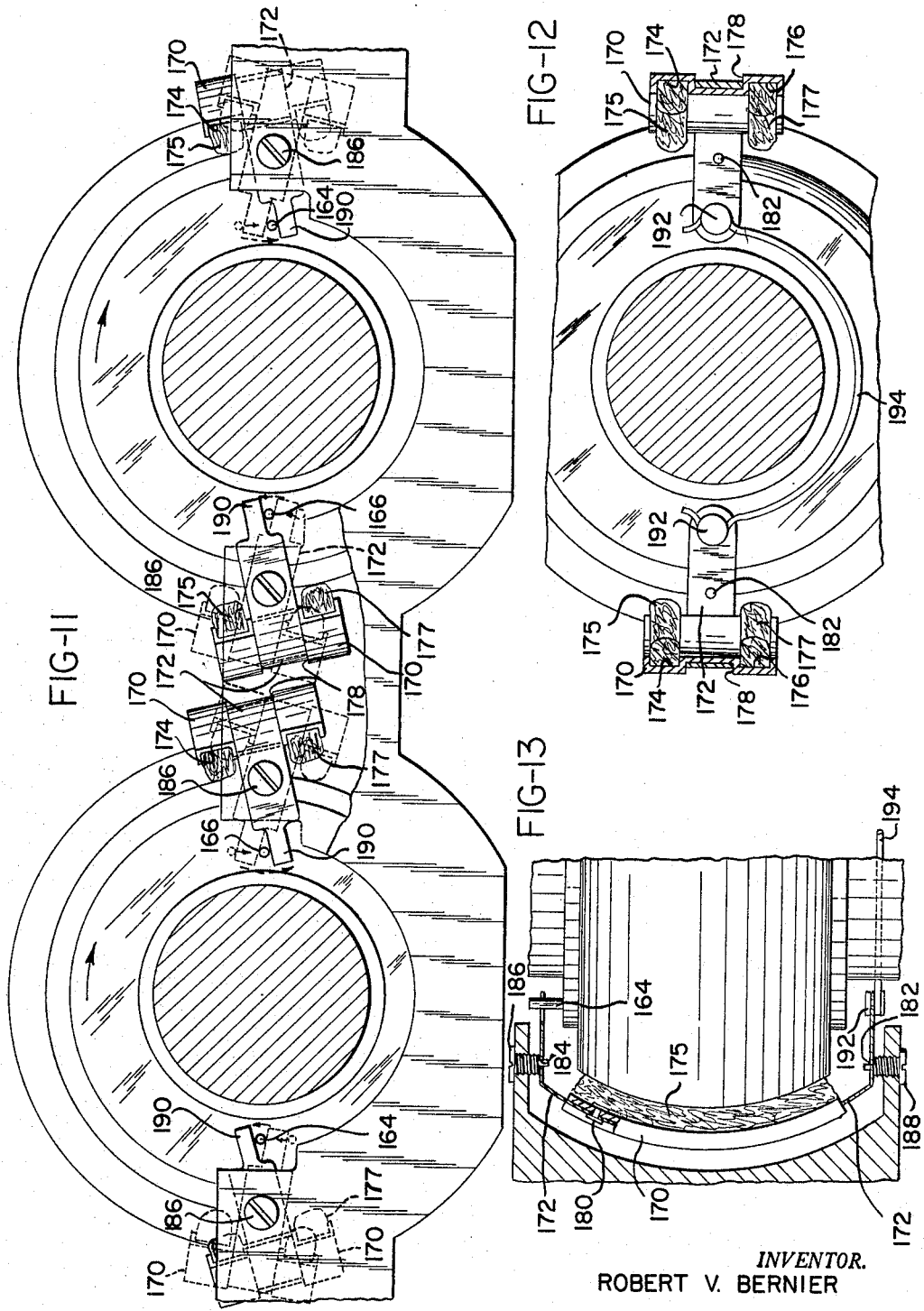

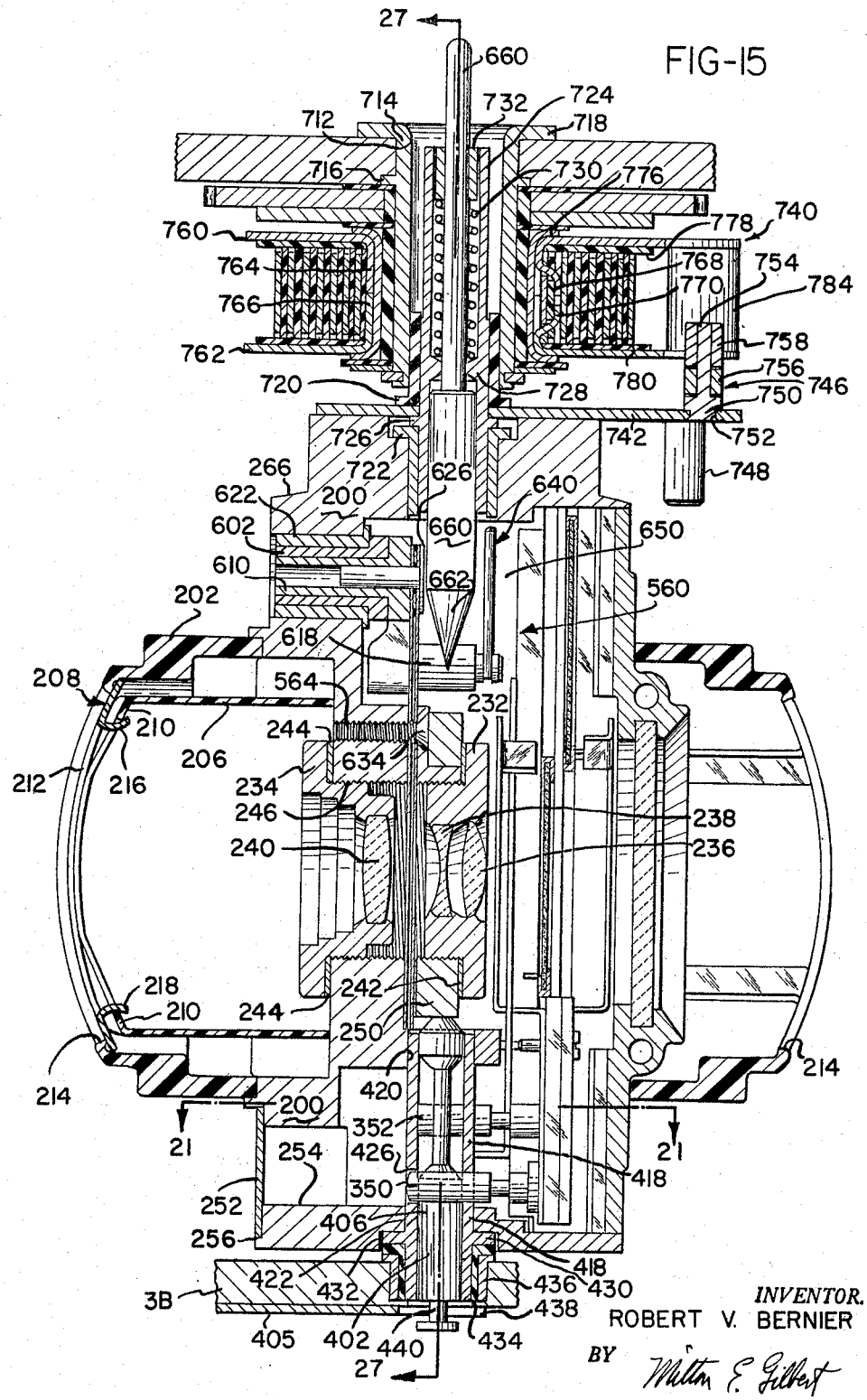

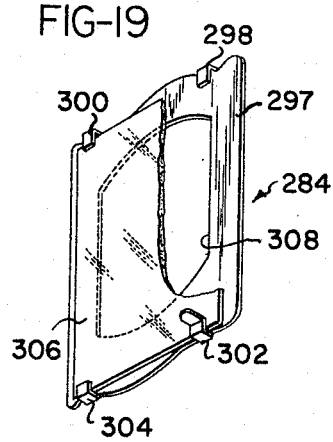
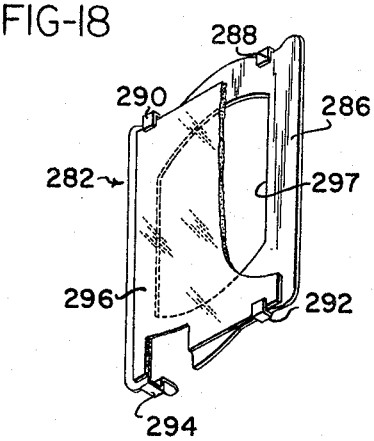
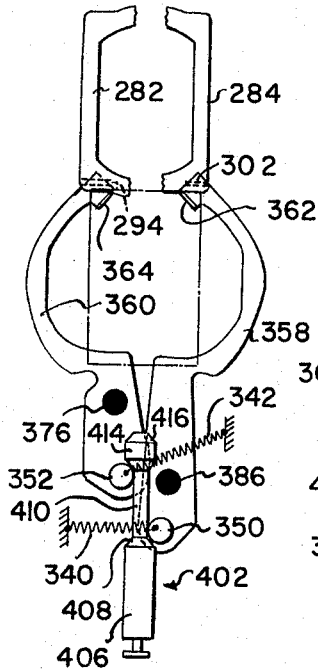
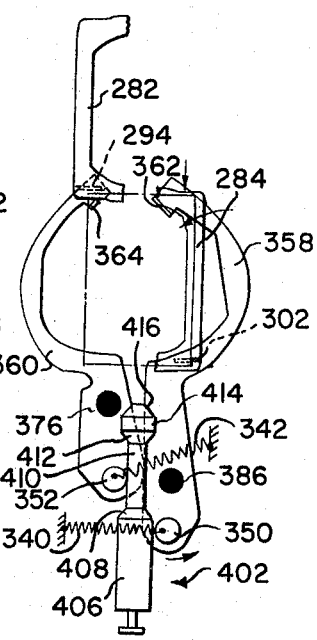
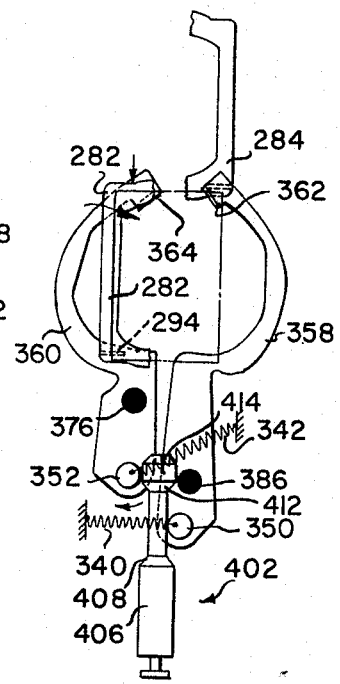
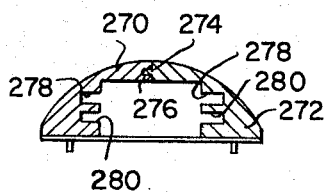

Aug. 30, 1966  R. V. BERNIER  3,269,291
STEREOSCOPIC CAMERA
Filed June 29, 1961  36 Sheets-Sheet 9
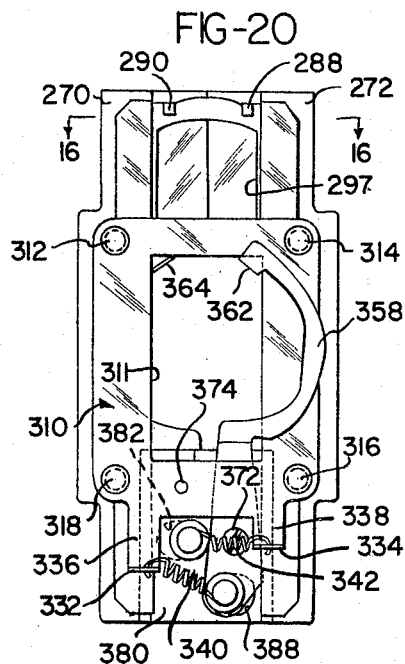
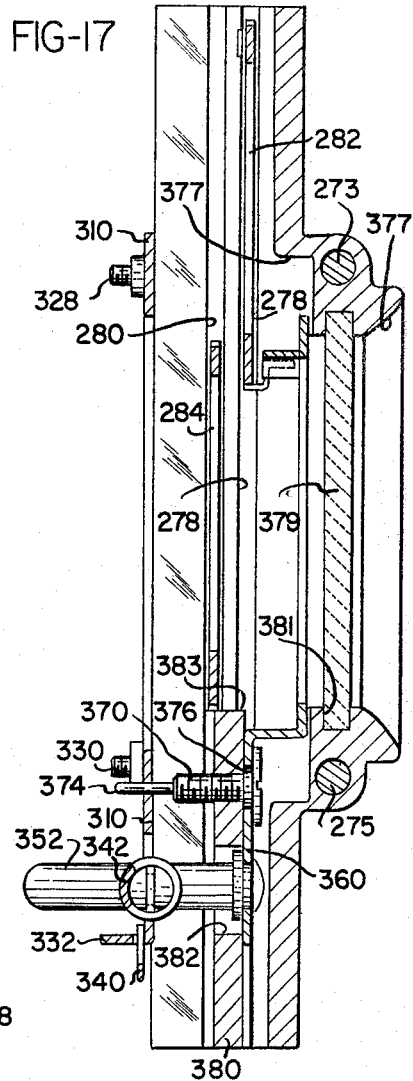
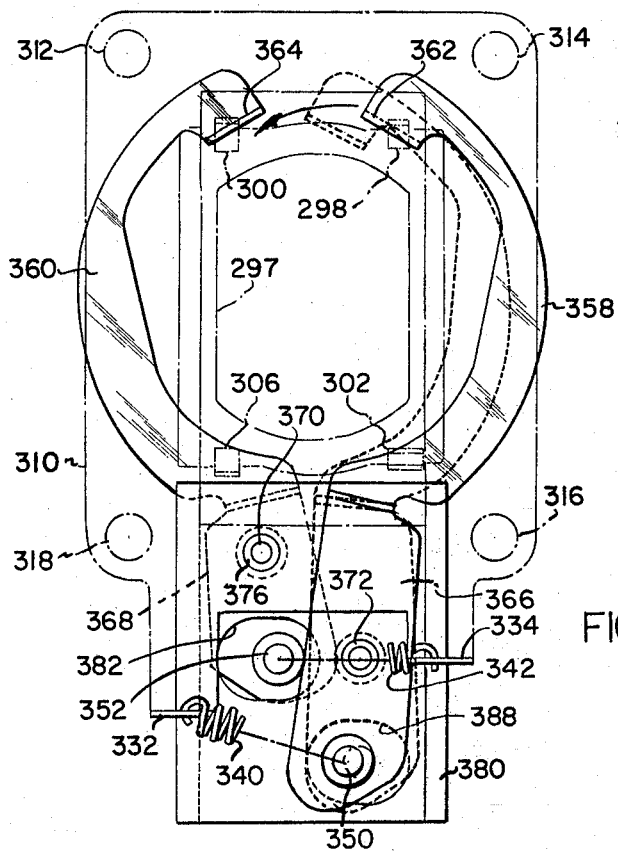
INVENTOR.
ROBERT V. BERNIER
BY Milton E. Gilbert
ATTORNEY Aug. 30, 1966  R. V. BERNIER  3,269,291
STEREOSCOPIC CAMERA
Filed June 29, 1961  36 Sheets-Sheet 10

INVENTOR.
ROBERT V. BERNIER
BY *Milton E. Gilbert*
ATTORNEY

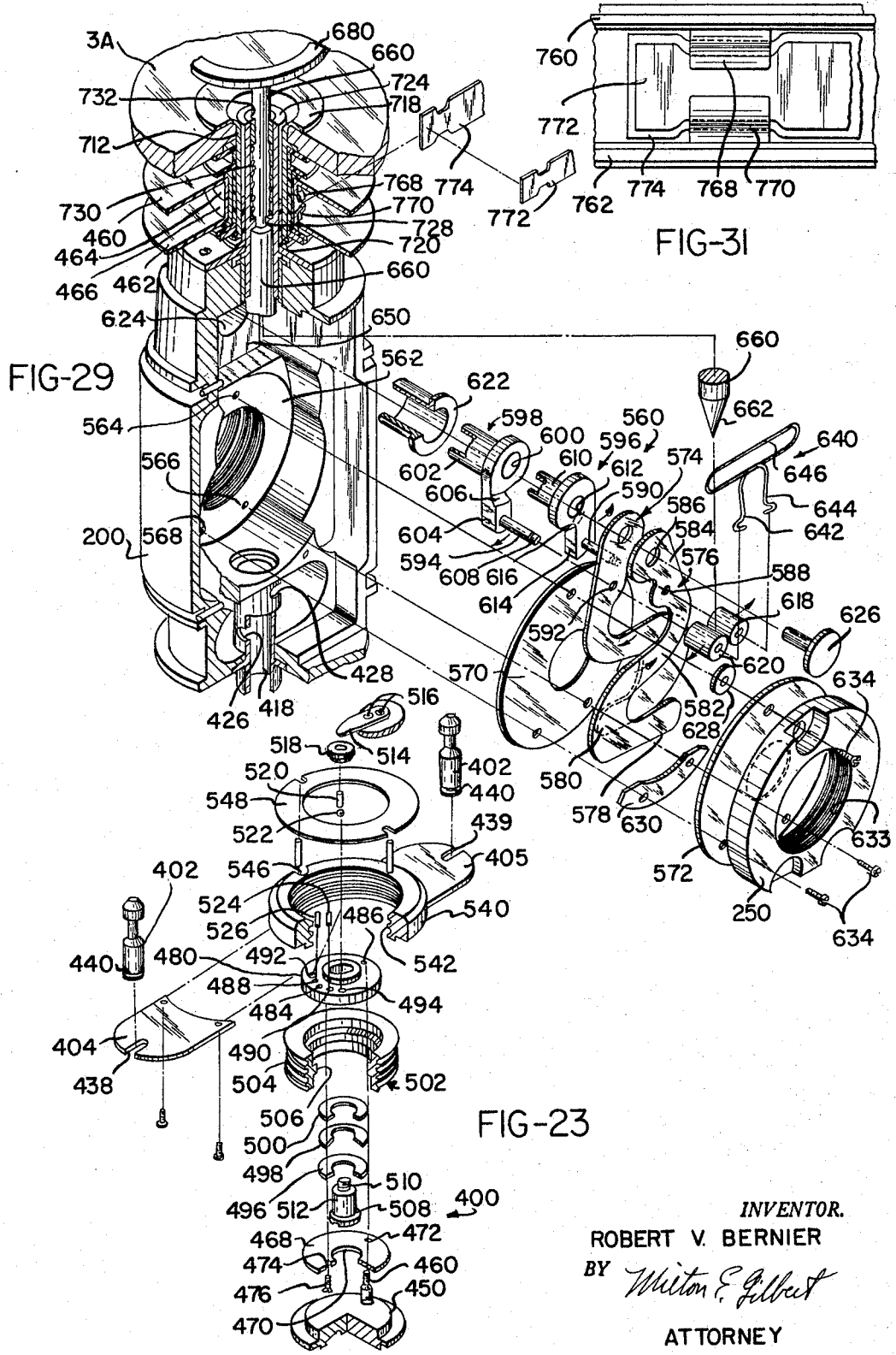

Aug. 30, 1966 R. V. BERNIER 3,269,291
STEREOSCOPIC CAMERA
Filed June 29, 1961 36 Sheets-Sheet 12
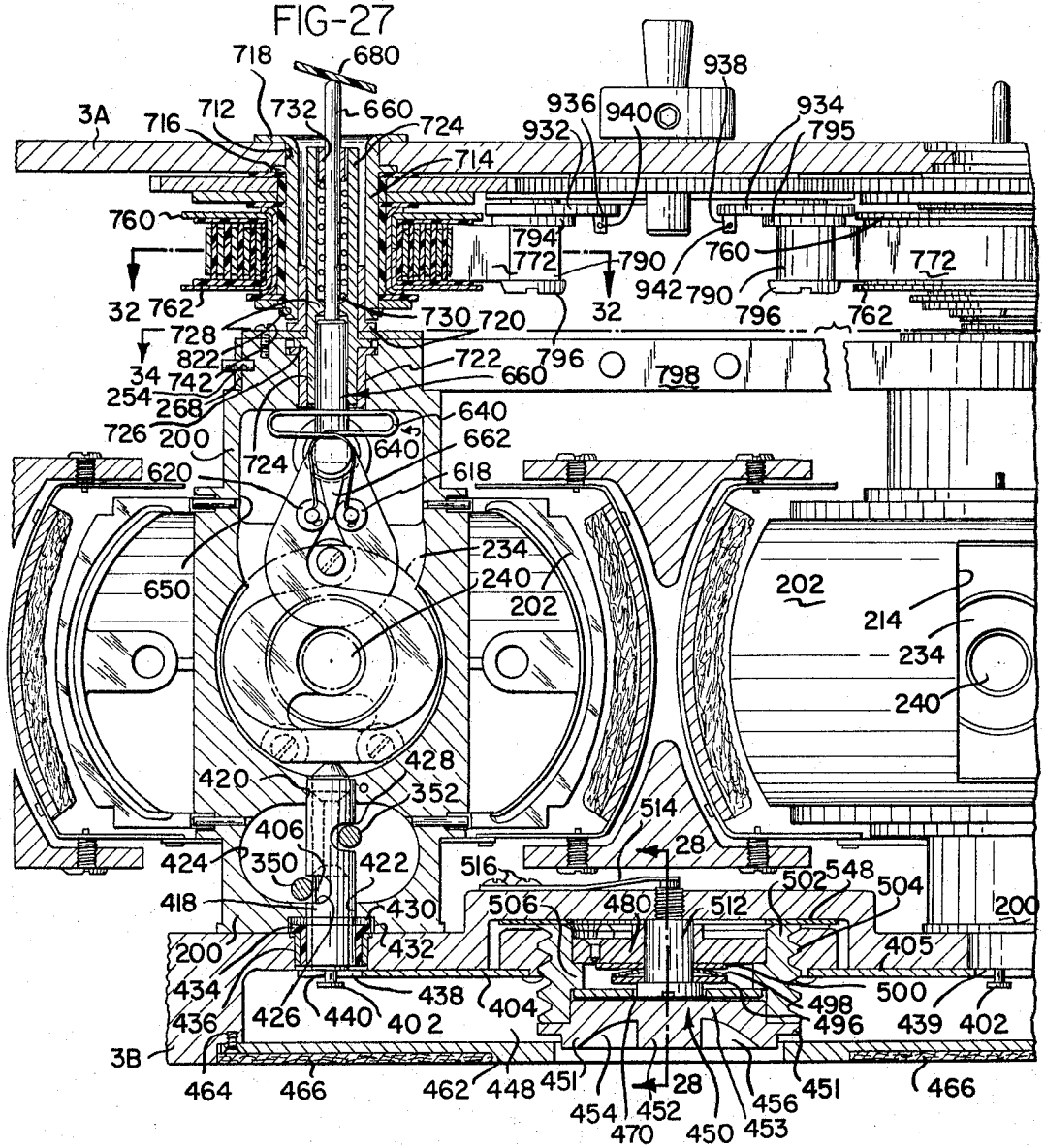
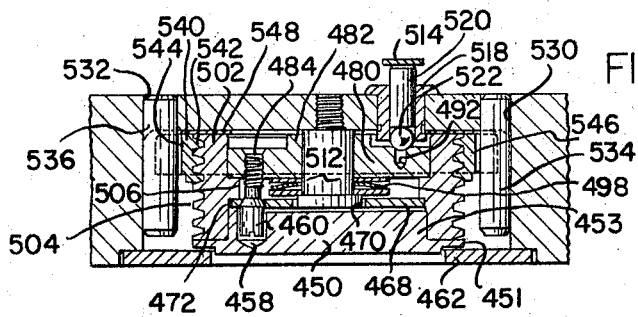
INVENTOR.
ROBERT V. BERNIER
BY Milton E. Gilbert
ATTORNEY Aug. 30, 1966
R. V. BERNIER
3,269,291
STEREOSCOPIC CAMERA
Filed June 29, 1961
36 Sheets-Sheet 13
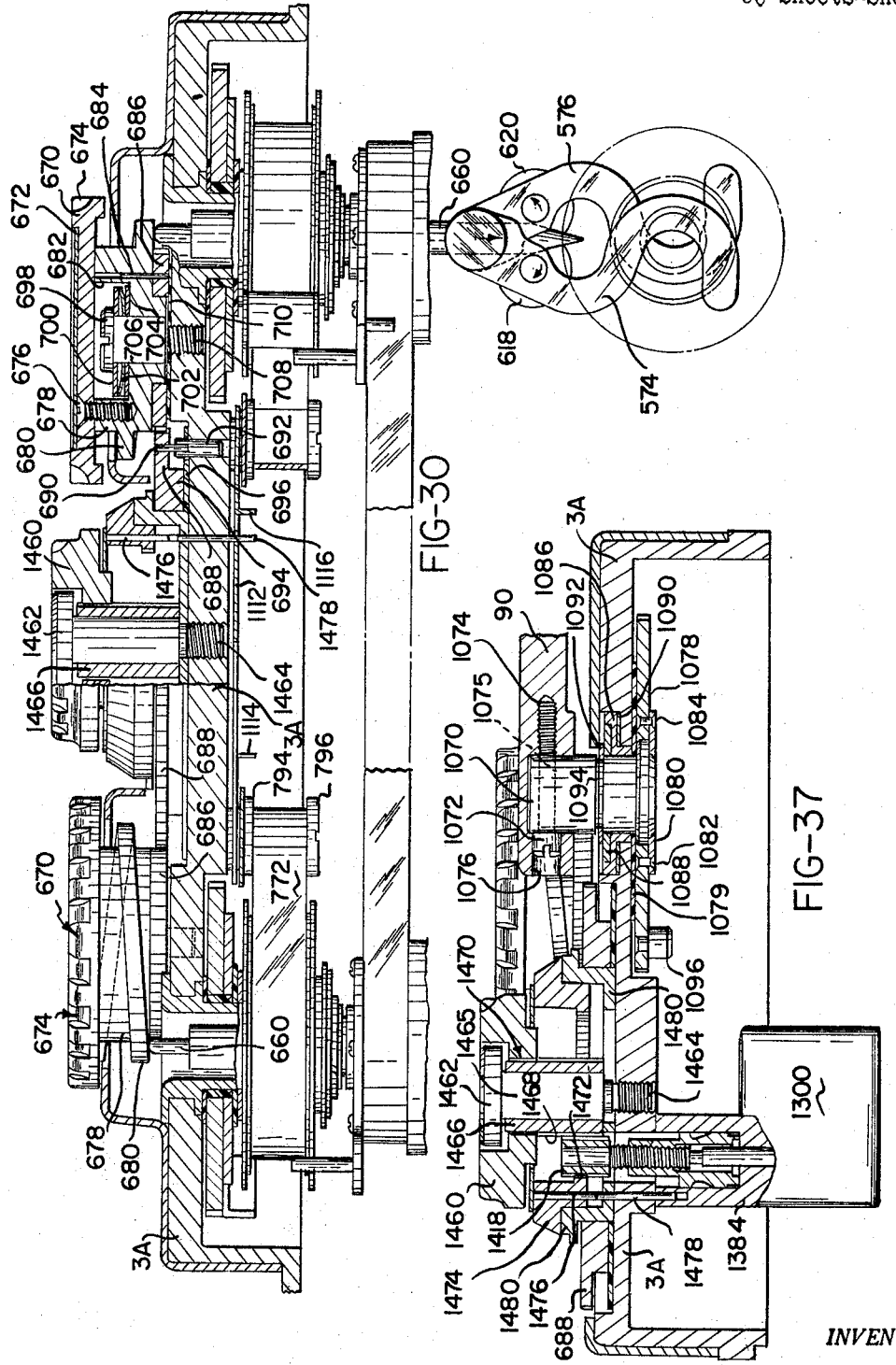
INVENTOR.
ROBERT V. BERNIER
BY
ATTORNEY Aug. 30, 1966 R. V. BERNIER 3,269,291
STEREOSCOPIC CAMERA
Filed June 29, 1961 36 Sheets-Sheet 14
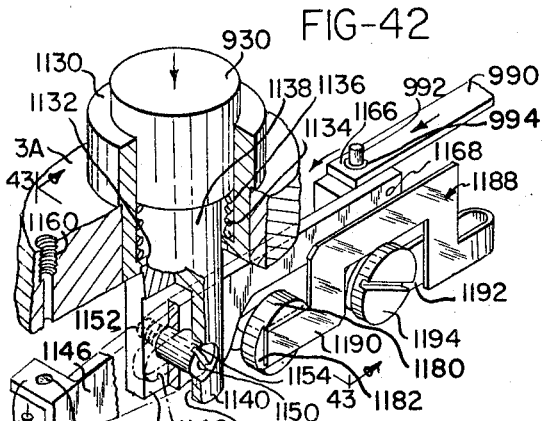
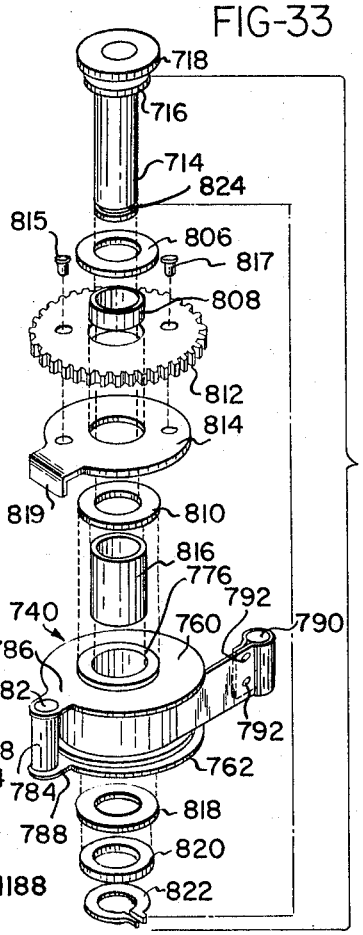
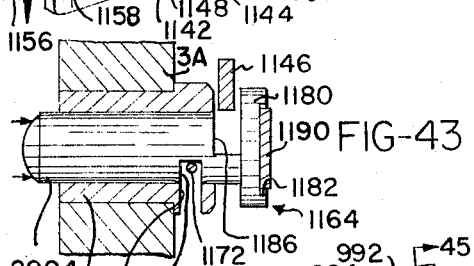
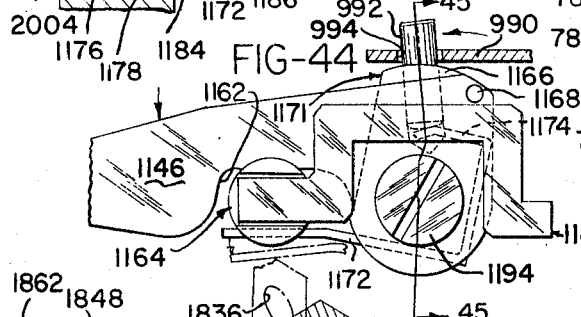
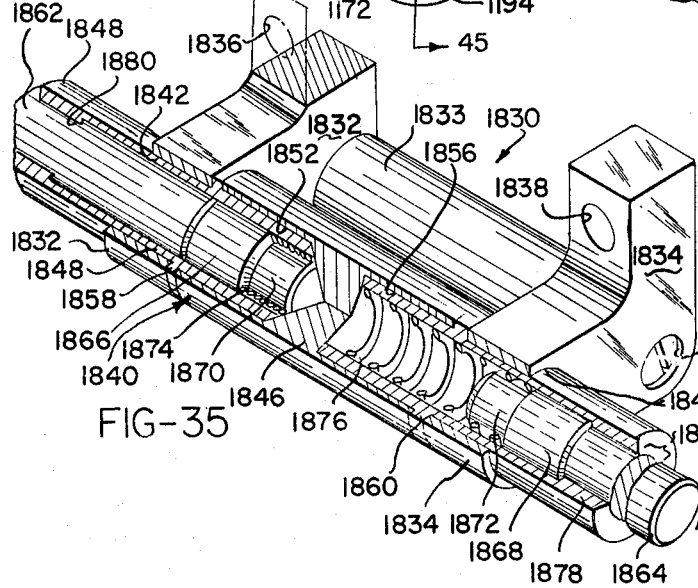
INVENTOR.
ROBERT V. BERNIER
BY
ATTORNEY

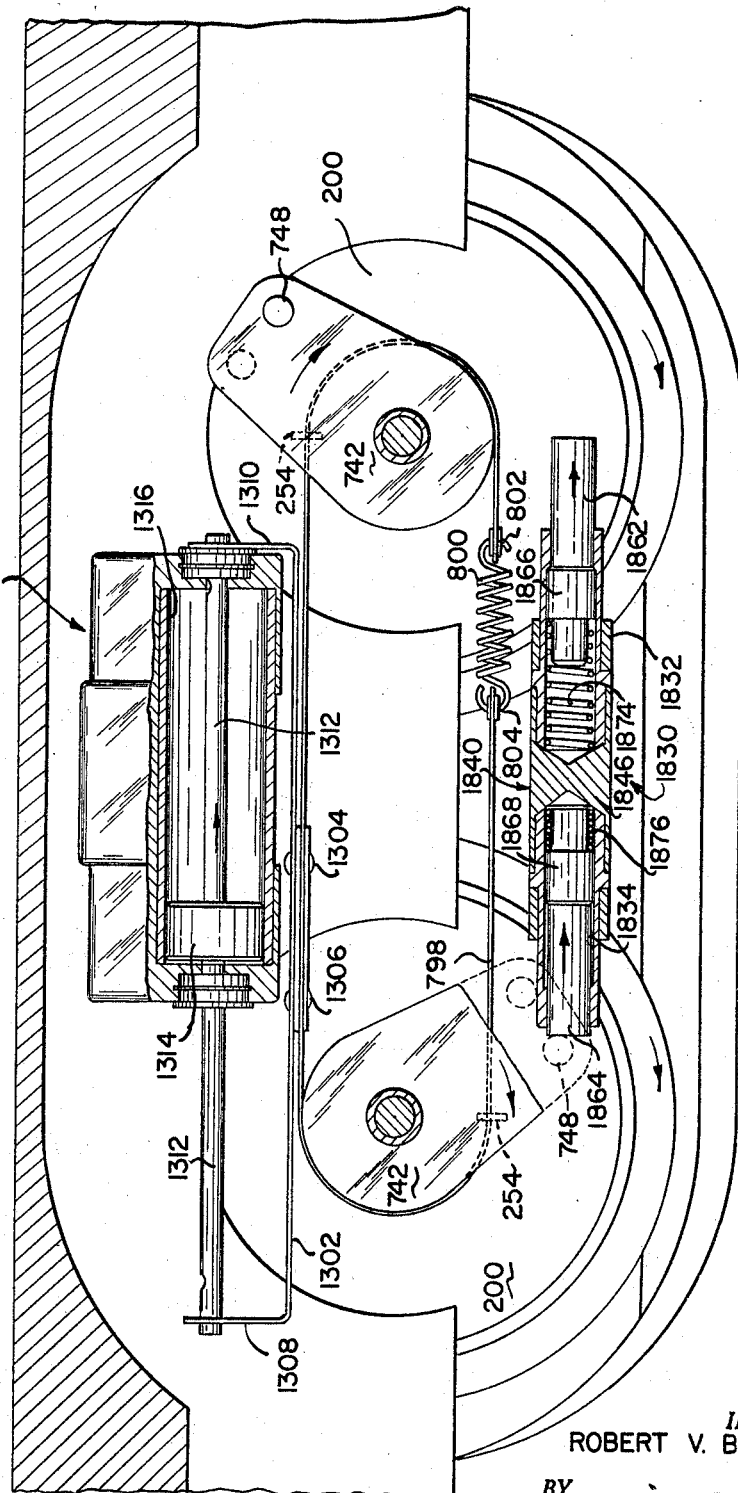

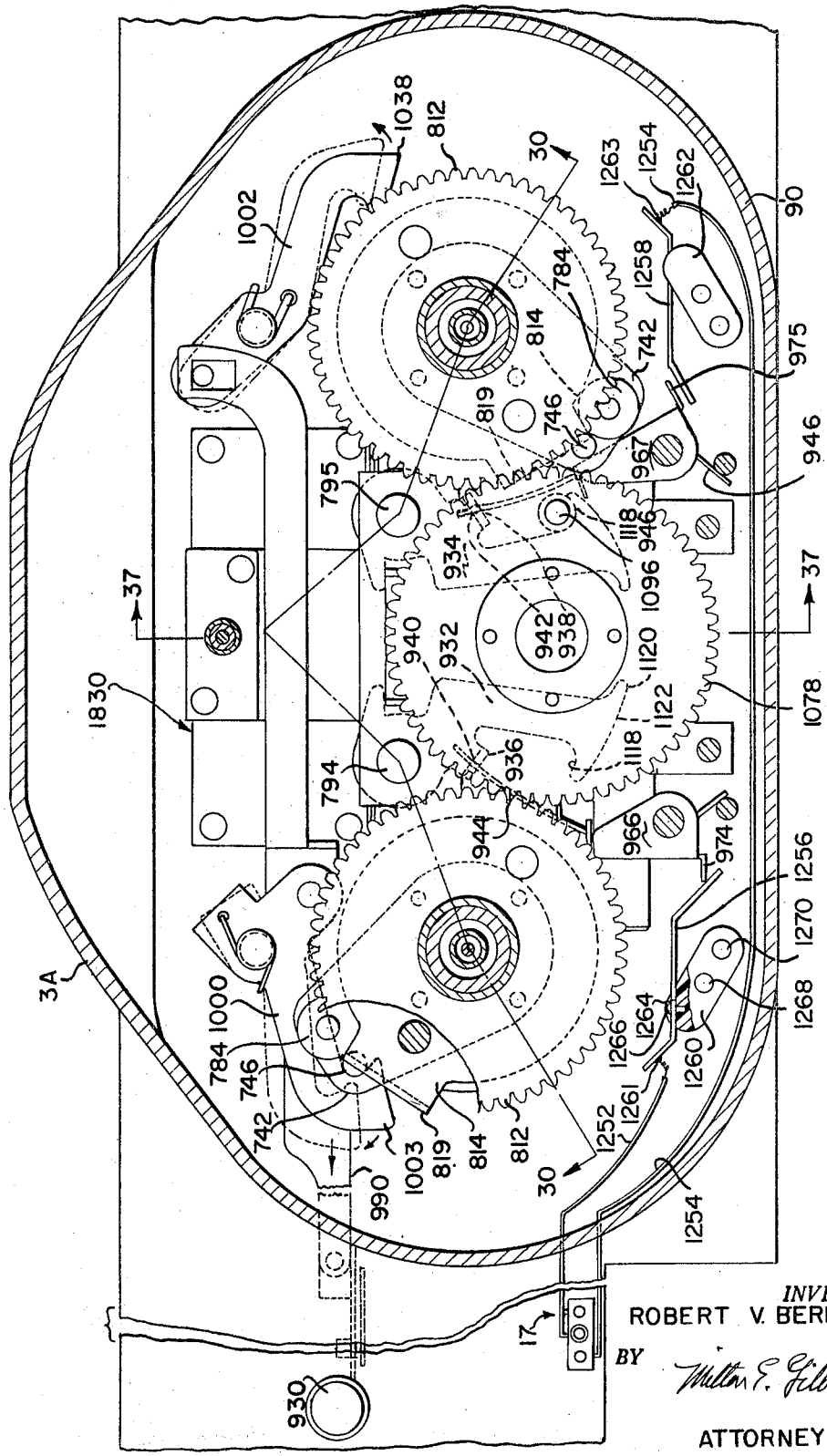

Aug. 30, 1966   R. V. BERNIER   3,269,291
STEREOSCOPIC CAMERA
Filed June 29, 1961   36 Sheets-Sheet 18

INVENTOR.
ROBERT V. BERNIER
BY Milton E. Gilbert
ATTORNEY

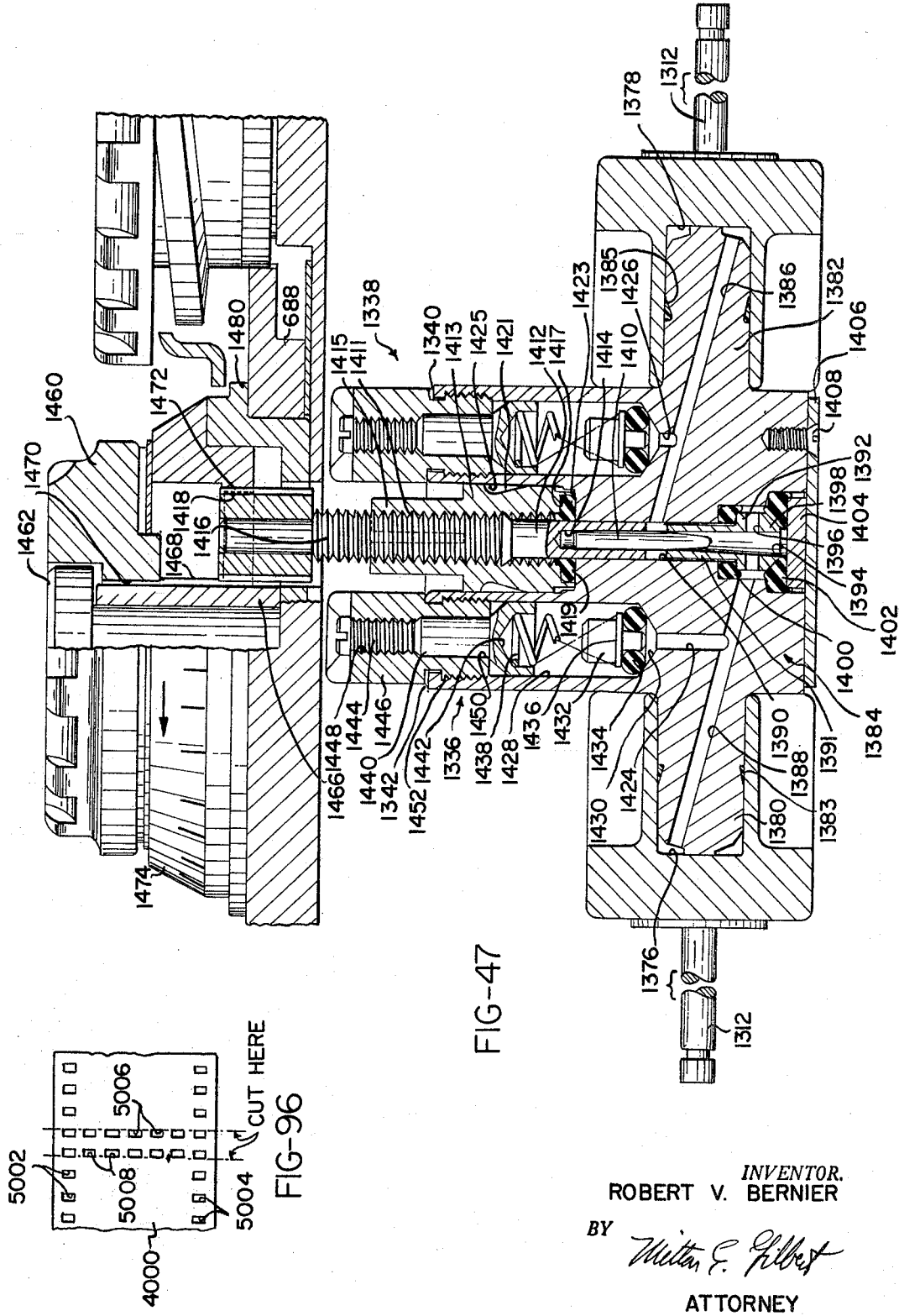

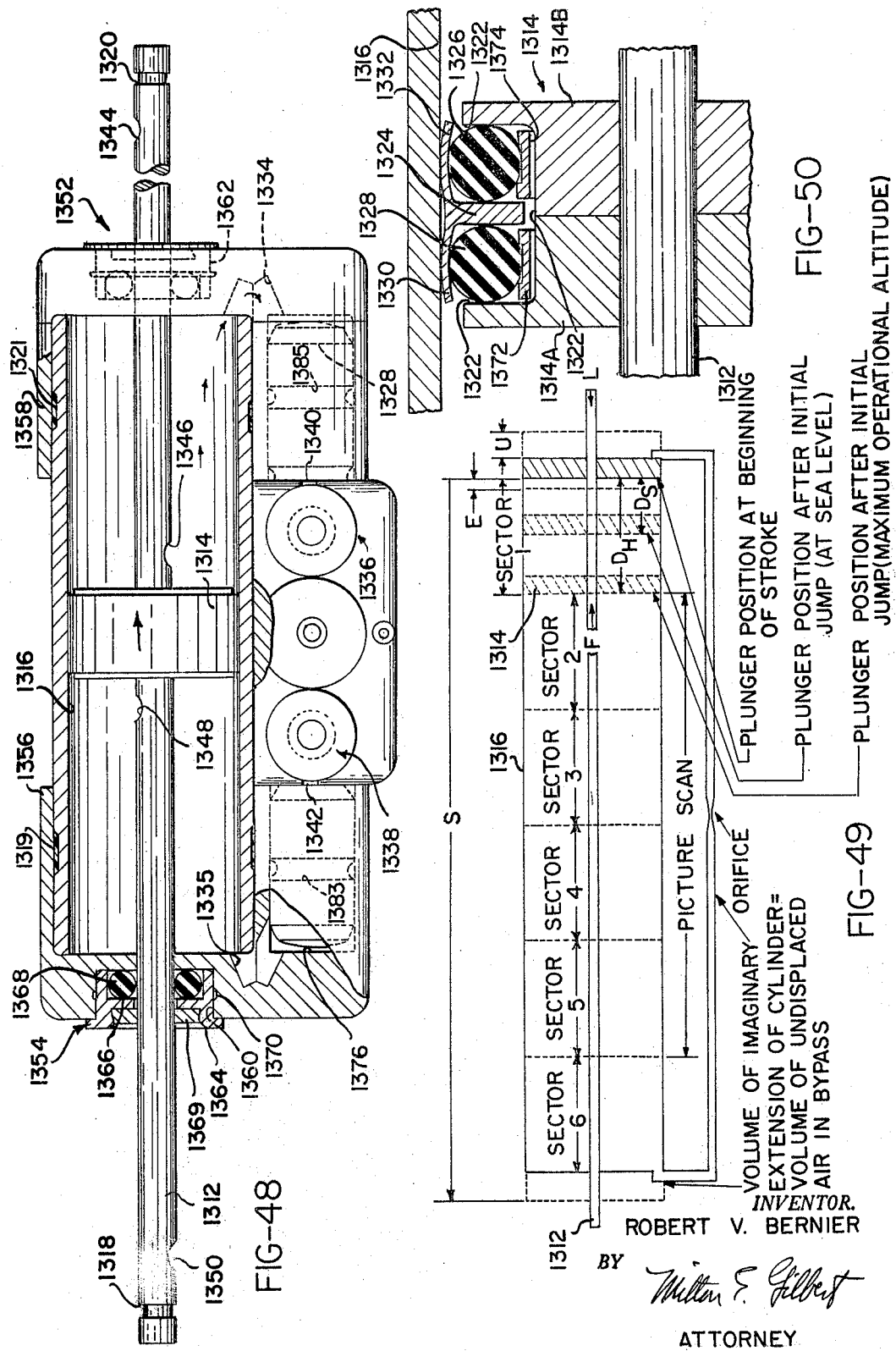

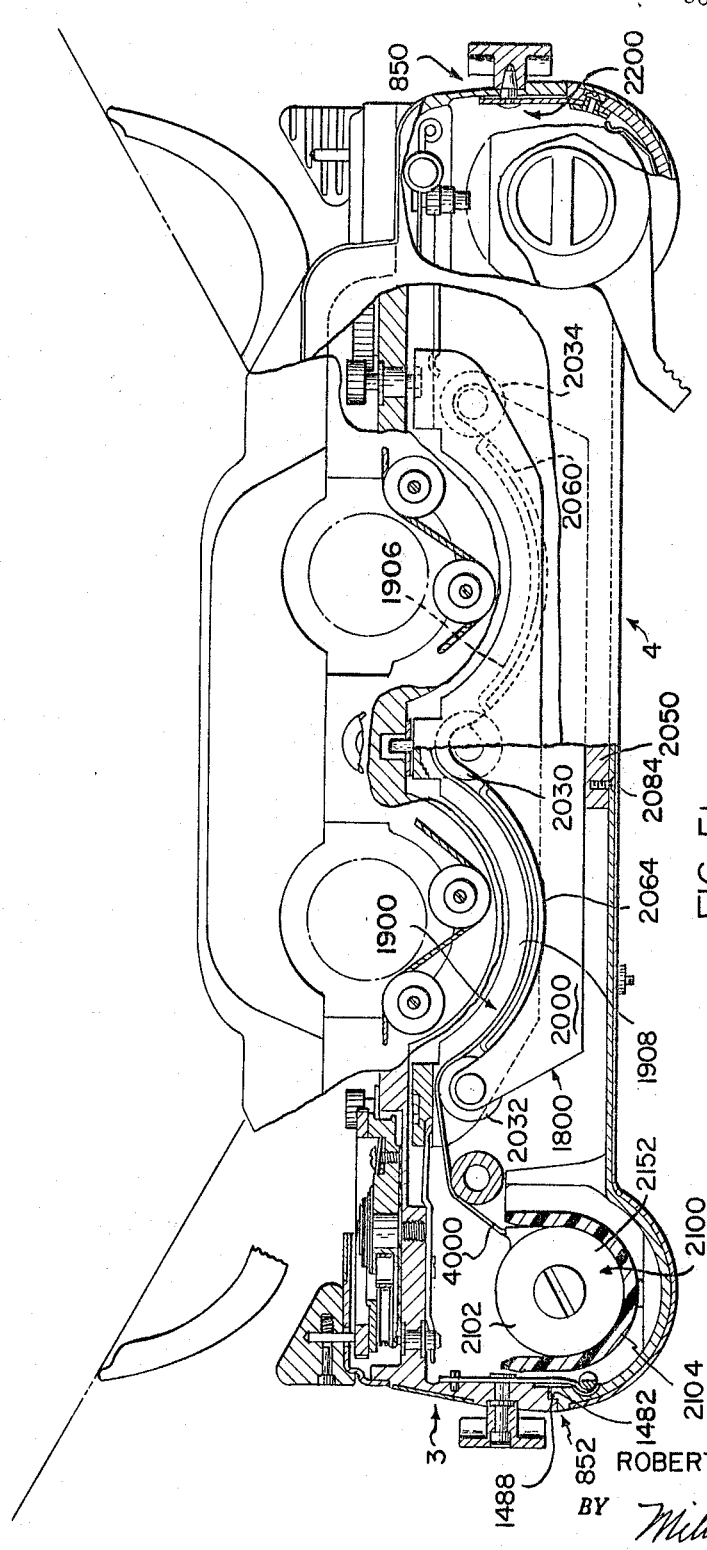

Aug. 30, 1966  R. V. BERNIER  3,269,291
STEREOSCOPIC CAMERA
Filed June 29, 1961  36 Sheets-Sheet 22

INVENTOR.
ROBERT V. BERNIER
BY *Milton E. Gilbert*
ATTORNEY

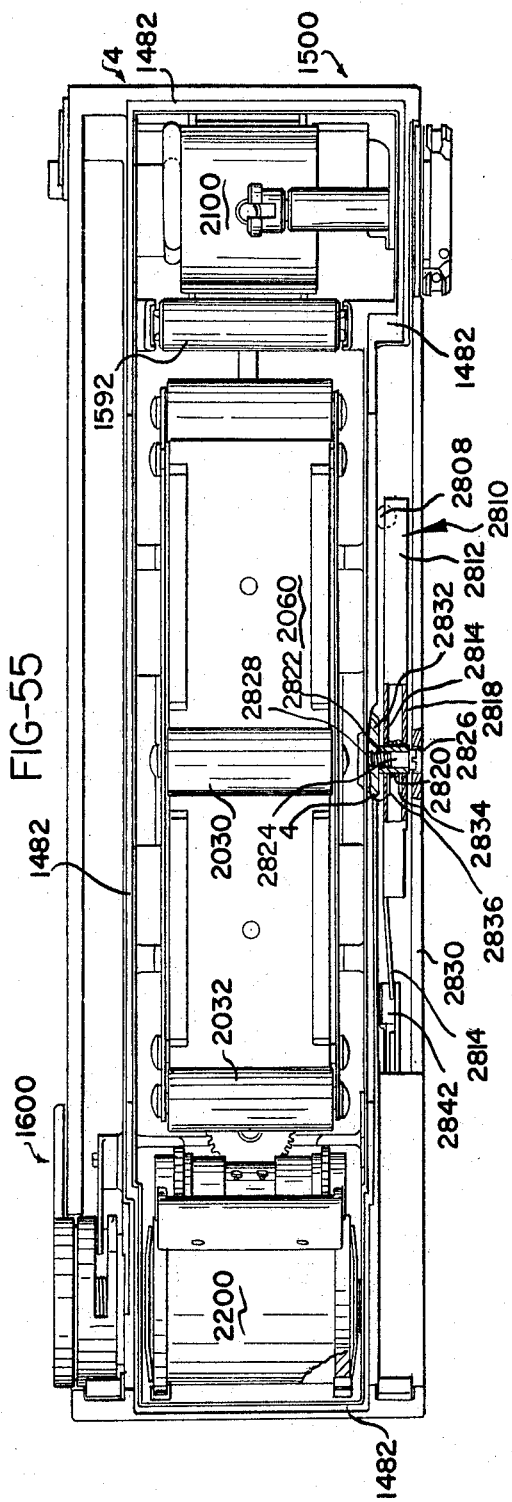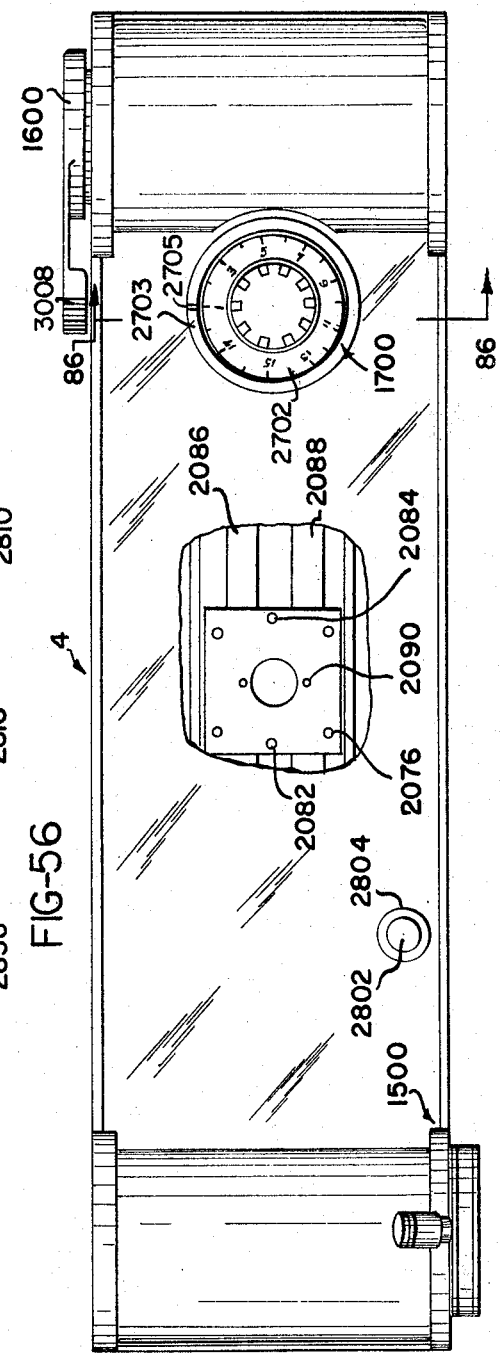

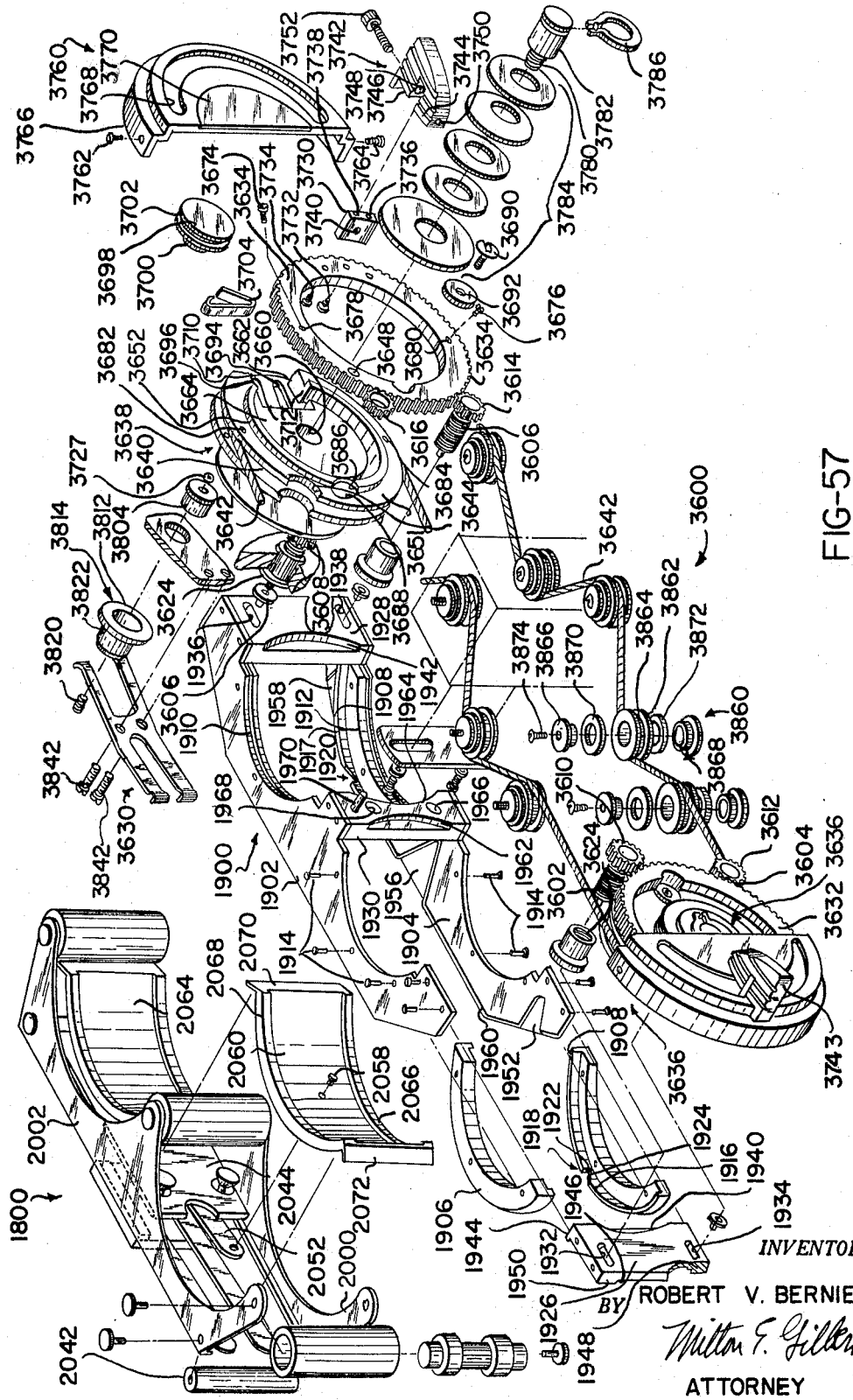

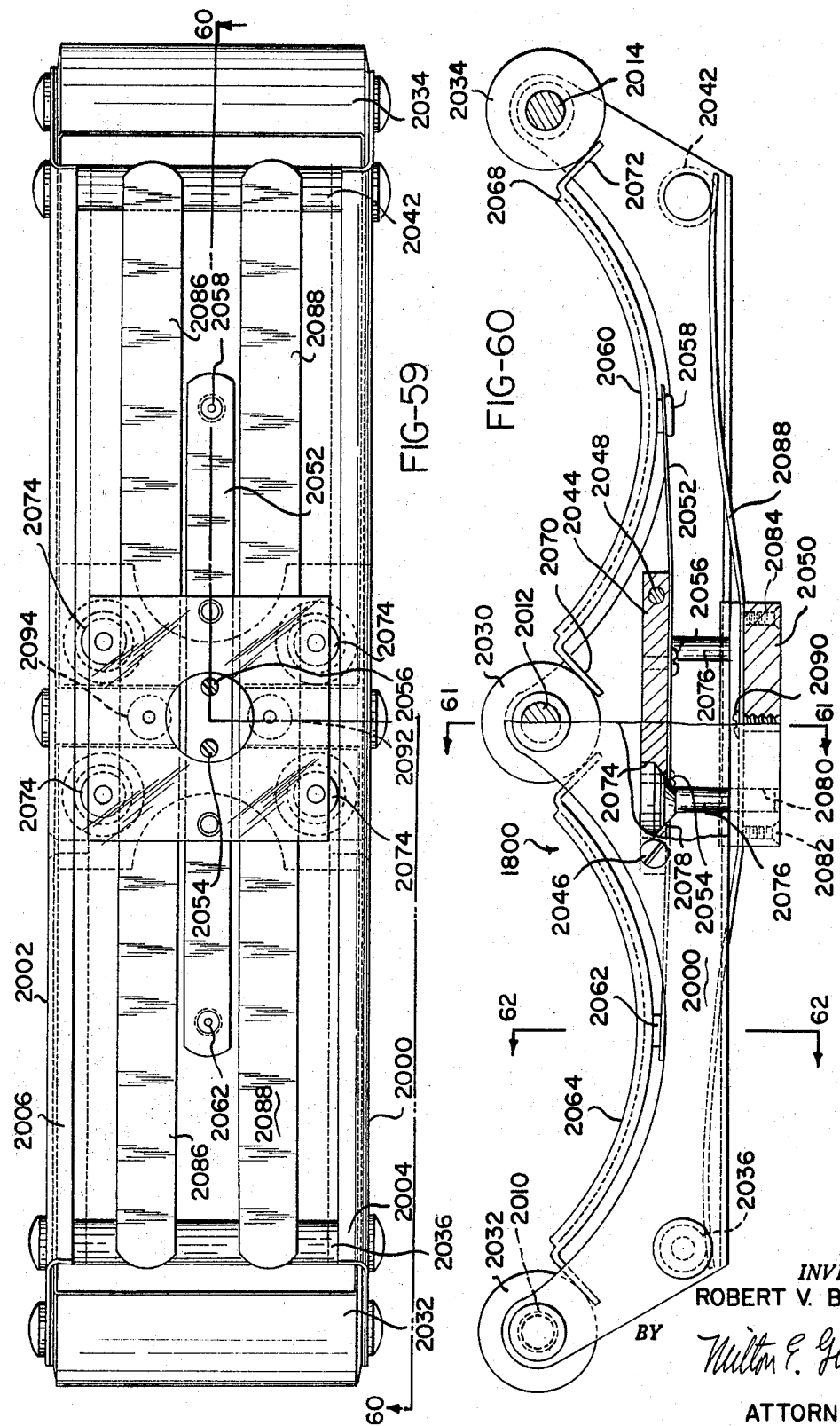

Aug. 30, 1966 R. V. BERNIER 3,269,291
STEREOSCOPIC CAMERA
Filed June 29, 1961 36 Sheets-Sheet 26

*INVENTOR.*
ROBERT V. BERNIER
BY Milton E. Gilbert
ATTORNEYS

Aug. 30, 1966 R. V. BERNIER 3,269,291
STEREOSCOPIC CAMERA
Filed June 29, 1961 36 Sheets-Sheet 27
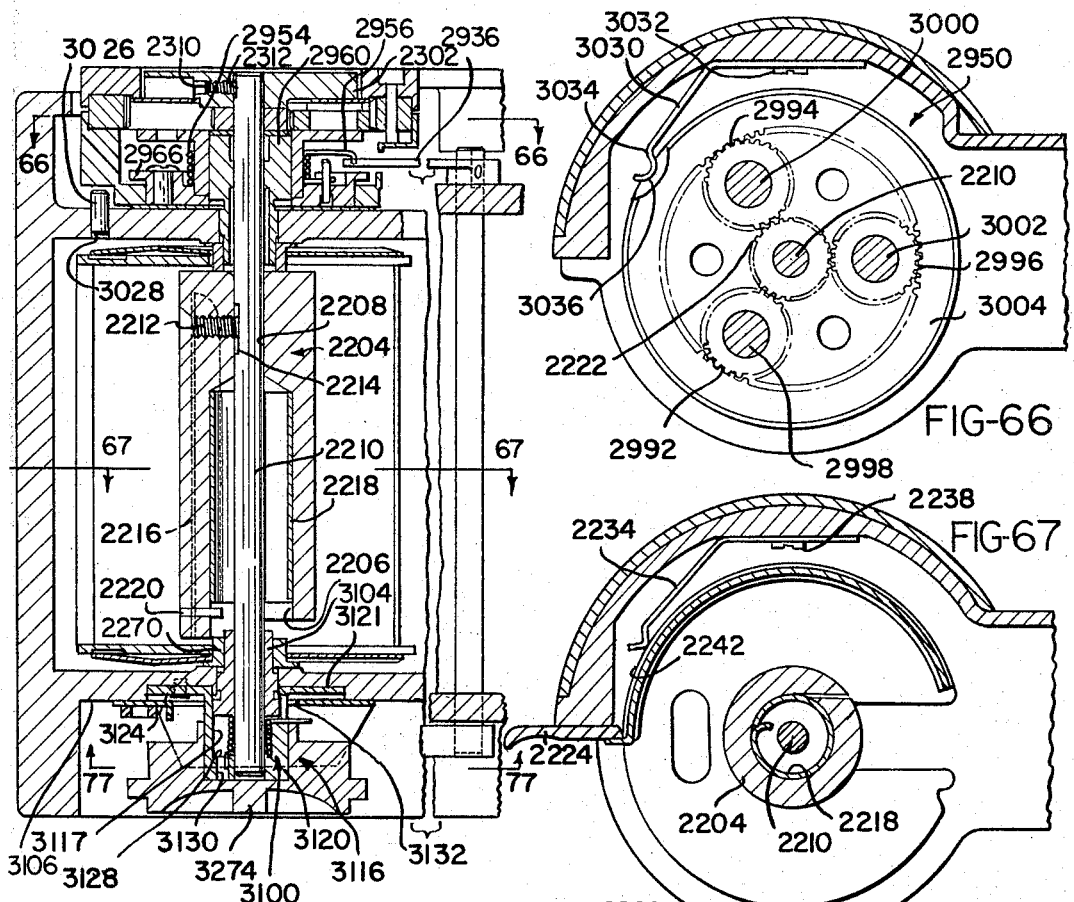
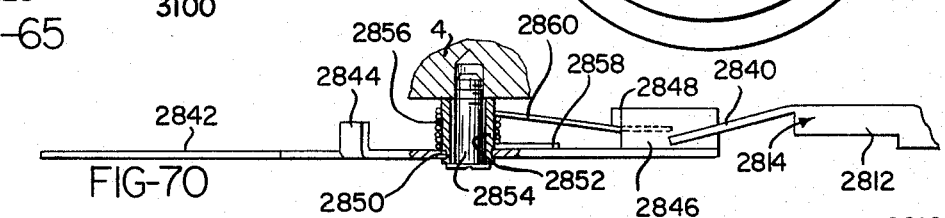
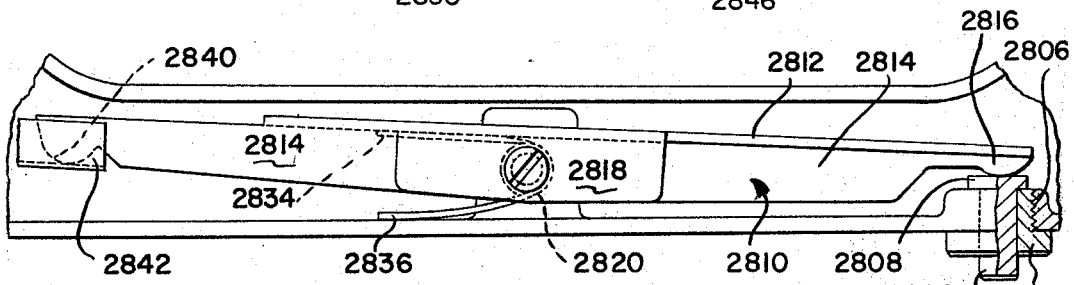
INVENTOR.
ROBERT V. BERNIER
BY Milton F. Gilbert
ATTORNEY

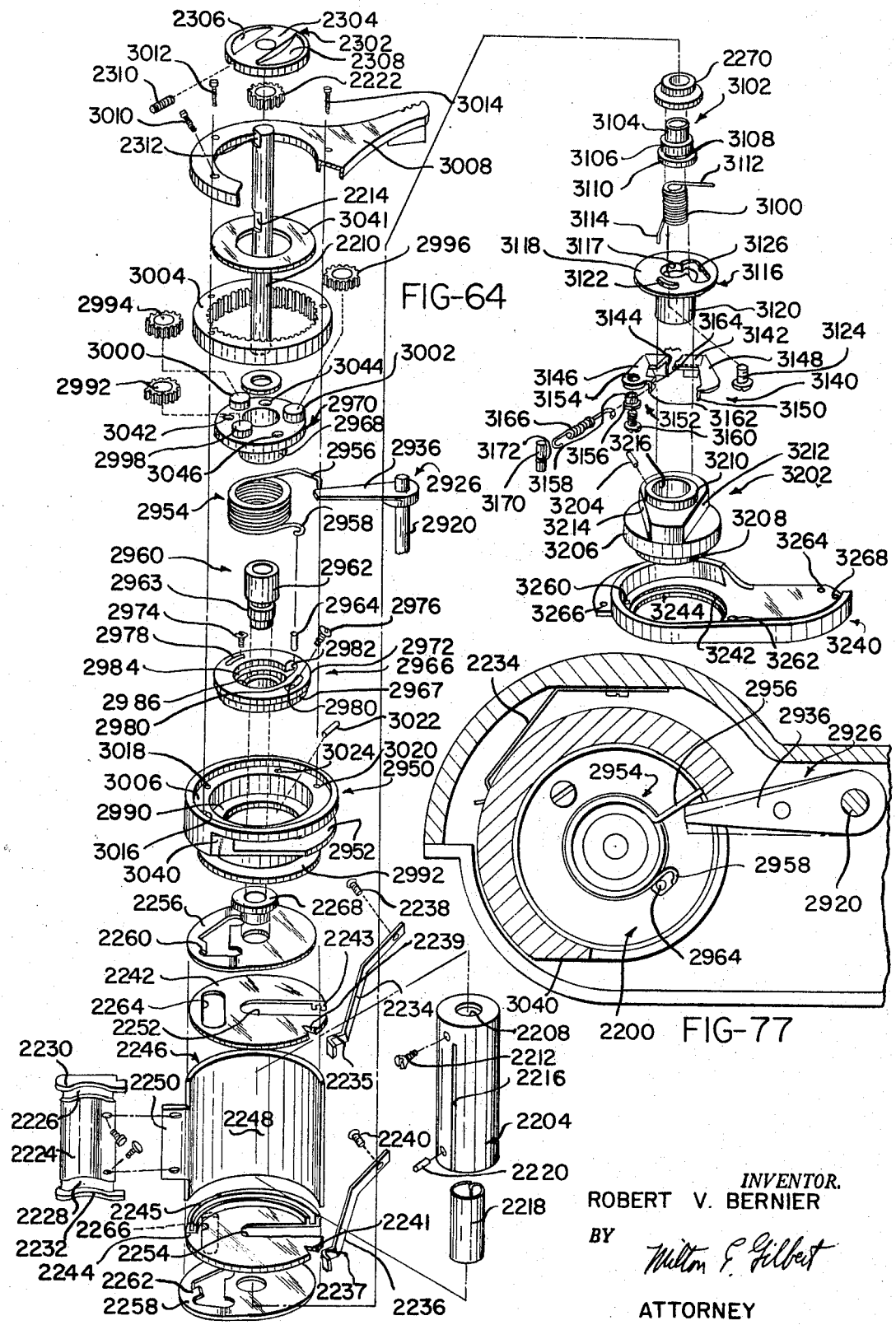

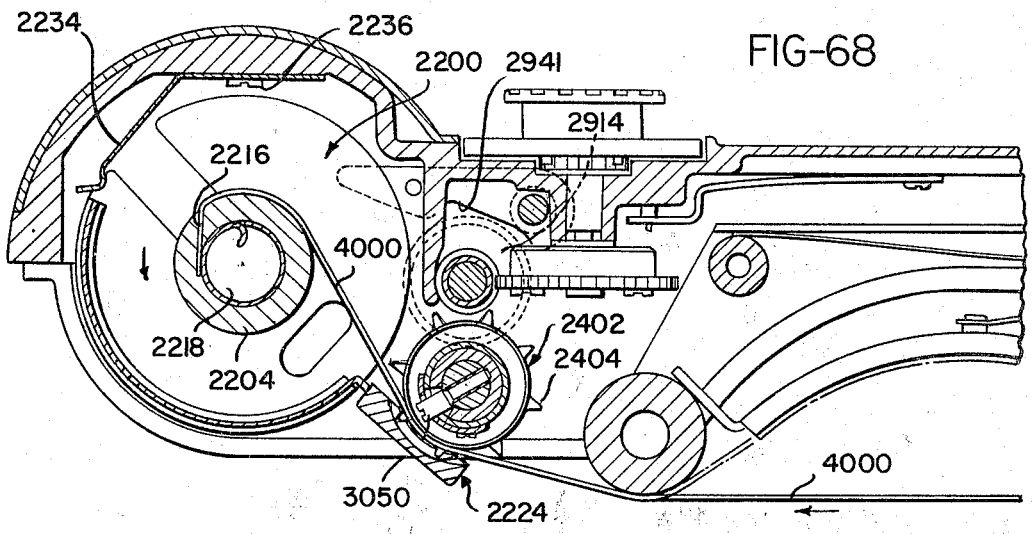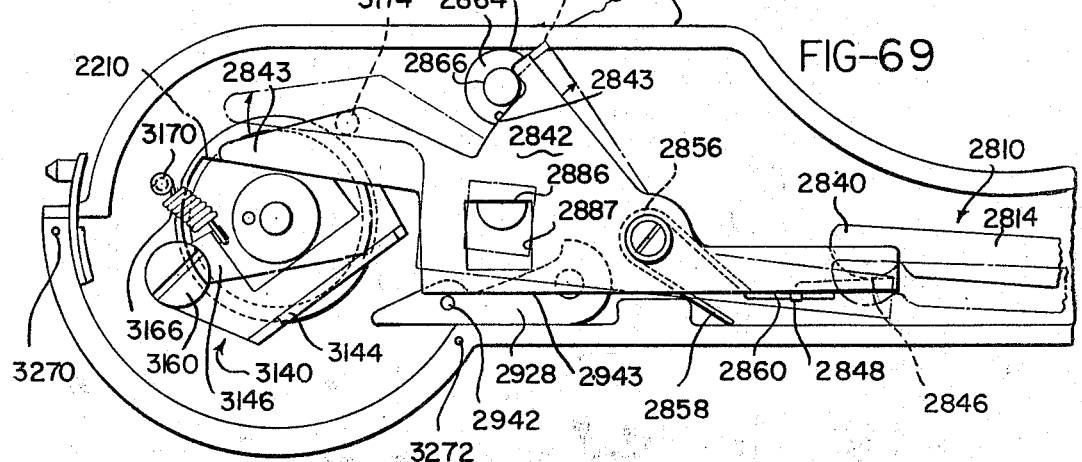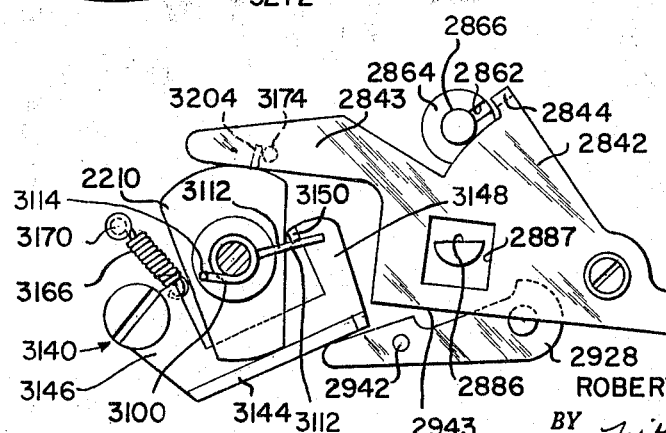

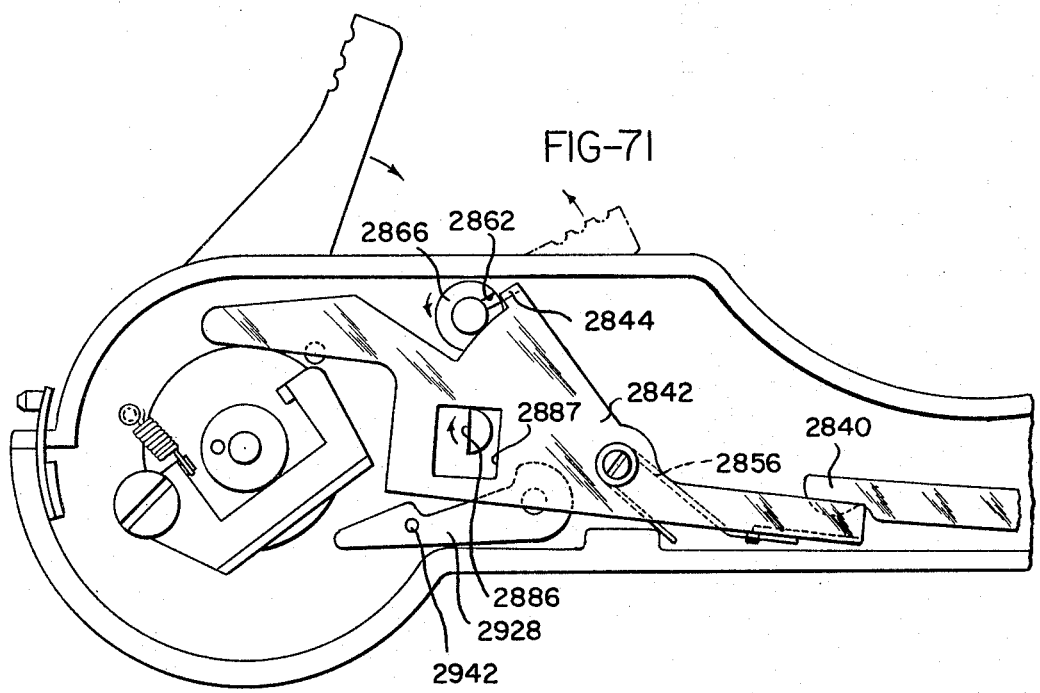
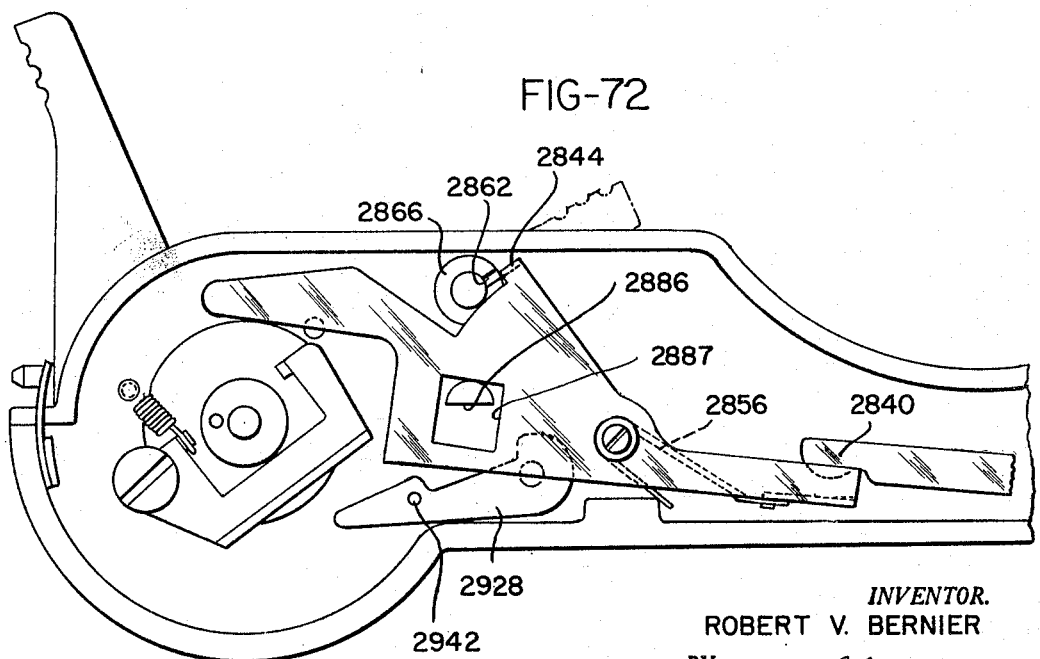

Aug. 30, 1966        R. V. BERNIER        3,269,291
STEREOSCOPIC CAMERA
Filed June 29, 1961                36 Sheets-Sheet 31
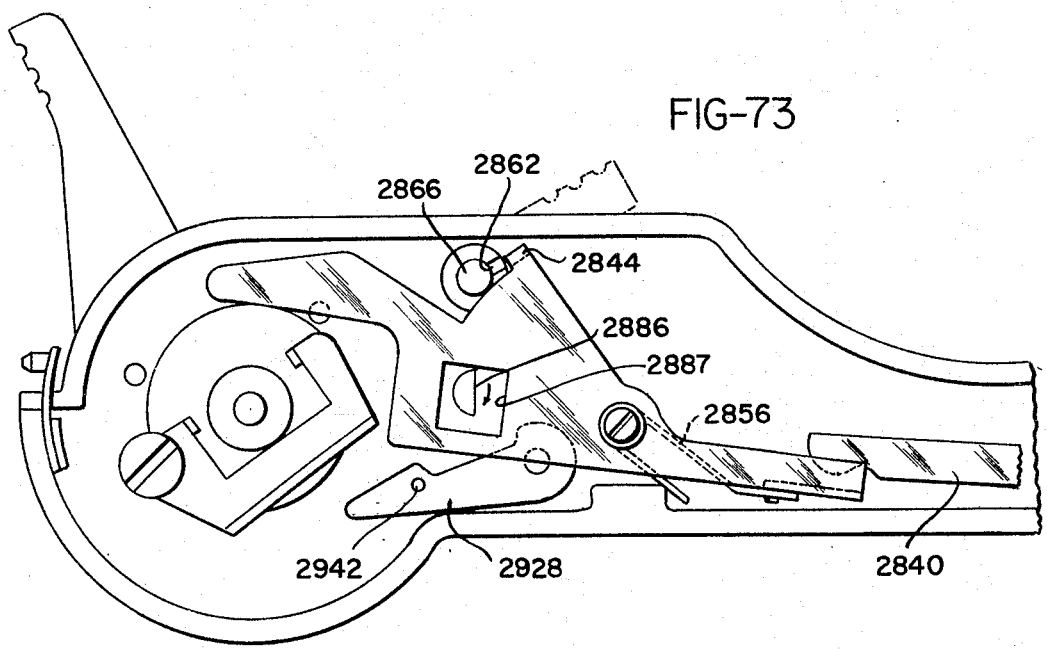
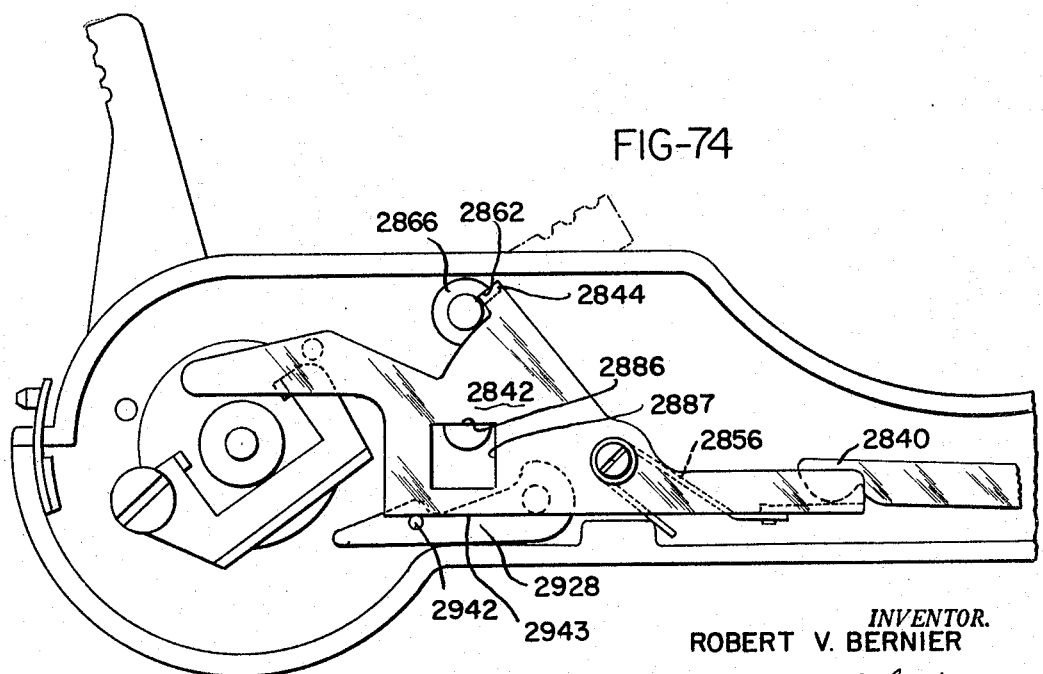
INVENTOR.
ROBERT V. BERNIER
BY Milton G. Gilbert
ATTORNEY

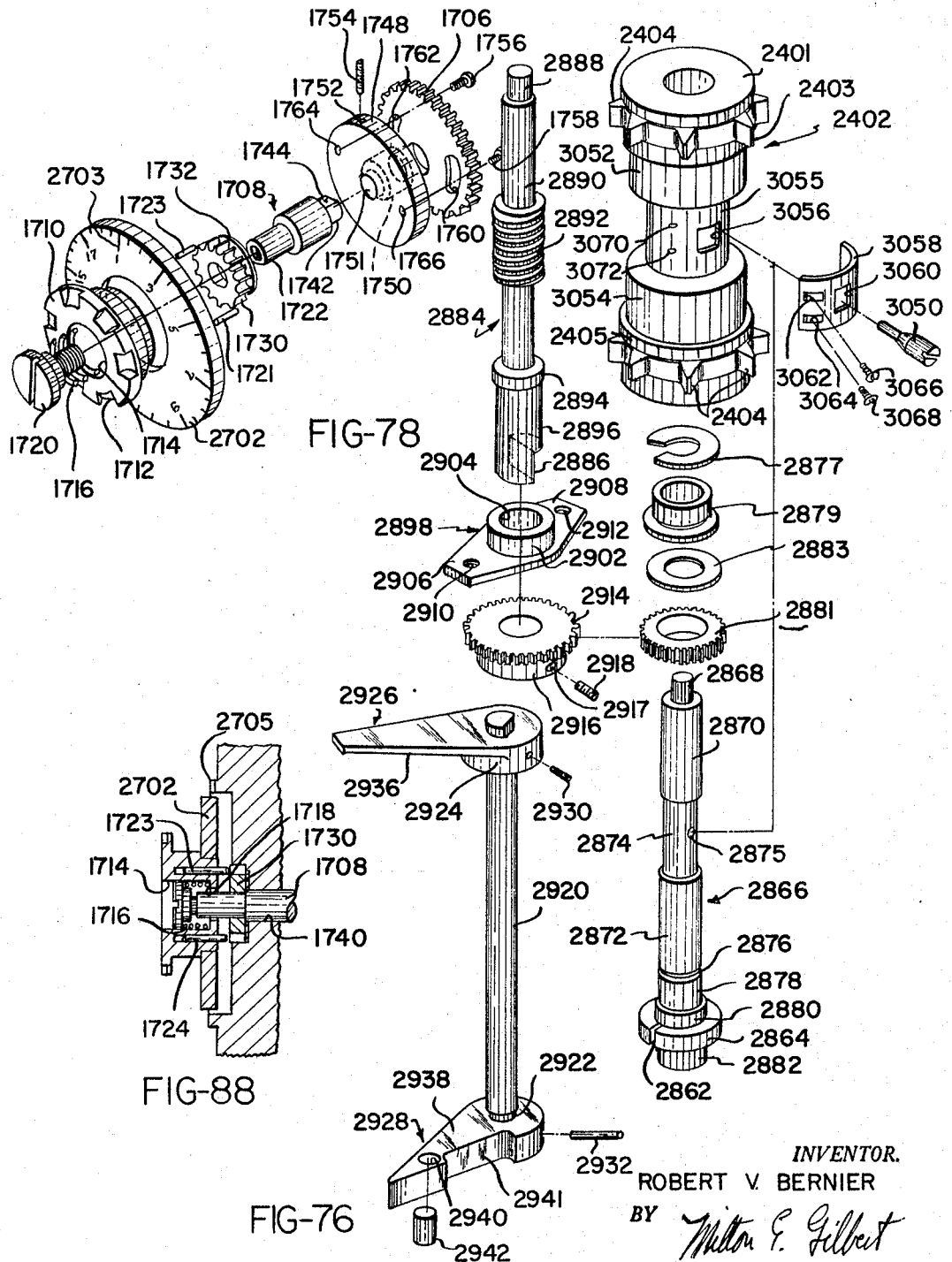

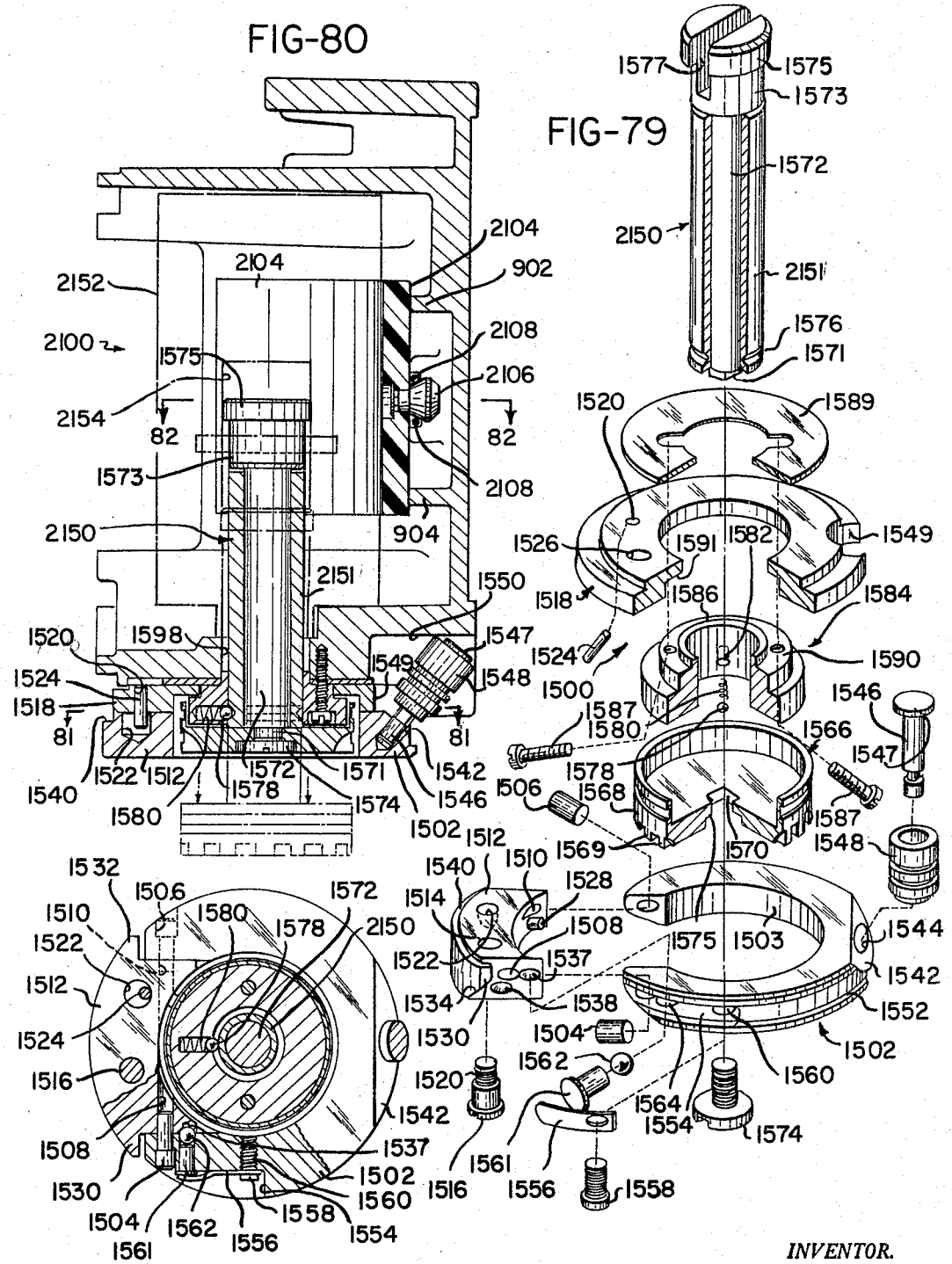

Aug. 30, 1966  R. V. BERNIER  3,269,291
STEREOSCOPIC CAMERA
Filed June 29, 1961  36 Sheets-Sheet 34
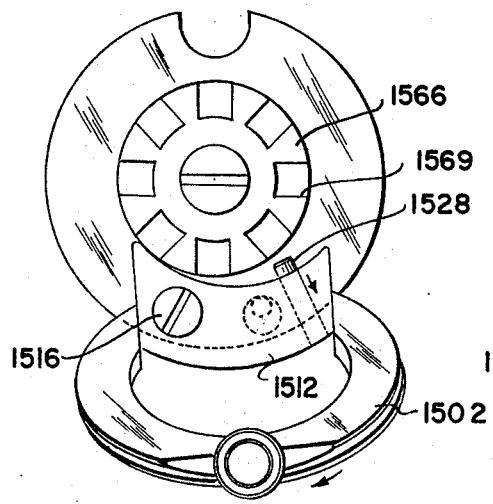
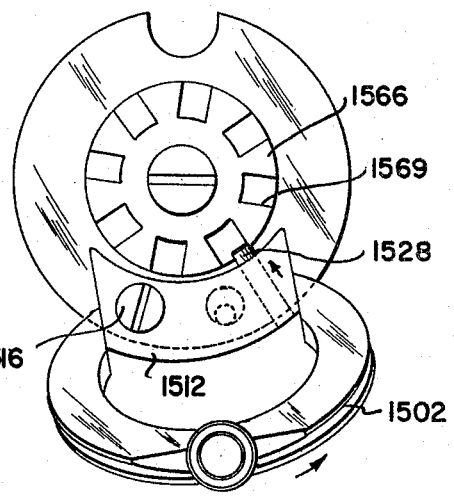
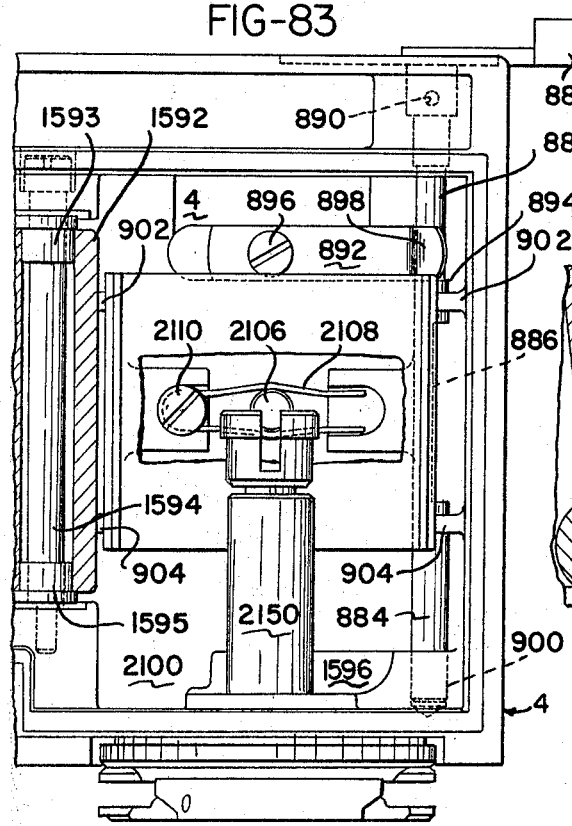
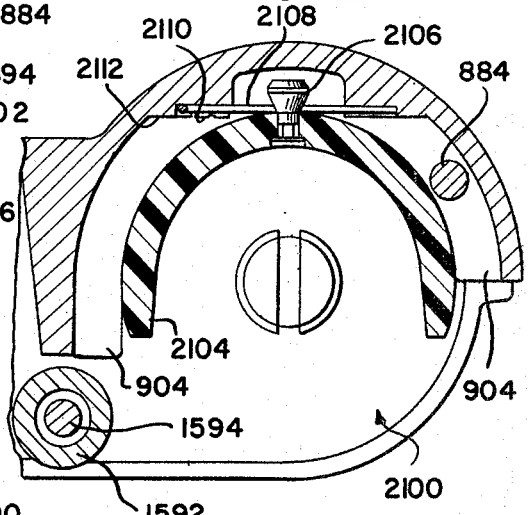
INVENTOR.
ROBERT V. BERNIER
BY Milton E. Gilbert
ATTORNEY Aug. 30, 1966  R. V. BERNIER  3,269,291
STEREOSCOPIC CAMERA
Filed June 29, 1961  36 Sheets-Sheet 35

INVENTOR.
ROBERT V. BERNIER
BY
Milton E. Gilbert
ATTORNEY

Aug. 30, 1966 R. V. BERNIER 3,269,291
STEREOSCOPIC CAMERA
Filed June 29, 1961 36 Sheets-Sheet 36

INVENTOR.
ROBERT V. BERNIER
BY *Milton F. Gilbert*
ATTORNEY

United States Patent Office 3,269,291
Patented August 30, 1966

3,269,291
STEREOSCOPIC CAMERA
Robert V. Bernier, Dayton, Ohio, assignor to Globe Industries, Inc., Dayton, Ohio, a corporation of Ohio
Filed June 29, 1961, Ser. No. 128,617
51 Claims. (Cl. 95—15)

This invention relates to the art of stereoscopy, and is more particularly concerned with a stereoscopic camera. The invention is more specifically directed to a stereoscopic camera that produces stereoscopic picture pairs, that when viewed effect a normal field of binocular vision.

Binocular vision implies the seeing of natural objects in relief and relates to the properties of the human eyes which enable the relief, distance and perspective effects to be experienced. Stereoscopy relates to the artificial reproduction of similar effects with the aid of suitable photographs, and usually with special viewing apparatus for merging or combining the photographs. The fact of the dissimilarity of the images seen by the two eyes has been known for quite some time; and even before the invention of photography, the principle of stereoscopy was applied by combining slightly different drawings of objects and employing prisms and mirrors to obtain the impression of relief similar to that experienced in binocular vision. The stereoscope was then developed which produced the illusion of relief or three-dimensional effect, by the artificial combination of two dissimilar plane representations of an object. Initial attempts at creating the stereoscopic relief effect by photography was accomplished by the use of a single lens camera that was moved sideways between two exposures through a distance of about 2½ inches (the interocular distance). It has been only a little over a century ago that the first stereoscopic camera employing twin lenses was devised, in which the simultaneous focusing of the lenses was effected by a rack and pinion movement; the exposures being made simultaneously upon a single plate, with the pictures being separated. These initial attempts at creating stereoscopic cameras which approached true binocular effect did not take into account the many properties of the human eye such as the eye's rotary movement. Thus, the complete spherical ball system containing the cornea and crystalline lens can rotate in its socket so that the optical axes of the two eyes can be directed in any direction and to any distance within the limits of movement (the normal field of vision being approximately 180°).

Since the separation or distance apart of the human eyes is 63 to 69 millimeters, or about 2½ to 2¾ inches, in stereoscopic cameras the equivalent lens separation has been made roughly equivalent to this interpupilary distance. However, even by so locating the lens, the field of vision encompassed by the prior known stereoscopic cameras usually includes only the field of binocular vision; thus not presenting a true realistic binocular effect, since the field of view outside the field of binocular vision has been omitted from the photographic capability of prior known cameras. Binocular vision is only possible within a conical region of approximately 90°, this region being determined by the overlapped fields of view of the two eyes. However, even though the true binocular effect is obtained only in this restricted region, each normal eye will still observe a monocular vision in the region outside of this binocular field of vision and to the full extent of one's field of view. It is therefore one object of the invention to provide a stereoscopic camera that enables photographing with the stereoscopic effect over a field of vision exceeding the normal binocular field of vision in the human.

It is essential that the definition of all parts of the subject from the nearest plane of interest to the most remote one, or to infinity, should be very good, since in stereoscopic viewing the eyes scan all parts of a picture in turn. Therefore, lenses employed in stereoscopic cameras must be capable of giving excellent definition at all parts of the film and at all apertures provided. An additional requirement of stereoscopic cameras is that the lens panels be maintained rigid in relation to the film holder. Otherwise, any vibration, or even the act of releasing the shutter, would cause a movement of the image of the plate. Thus, it would not be expected that employing rotatable lenses in a stereoscopic camera would provide vibration-free or clear images.

In stereoscopic cameras which employ shutters, the majority of such cameras employ sector or sliding plate type shutter mechanisms between the lens elements. Owing to such construction, and to the inertia of the relatively heavy parts employed, shorter exposures cannot be obtained. In those cameras employing focal plane type shutters rapid photography is readily obtained; however, such cameras usually exhibit inability to give a slower or instantaneous speed without increasing the slit width in the range below about ⅕ second. It is therefore another object of the invention to provide a stereoscopic camera which provides means enabling the taking of both timed and instantaneous exposures without requiring an increase in the slit width.

Several well-known stereoscopic cameras require the film to be transported in such a manner that one picture of the next adjacent stereo pair lies between those of an actual stereo pair being exposed. Such an arrangement makes the cutting and mounting of the images complicated, since the respective stereo image pairs may not be readily ascertainable. It is therefore a further object of the invention to provide a stereo camera in which the stereo image pairs are consecutively located on the film roll.

In a recently developed stereo camera a pair of lenses are mounted to revolve about a common axis, the lenses being fixed on an external rotating housing. In such device, both film frames are curved around a common cylindrical surface so that the film will lie flat without bulging during exposure. Since the cylinder of such camera containing the supply and take-up spools occupies a position at the center of the pivot of the lens housing, it is thus mechanically difficult to pivot the lens housing in a friction-free manner. Such device can thus not accomplish the desired objective of operating with a minimum of friction in order to obtain both high speed and time exposures.

Since both lenses, prisms and housing therefore are displaced an appreciable distance from their pivot axes, such condition introduces a considerable amount of inertia which must be overcome in order to obtain an instantaneous exposure.

In order to minimize image movement on the film, the lenses must be located at a distance of twice their focal length from their common axes of rotation. In the prior art device, the lenses must direct their images through 45° prisms onto the film, in order to get a displaced view point. Such prior device therefore is not capable of instantaneous exposures at high speed, because of the increased inertia caused by this double extended position of the lenses from their axes of rotation. A changing viewpoint is also introduced by the fact that the lenses change their position as they revolve around the perimeter of the common cylinder. This changing viewpoint causes an appreciable differential image movement for objects at different distances, resulting in poor image resolution on the film. It is therefore another object of the invention to provide a stereoscopic camera employing rotatable lenses wherein the second principal axis of each lens revolves coincident with the rotational axis of the system, to prevent the introduction of a changing viewpoint and enabling instantaneous exposure at high speeds.

Since, in the said prior known device the lenses are fixed externally on a rotating housing, the use of filters attached to such lenses changes the moment of inertia of such lenses and therefore the instantaneous exposure characteristics. It is a further object of the invention to provide a stereoscopic camera wherein the filters are internally located in such manner that the moment of inertia of the lenses is not appreciably increased and the instantaneous exposure characteristics remain unaffected.

Early panoramic cameras included a clock spring drive through a gear train to rotate the camera body. When the camera body with its integral lens is rotated, the image in the focal plane area is also moved. To compensate for this motion, i.e. image compensation, the film must also be moved so that any point on the film is coincident with any one image point. This problem of image compensation required the driving of both camera and film in a synchronous manner, which required an interlocking gear system. However, the resolution found in such devices has not been generally acceptable as compared with that obtainable with two-dimensional photography. Therefore, in order to move or rotate a lens such that the image remains stationary, as indicated above, the lens must rotate on its second principal axis or second nodal point. It is therefore an object of the invention to provide a stereoscopic camera in which lenses are rotated on their second nodal point with substantially no variation and the film remains stationary, whereby high resolution is obtained.

In those prior art devices where the lenses are bodily rotated, image compensation has at times been attempted by the employment of complicated prism systems. It is a further object of the invention to provide a stereo camera which does not require special means for image compensation such as the employment of complicated prism systems.

A further object of the invention is to provide a stereoscopic panoramic camera employing revolving lenses and a curved stationary film bed, in which light trap means are provided for preventing transmission of light around the periphery of the revolving lens housings.

A further object of the invention is to provide a stereoscopic panoramic camera employing revolving lenses in which filters are provided internally within the camera and within the lens housings.

A still further object of the invention is to provide in a stereoscopic camera employing revolving lenses, means for stopping the lens assemblies when revolving at high speed at the end of their exposure without breaking or jarring loose the mechanisms contained therein.

Since the film plane is horizontally moved and since lenses are usually corrected for a flat field, it is another object of the invention to provide a stereoscopic panoramic camera employing cat's eye irises which are arranged to be elongated in the vertical direction, thereby reducing the horizontal width of the circle of confusion and providing higher resolution than would otherwise be possible on a horizontally curved film.

A further object of the invention is to provide in a stereoscopic panoramic camera employing revolving lenses, a means for accomplishing uniform drive of the lenses in such manner that streakiness or horizontal lack of uniformity caused by variations in the travel of the lens is avoided.

Another object of the invention is to provide a stereoscopic camera providing a broad, horizontal format approximating or exceeding the view seen by the human eyes.

Figure 32:
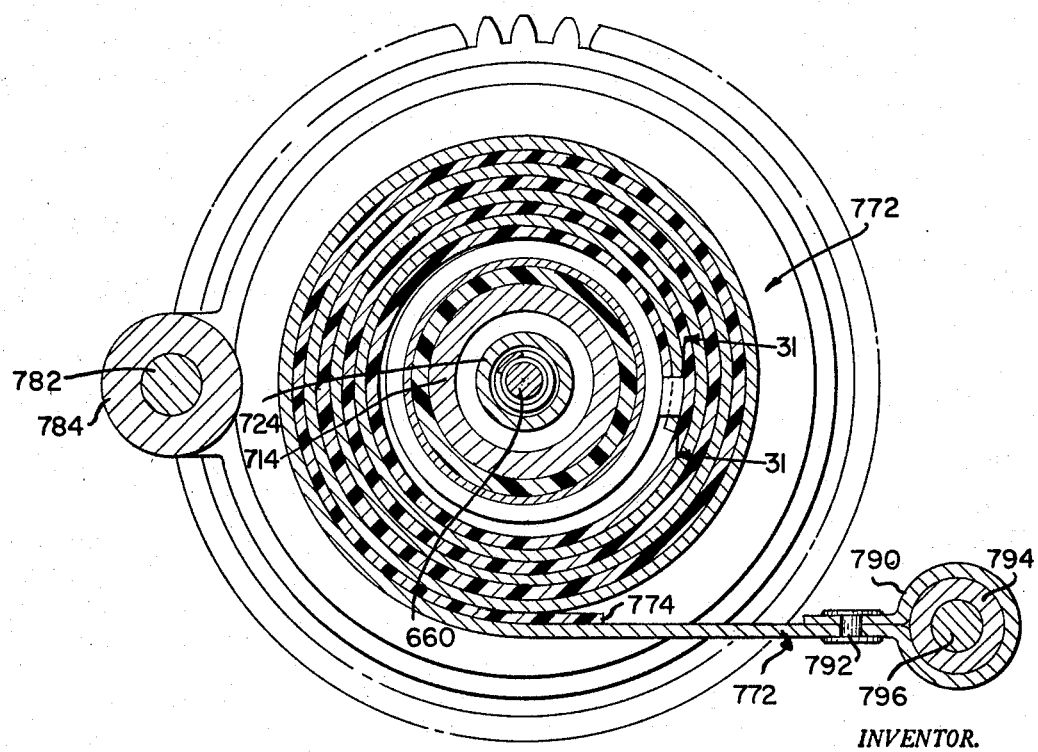
Figure 38:
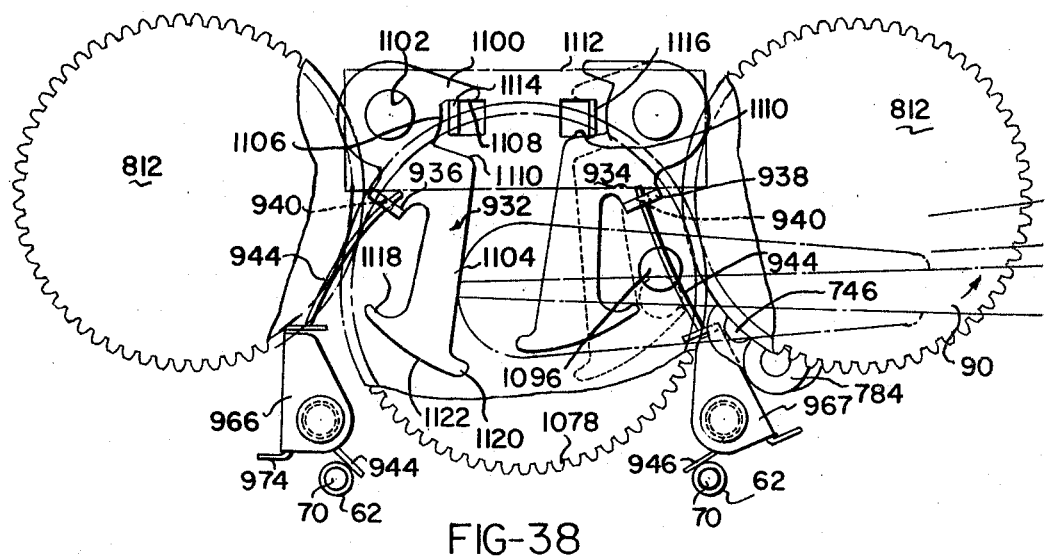
Figure 39:
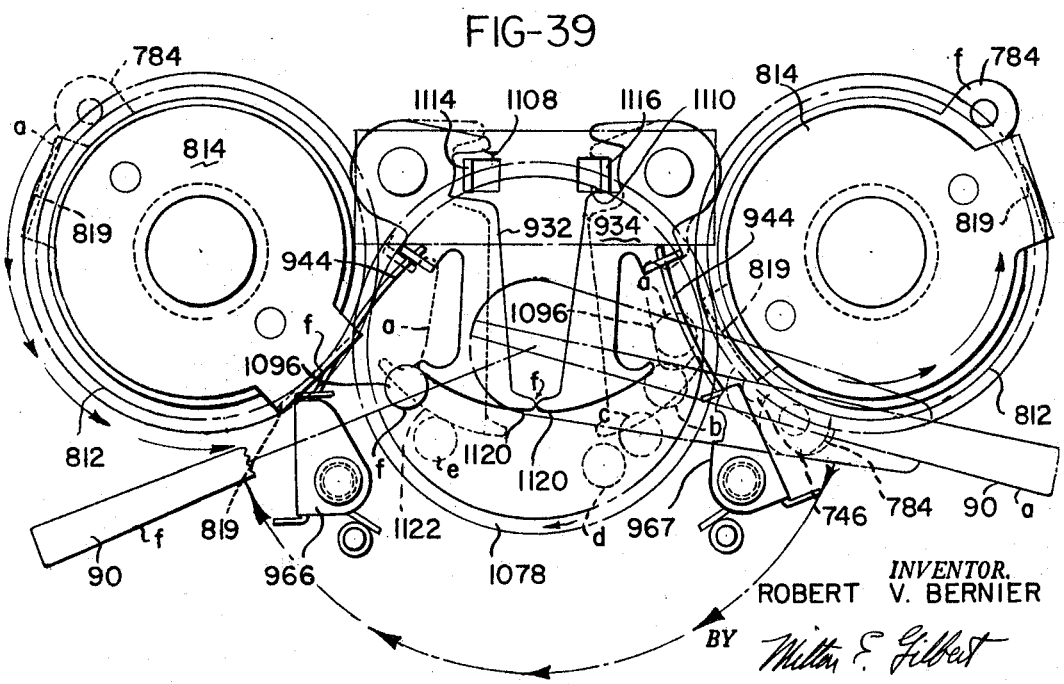
Figure 40:
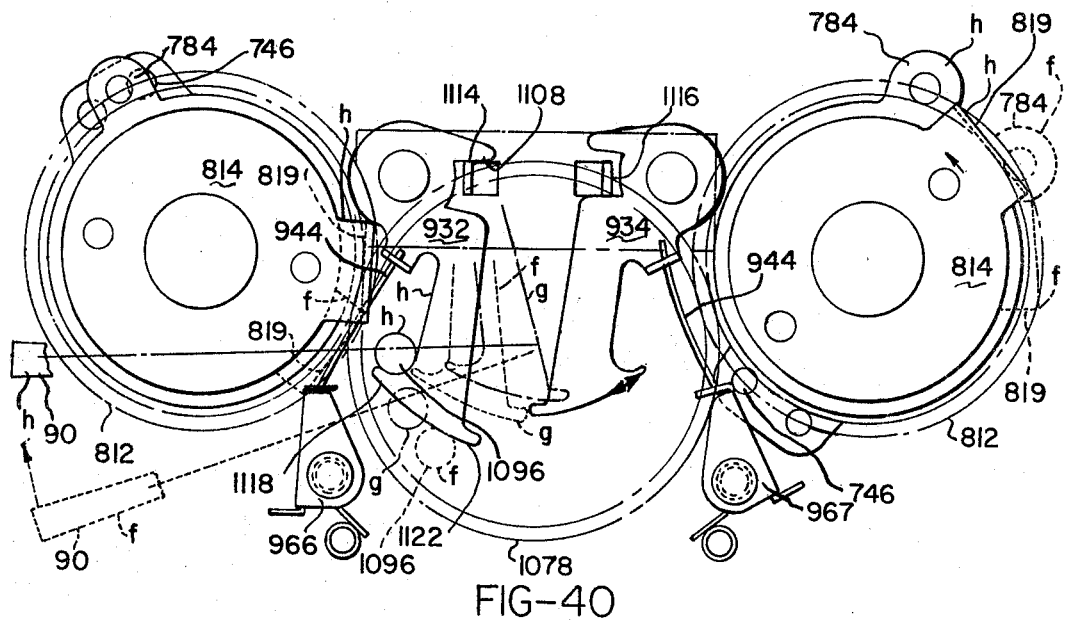
Figure 41:
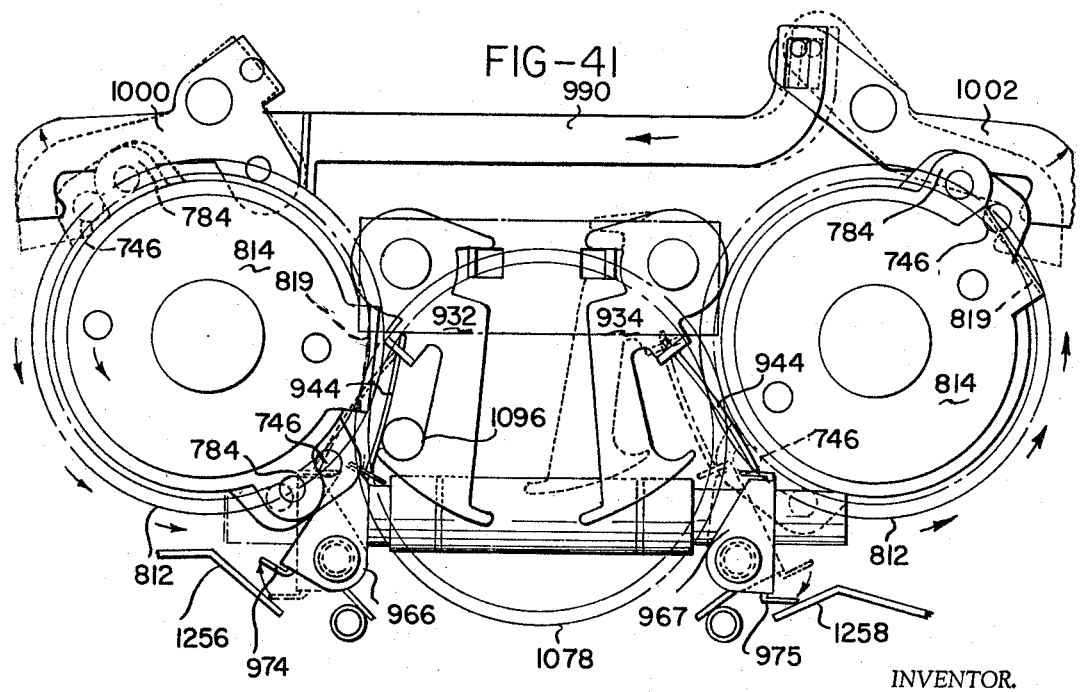
Figure 52:
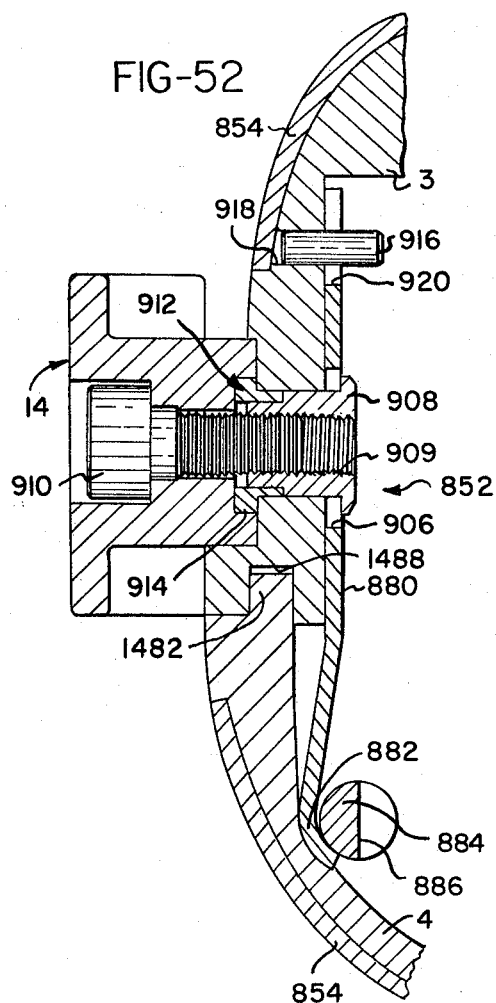
Figure 54:
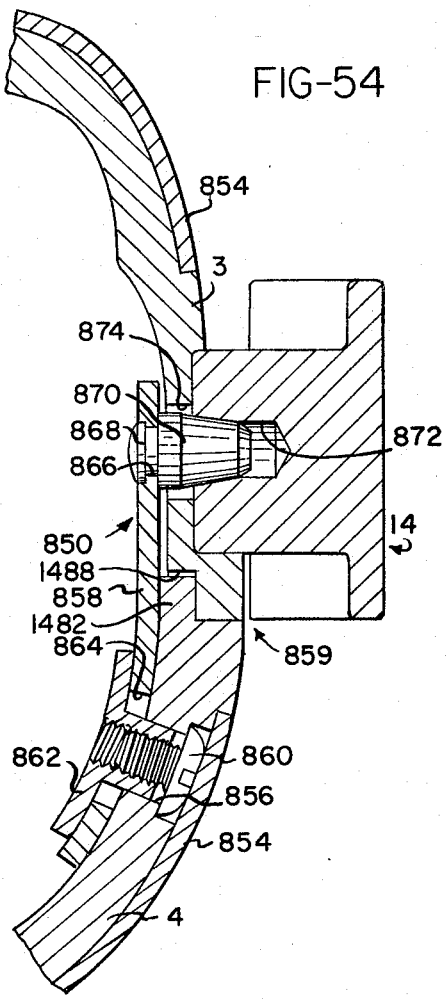
Figure 58:
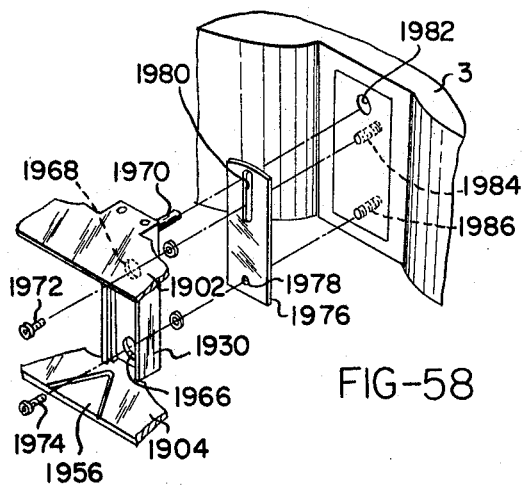
Figure 53:
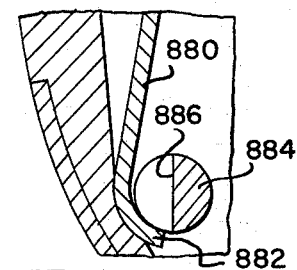
Figure 62:
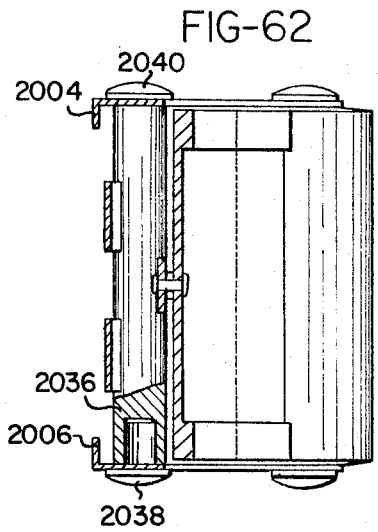
Figure 61:
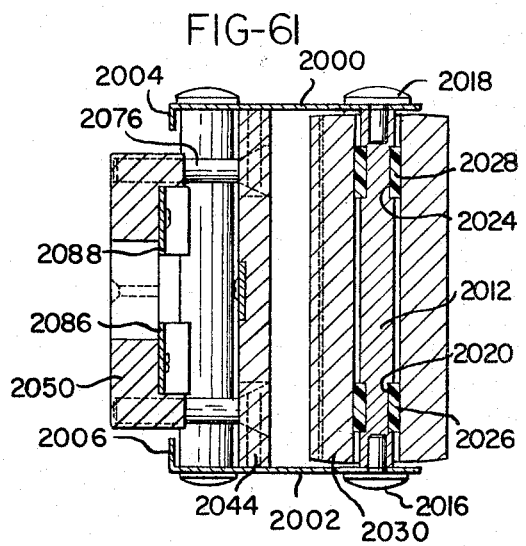
Figure 86:
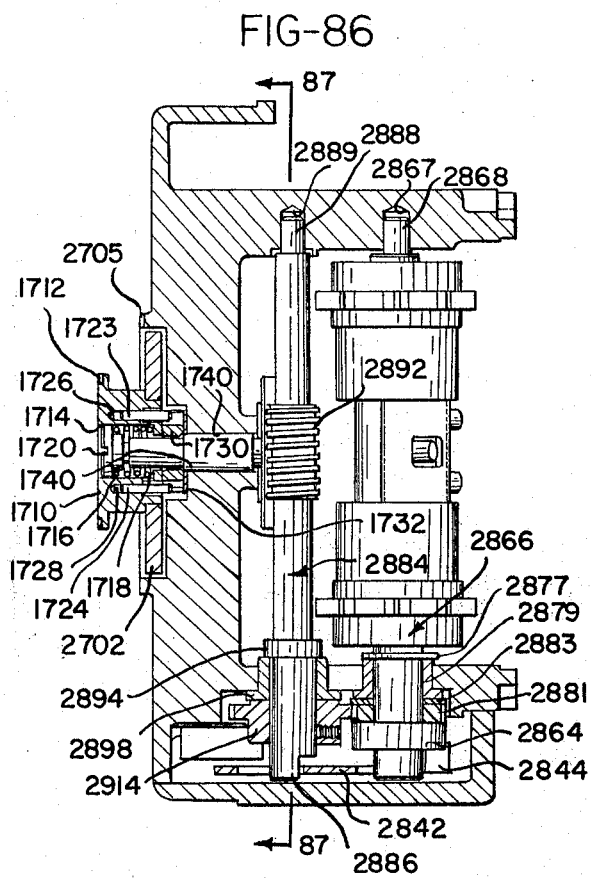
Figure 87:
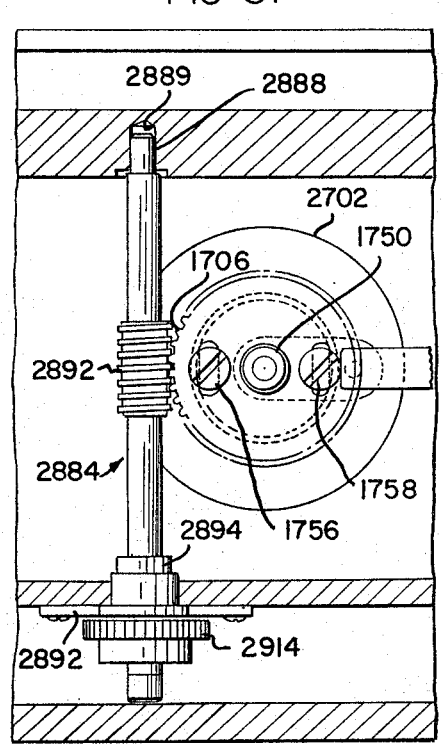

These and further objects of the invention will become more readily apparent upon a reading of the description following hereinafter, and upon an examination of the drawings, in which:

FIGURE 1 is a perspective view of the novel stereoscopic panoramic camera of the invention, FIGURE 2 is a front view of the camera front housing, FIGURE 3 is a rear view of the camera front housing, FIGURE 4 is a top view of the camera front housing, FIGURE 5 is a partial cross-sectional view taken along line 5—5 of FIGURE 1, FIGURE 6 is a cross-sectional view taken along line 6—6 of FIGURE 2, FIGURE 7 is an exploded perspective view of the lens port cover hinge shown in FIGURE 6, FIGURE 8 is an exploded perspective view of a portion of the lens port cover actuating means shown in FIGURE 5, FIGURE 9 is an exploded perspective view of a lens drum assembly and associated parts, FIGURE 10 is a front view of the camera of the invention with the front housing removed, FIGURE 11 is a cross-sectional view taken along line 11—11 of FIGURE 10, FIGURE 12 is a cross-sectional view taken along line 12—12 of FIGURE 10, FIGURE 13 is an enlarged view, partially in cross-section of a portion of FIGURE 10, depicting the mounting arrangement of a light trap shoe, FIGURE 14 is a cross-sectional view taken horizontally through the center of a lens drum shell assembly, FIGURE 15 is a cross-sectional view taken vertically through the lens drum with all internal mechanisms assembled and portions of the camera housings cooperating therewith, FIGURE 16 is a cross-sectional view of the filter housing taken along line 16—16 of FIGURE 20, FIGURE 17 is an enlarged cross-sectional view taken longitudinally through the filter housing and assembly, FIGURE 18 is a perspective view of the outer filter and filter holder, FIGURE 19 is a perspective view of the inner filter and filter holder, FIGURE 20 is a rear view of the filter housing and assembly, FIGURE 21 is a cross-sectional view taken along line 21—21 of FIGURE 15, FIGURE 22 is an enlarged view similar to FIGURE 20 showing some elements in phantom, FIGURE 23 is an exploded perspective view of the filter selector operating mechanism, FIGURES 24, 25, and 26 are schematic views showing the several operative positions of the filter selector arms, FIGURE 27 is a cross-sectional view taken along line 27—27 of FIGURE 15, FIGURE 28 is a cross-sectional view taken along line 28—28 of FIGURE 27, FIGURE 29 is a partially exploded view in perspective of the lens column and assembly, depicting the iris mechanism, FIGURE 30 is a cross-sectional view taken along line 30—30 of FIGURE 36, FIGURE 31 is a view taken along line 31—31 of FIGURE 32, FIGURE 32 is a cross-sectional view taken along line 32—32 of FIGURE 27, FIGURE 33 is an exploded perspective view of a portion of the lens drum drive mechanism, FIGURE 34 is a cross-sectional view taken along line 34 of FIGURE 27, FIGURE 35 is a perspective view, partially in cross-section of the pneumatic arrestor for the lens drum, FIGURE 36 is a cross-sectional view taken along line 36—36 of FIGURE 10, FIGURE 37 is a cross-sectional view taken along line 37—37 of FIGURE 36, FIGURE 38 is a plan view of a portion of the device shown in FIGURE 36 in the unlocked position at the commencement of the cocking action, FIGURE 39 is a view similar to FIGURE 38 but showing the first portion of the cocking action, FIGURE 40 is a view similar to FIGURE 38 but showing the parts in cocked position, FIGURE 41 is a view similar to FIGURE 38 but showing the parts at the instant of actuation of the exposure release button, FIGURE 42 is a perspective view, partially in cross-section, of the exposure release button and anti-double exposure mechanism, FIGURE 43 is a cross-sectional view taken along line 43—43 of FIGURE 42, FIGURE 44 is a side view of a portion of FIGURE 42, FIGURE 45 is a cross-sectional view taken along line 45—45 of FIGURE 44, FIGURE 46 is a cross-sectional view taken partially along line 46—46 of FIGURE 1, FIGURE 47 is a cross-sectional view through the pneumatic regulator and associated lens drum rotational speed control mechanism, FIGURE 48 is a bottom view of the pneumatic regulator, partially in cross-section, FIGURE 49 is a schematic view illustrating the operational characteristics of the metering cylinder and piston, FIGURE 50 is a further enlarged cross-sectional view of the piston shown in FIGURE 48, FIGURE 51 is a top view of the camera with portions thereof shown in cross-section, FIGURE 52 is a cross-sectional view through one end of the camera showing the interlocking of the main and rear housings, FIGURE 53 is a cross-sectional view of a portion of FIGURE 52, showing a different operational position, FIGURE 54 is a cross-sectional view through the other end of the camera showing the hinging of the main and rear housings, FIGURE 55 is a front view of the camera rear housing or magazine, FIGURE 56 is a rear view of the camera rear housing or magazine, FIGURE 57 is an exploded perspective view showing the film bed, film pressure assembly and focusing mechanisms, FIGURE 58 is an exploded perspective view of a portion of the film bed mounting, FIGURE 59 is a front view of the film pressure assembly, FIGURE 60 is a view taken along line 60—60 of FIGURE 59, FIGURE 61 is a cross-sectional view taken along line 61—61 of FIGURE 60, FIGURE 62 is a cross-sectional view taken along line 62—62 of FIGURE 60, FIGURE 63 is a plan view of the film advance release button and associated mechanism, FIGURE 64 is an exploded perspective view of the film container, film advance and film rewind mechanisms located in the film take-up end of the magazine, FIGURE 65 is a cross-sectional view through the take-up end of the magazine, FIGURE 66 is a cross-sectional view taken along line 66—66 of FIGURE 65, FIGURE 67 is a cross-sectional view taken along line 67—67 of FIGURE 65, FIGURE 68 is a cross-sectional view through the take-up end of the magazine showing the film path into the take-up spindle, FIGURE 69 is a plan view of the take-up end of the magazine showing the attitude of parts when actuating the film advance release button, FIGURE 70 is a top view partially in cross-section showing the spring loading of the metering sprocket lock arm, FIGURE 71 is a view similar to FIGURE 69 showing the attitude of parts after one revolution of the metering sprocket during film advance, FIGURE 72 is a view similar to FIGURE 69 showing the attitude of parts after two revolutions of the metering sprocket during film advance, FIGURE 73 is a view similar to FIGURE 69 showing the attitude of parts after three revolutions of the metering sprocket during film advance, FIGURE 74 is a view similar to FIGURE 69 showing the attitude of parts after four revolutions of the metering sprocket during film advance, FIGURE 75 is a view similar to FIGURE 69 showing the attitude of parts in rewind position, FIGURE 76 is a perspective view of the rapid transport clutch release arms, FIGURE 77 is a cross-sectional view taken along line 77—77 of FIGURE 65 showing the attitude of parts in rewind setting, FIGURE 78 is an exploded view of the film sprocket, metering mechanism and frame counter mechanism, FIGURE 79 is an exploded perspective view of the rapid rewind mechanism, FIGURE 80 is a cross-sectional view of the supply chamber end of the magazine, FIGURE 81 is a cross-sectional view taken along line 81—81 of FIGURE 80, FIGURE 82 is a cross-sectional view taken along line 82—82 of FIGURE 80, FIGURE 83 is a plan view partially in cross-section of the supply chamber end of the magazine, FIGURE 84 is a perspective view of a portion of the rapid rewind mechanism showing the crank arm in inoperative position, FIGURE 85 is a view similar to FIGURE 84 but showing the crank arm in operative position, FIGURE 86 is a cross-sectional view taken along line 86—86 of FIGURE 56, FIGURE 87 is a cross-sectional view taken along line 87—87 of FIGURE 86.

Figures 89A, 89B:
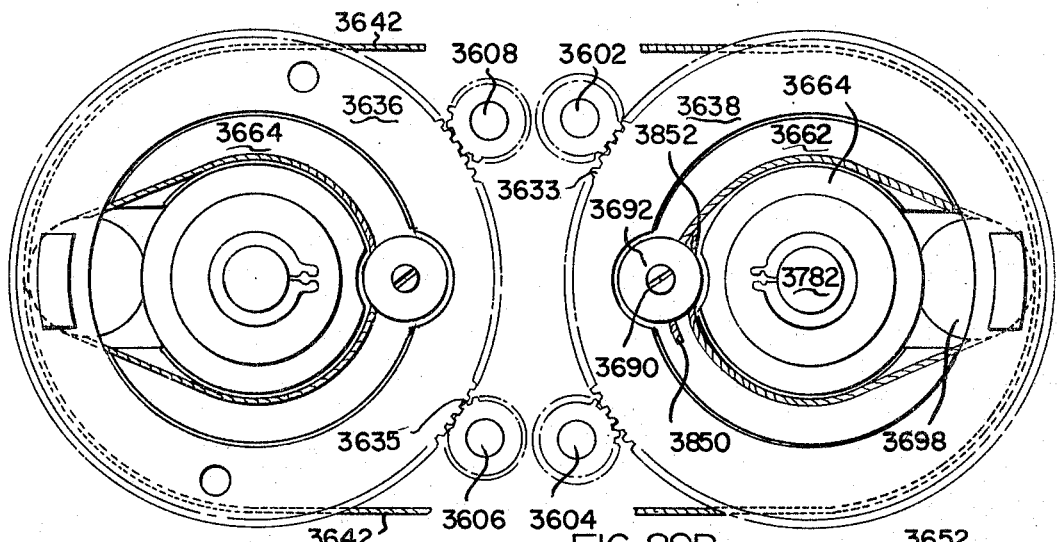
Figure 90:
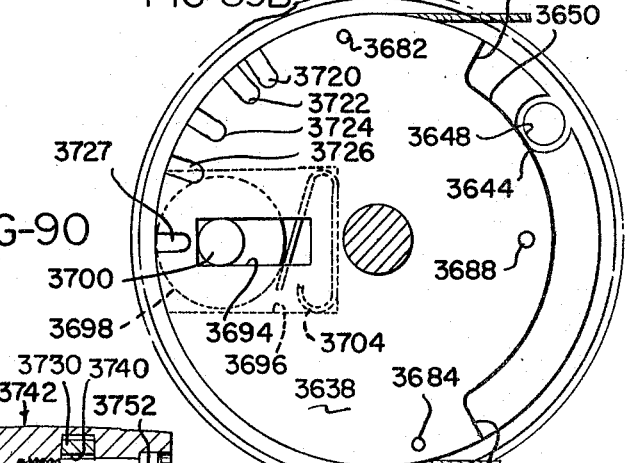
Figures 91, 92:
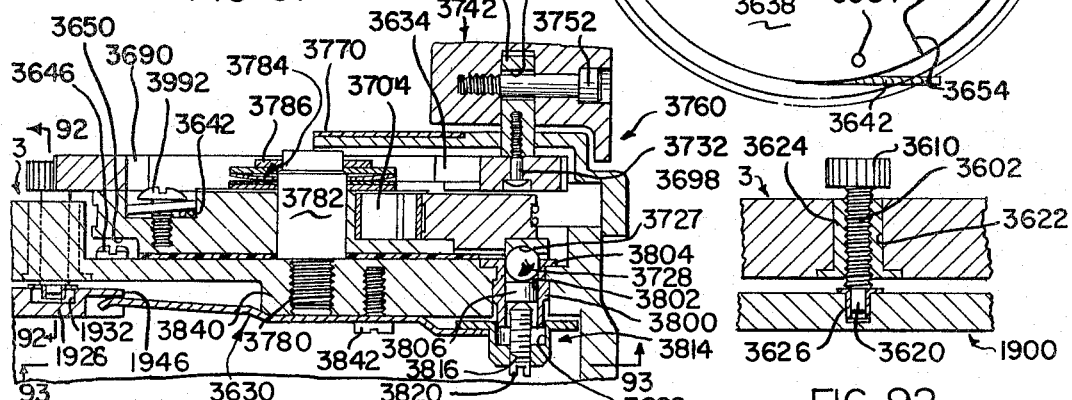
Figure 93:
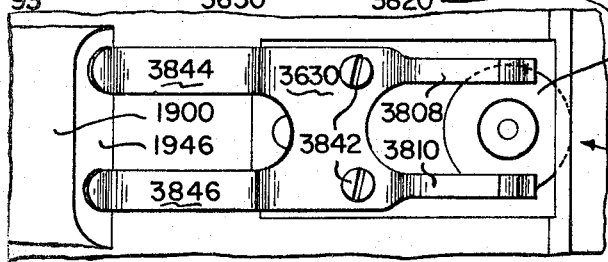
Figure 95:
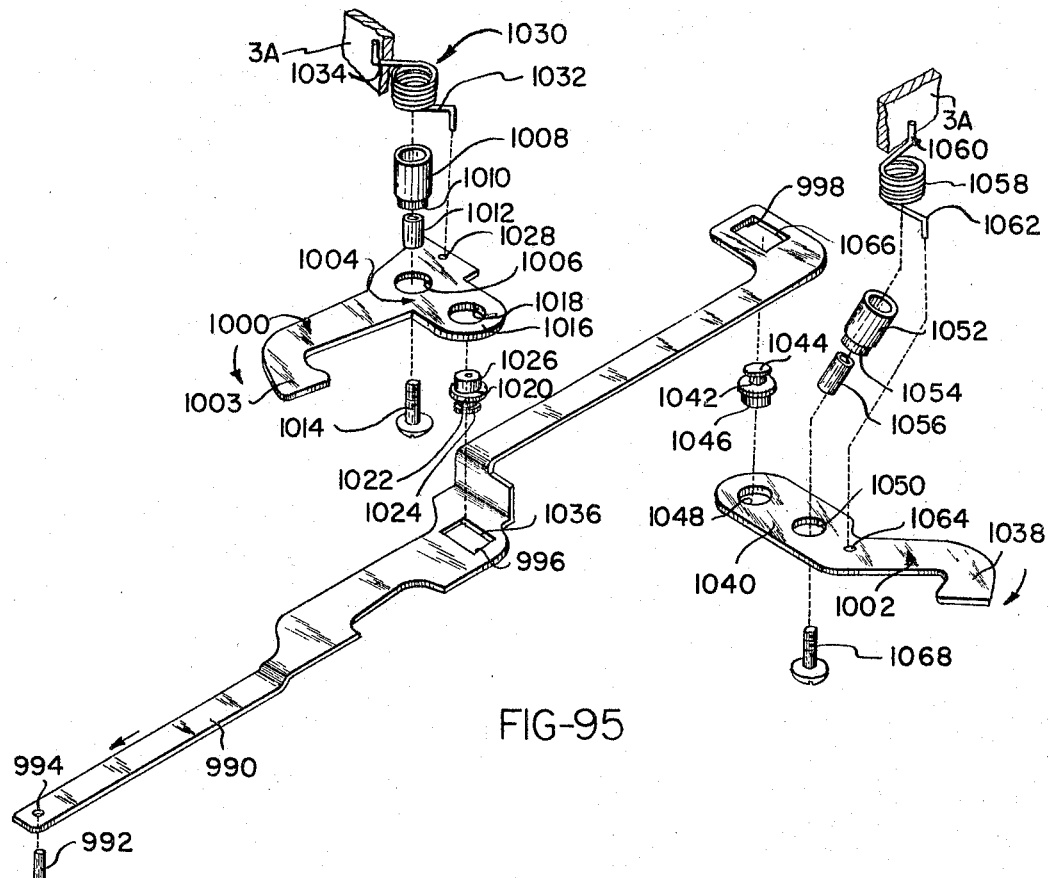
Figure 94:
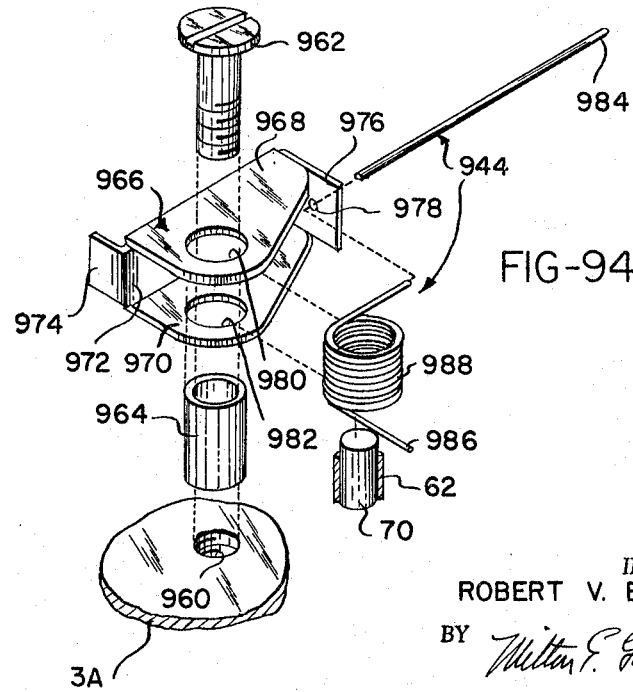

FIGURE 88 is a cross-sectional view of the frame counter dial indicating the manual resetting operation, FIGURE 89A is a plan view of the cable and left end drum mounting arrangement, FIGURE 89B is a plan view of the cable and right end drum mounting arrangement coordinate to FIGURE 89A, FIGURE 90 is a bottom view of a focusing drum, FIGURE 91 is a cross-sectional view taken along line 91—91 of FIGURE 10, FIGURE 92 is a cross-sectional view taken along line 92—92 of FIGURE 91, FIGURE 93 is a view taken along line 93—93 of FIGURE 91, FIGURE 94 is an exploded view of a latch spring arm, and associated elements, FIGURE 95 is an exploded view of the exposure release arm and trigger, arms, and FIGURE 96 is a plan view of a portion of film employed in the camera of the invention.

The camera of the invention is a stereoscopic panoramic camera. Twin revolving lenses are employed with a double curve stationary film bed. The lenses are mounted within cylindrical lens drums or housings and a light trap condition is provided around the periphery of the revolving spherical lens drums by means of shoes which are automatically operated by an arm on each of the lens columns, causing the shoes to open away from the lens drums to provide frictionless operation during the film exposure and to be actuated into lens drum contacting position between exposure periods. The housing of the camera is also provided with lens port covers to additionally prevent light from reflecting or passing around the drums during the long periods when the camera may be loaded with film but exposures are not taking place. Such lens port covers are provided to be automatically opened or manually opened just prior to taking pictures. The camera of the invention is further provided with a focusing mechanism especially useful for close-up photography. The lenses are located at the axis of each lens drum sphere, which is provided with a front and rear opening to transmit light through the lens to the film.

Additionally, the lens drum housings internally contain filters and portions of filter selector mechanisms enabling the selection of several filter combinations without changing the moment of inertia of such lens drums. These filters are arranged for quick selection and they can be caused to drop down in place over the lens; and where not desired, to remain captive above the lens in channels provided therefore. Additionally, the camera of the invention provides a high speed rotation for the lens drum assemblies with means for stopping the rotation at the end of the exposure without damaging the mechanism. A pneumatic arrestor means is provided for decelerating lens drum motion without jarring loose the mechanism. With respect to the focusing mechanism, short focal length lenses are employed having a focal length of approximately 32 millimeters in one instance; thus alleviating the absolute need for such focusing mechanism at medium and long-range photography, and for some close-up photography.

The camera is further provided with an iris control and actuating mechanism operated by pins extending through hollow pivot shafts into the lens drum assembly. The iris is formed by a pair of leaves in such shape as to present a cat's eye iris opening. The cat's eye iris opening is thus elongated in the vertical direction when the leaves are partially closed, and presents a circular opening when the leaves are fully open. Such construction reduces the horizontal width of the circle of confusion on the film. Reduction of the circle of confusion in a horizontal direction thus provides for higher resolution on the curved film than would otherwise be obtainable with a circular opening of the iris mechanism.

A pneumatic regulating cylinder controlling the passage of air through an orifice controls the scanning process which eliminates non-uniform density in the panoramic picture. Such non-uniform density would be caused by lack of uniformity of exposure or variations in the rotational speed of the lens during the scanning process. Additionally, with such pneumatic regulator the camera provides means whereby the scanning mechanism and all moving parts are substantially friction free.

The lens drum assemblies are driven by independent clock spring drives which alternately serve to drive the drums in opposite directions. The lens drum openings are not required to be exposed or brought out into the open for cocking purposes which would necessitate occulting the lenses. This is made possible by the arrangement of the iris mechanism with respect to the lenses. The latter is such that, even with film within the camera, the lenses can be brought out into the open for cleaning purposes, since the cat's eye iris permits complete light closure of the iris opening.

Finally, the camera is of such nature that respective sub-assemblies are self-contained in their respective housings so that they can be readily disassembled, and become readily interlinked automatically for operation upon assembly.

As shown in FIGURE 1, camera of the invention comprises several interrelated mechanisms which will be described more fully in detail hereinafter, each portion of the camera being described under an appropriate sub-heading. The camera 1 comprises three main housing portions, a front housing 2 having a plastic cover 26 (see FIG. 5), a main housing 3 and a rear housing or film magazine 4. The front housing 2 contains the pair of lens port cover mechanisms 6, and also provides openings through which the lens drum assemblies 5 (of which there also are two) can present the slit openings 25. The main housing 3 contains the focusing mechanism 13; the exposure control button 11 and associated mechanisms; means 16 for attaching an exposure cable; a light meter 10, and a viewfinder 12 (the latter two being of conventional construction). The main housing also includes a flash receptacle 17 and an accessory bracket 14. This bracket would permit the fastening of a standard Kalart type flash gun and a hand carrying strap 15. It is to be understood that there are two such bracket mounts 14, one on each side of the camera, so that one or two flash guns can be mounted on either side, as desired. The brackets 14 are also each provided with an eyelet 18 which permits the fastening of a neck strap. The cocking lever and associated mechanism is indicated at 7; 8 indicates the exposure speed setting control and associated mechanism, and 9 indicates the coordinate pair of focusing control knobs and associated mechanism.

These above associated mechanisms and others will now be more fully described in detail.

*Lens port covers and associated mechanism*

As shown in FIGURES 1 and 2, the front housing 2 is readily removable and is fastened to the main housing of the camera as by four screws 30, 30, 30, 30. This front housing is of cast metal and as shown in FIGURES 2, 3, and 4, contains two lens port covers 32 and 34 which are identically mounted. The lens port covers serve to prevent fogging of the film while the camera may contain unexposed film for extended periods between film exposures. These lens port covers may be opened independently by the means to be described hereinafter, so that one can be opened and one remain closed for two-dimensional picture taking. If, for example, as shown in FIGURE 1 the left lens port cover were opened and the right lens port cover maintained closed, an exposure could be made that would expose only the left half of the film in the magazine. In order to then make a second two-dimensional picture, it would be necessary only to cock the camera again without transporting any film, and to close the left lens port cover that was previously opened, and then to open the right lens port cover in order to get a second two-dimensional picture. Thus, two two-dimensional pictures may be taken in the normal space on the film provided for taking a single three-dimensional picture.

Each lens port cover is similarly constructed and is similarly arranged to be latched into shut position by a means as shown in FIGURE 5 for the right lens port cover. Such means includes the latch pin 40 which is wedge shaped at the lower portion 43 to properly slide up and latch within a blind hole 44 in the lens port cover 32. This latch pin 40 slides within a bushing 38 which is pressed into the front housing, and which bushing contains a slotted flange 39 to permit a spring 42 to work therewithin. The spring 42 is passed loosely through a hole 41 in the upper portion of the latch pin 40 so that it can slide within the pin and serve to raise and lower it. The normal position of the pin is in the downwardly urged position as shown in FIGURE 5, which serves to retain the lens port covers closed as shown. The wedge portion 43 of the latch pin 40 permits the edge of the lens port cover to slide under it to raise it up against the action of the spring 42. In operation, the spring 42 will move slightly in and out of the hole 41 in the pin 40, since it operates on a radius; in permitting the pin to move up and down. The other end of the spring 42 is fitted into a slot 46 in the front housing 2, and the spring 42 has a leg 48 at right angles thereto to prevent the spring from rotating during operation. The spring is further anchored within the slot 46 by a screw 50.

The spring 42 is raised by a lever 52 which is freely rotatably mounted upon a shoulder bushing 54 which is in turn retained in place by a screw 56 threaded into the front housing 2. The lever 52 is provided with an upper and lower tab 58 and 60, respectively. The lower tab 58 serves to engage the spring 42 to raise it upwardly, whereas the upper tab 60 serves as a bearing surface for the lens port cover operating mechanism.

The operating mechanism is shown clearly in both FIGURES 5 and 8, and consists of a flanged bushing 62 which is pressed into the top main housing 3a. The bushing 62 contains a central bore 64 and an enlarged bore or chamber 66. The bushing 62 is internally threaded in its upper portion as at 68 and is provided with a lower tapered internal surface 80 at the bottom of the chamber 66. A slidable actuating pin 70 serves to contact the tab 60 on the lever 52 for lifting the spring 42 and the latch pin 40 out of contact with the lens port cover. The upper portion of the pin 70 is threaded as at 72 for engagement with a plastic button 74. This button 74 is internally threaded and has a flanged portion 78. Preferably, the button 74 is made of nylon, in order to resist wear that would occur because the top of the button will be constantly rubbing against the bottom of the cocking lever, as described hereinafter. Adjustment of the distance that the pin 70 is separated from the lever 52 can be accomplished by means of threaded engagement with the threads 72. The pin 70 is urged upwardly by a spring 76 which is captured between the flange 78 on the button 74 and the surface 80 on the bushing 62. The assembly is held together by a flanged bushing 82 which has an internal bore 86 which permits free sliding movement of the button 74. The bushing 82 has a lower threaded portion 84 which is threaded into the portion 68 of the lower bushing 62. Thus, the bushing 82 prevents the button 74 from popping out of the upper main housing 3A.

As shown in FIGURE 1, each of the buttons 74 and its associated lens port cover latch actuating mechanism is actuated each time that the cocking lever 90 is rotated, since the lever 90 will pass over both of the buttons 74, depressing them, and releasing the lens port covers. The cocking lever 90 is provided with a tapered recess 92 for the purpose of transmitting horizontal motion of the lever 90, to vertical motion of the buttons 74. This tapered recess 92 is provided on each side of the cocking lever, so that the buttons are actuated no matter in which direction the cocking lever is rotated.

The automatic actuation of the lens port covers into open position each time the camera is cocked serves to prevent the type of errors that would occur in slide cameras where the photographer forgets to remove the dark slide. The camera is thus always made available to take exposures since the lens port covers are continually urged to the open position and will reach the open position as indicated in FIGURE 1, as soon as a latch pin has been actuated. FIGURE 1 indicates a position wherein one of the lens port covers is open and the other is closed. It is obvious that in addition to actuation of the buttons 74 by the cocking lever 90, these buttons can be manually actuated to open either lens port cover at will. Also, the lens port covers are returned to closed latch positions manually, as desired.

As indicated above, the lens port covers are so hinged and spring loaded as to be continually urged into the open or outward position. The hinge construction is more clearly described and shown in FIGURES 6 and 7. The lens port cover 34 is shown in FIGURE 1 as being provided with two ears, an upper ear 100 and a lower ear 102. It is to be understood that both lens port covers are similarly constructed, and only the description of the hinging of the lens port cover 34 will be given. The upper ear 100 accommodates a flanged hinge pin 106 which is pressed into a bore 108 in the ear 100. This hinge pin 106 is also pressed into the bushing 110 so that the lens port cover ear 100, the pin 106 and the bushing 110 rotate integrally. This bushing 110 has the bore 112 into which the pin 106 is pressed, and also has a reduced tenon portion 114 which serves as a journal for rotation within the hole 116 in the front housing 2.

The lower ear 102 is provided with the bore 104 to accept a lower spring loaded hinge connection. This connection also includes a hinge pin 118 similar to the pin 106 which is pressed into the hole 104 and also pressed into the bushing 120. The bushing 120 which has the lower reduced diameter 122 is slotted at its lower end at 124. The bushing 120 fits within an upper cup-like member 126 which has the stepped groove 128 to provide a shoulder for locating the bushing 120. The cup member 126 has an internal bore providing the chamber 130. This member 126 is press fitted within a lower hollow housing 132 which provides an inner chamber 134. This lower housing 132 is provided with a screw slot 136 and a small hole 138. Housed within the chamber 130 is a circular torsion spring 140. This spring 140 has an upper diagonally oriented end 142 and a lower depending end 144. The upper end of the spring 142 fits within the slot 124 in the bushing 120; and the lower depending leg 144 extends into the hole 138 in the lower spring housing member 132. The bushing 120 serves as a pivot shaft for the lens port cover and it rotates within the upper housing 126 of the spring. The lower housing or spring cap 132 can be rotated by inserting a screwdriver in the slot 136 in order to adjust the spring load on the lens port cover. This adjusted spring load can be set by the set screw 146 threaded into a threaded opening 148 in the front housing 2. Rotation of the lower housing cap 132 not only determines the load under which the lens port cover is maintained, but also the vertical clearance of the lens port cover in the hinge brackets would be determined. Thus, in assembly, the upper hinge would first be inserted in the front housing and then the lower hinge would be inserted into its position and retained by inserting the spring sub-assembly 140, 126 and 132 into the opening 150 in the front housing 2 and adjusting and locking same with set screw 146. The front housing 2 is provided with a pair of locating holes 152 (only one being shown in FIGURE 6) which cooperate with locating pins in the main housing (such as pin 153 shown in FIGURE 10) in order to correctly orient the front housing into position prior to its assembly by the screws 30 into the main housing.

*Lens drum shell light trap*

FIGURE 9 shows the arrangement of the lens drum shells and associated mechanism in which the lens drum shells are each made of two approximately hemispherical parts 202 and 204, the upper surfaces 160 and 162 of each lens drum shell being provided with a pin 164 and 166, respectively. These pins serve to actuate lens light trap shoes as more clearly shown in FIGURE 10. Each lens drum has associated with it a pair of light trap shoes 168 and 170, which are similarly arranged for each lens drum. As shown in FIGURE 10, the lenses are oriented facing forwardly as during an exposure, so that the light trap shoes are arranged out of contact with the lens drum shells, thus removing any possibility of introducing frictional forces to impede the rotational movement of the drums. As shown more clearly in FIGURE 13, each light trap shoe comprises a shoe portion 170, with a shoe actuating arm 172 which is affixed to the shoe 170 as by eyelets 180. The nature of the shoe 170 is shown more clearly in FIGURE 12 wherein the shoe is of undulated shape providing two pockets 174 and 176 to receive light trap material such as mohair 175 and 177, respectively. An external groove or pocket 178 is provided into which the actuating arm 172 will be assembled and fastened together. The upper leg of the light trap shoe actuating arm 172 is provided with a hole 184, and the lower leg of the arm 172 is provided with a hole 182, to receive the pivot pins 188 and 186, respectively. These pivot pins may simply be screws which are threaded into the housing 2 and which have a lower reduced tenon portion which serves as the pivot. The light trap shoe assembly may thus pivot about the two opposed pins 186 and 188. The actuating arm 172 is caused to so pivot by actuating pins 164 and 166 on the lens drum shell as previously indicated. In FIGURE 11 this action is clearly shown wherein the two positions of extreme motion of these light trap shoe assemblies are shown. The upper leg of the light trap shoe actuating arm 172 is provided with a reduced extending tang portion 190 which is the portion contacted by the actuating pin 164. In one of the extreme positions of revolution of the lens drums shells, the pins will be brought into contact with one side of the tang 190, and in the opposite reciprocatory extreme position of the lens drum shells the opposite side of the tang 190 will be contacted by the pin 166, at which time the pin 164 will travel over to contact the underside of the right light trap shoe as viewed in FIGURE 11. The screws 186 and 188 serve to space the light trap shoe assembly away from any rubbing contact with the camera housing 3. When the shoe assemblies are not being actuated by the pins 164 and 166 the screws 186 and 188 also serve to locate the shoes out of contact with the lens drum shells 202 and 204. However, to assure a non-contacting condition at the exposure time it is necessary that both light trap shoe assemblies associated with a lens drum shell be spring loaded and operate conjointly. This is accomplished by interconnecting the pair of light trap shoe assemblies for a lens drum by a semicircular spring 194 which has hooked ends which are hooked about studs 192 mounted on the lower leg of the actuating arm 172 as shown more clearly in FIGURE 12. The spring 194 is spaced from and extended around the lens column, to hold the two light trap shoe assemblies in a spring loaded and interlocked arrangement. When not being actuated by the pins 164 and 166 both light trap shoes will rotate to a straight opposed position out of contact with the lens drum shells since tension is placed on the actuating arm at a point beyond its pivot point. FIGURE 12 shows the light trap shoes in tangential non-contacting relationship, with the light trap material 177 out of contact with the lens drum shell. At the opposite extreme portion of travel, as indicated in FIGURE 11, the light trapping material 175 will be placed in contact with the lens drum shell. When the pins 164 and 166 contact the tang portion 190 of the light trap shoe actuating arm, they will cock the light trap shoes in opposite directions causing the pockets with their associated light trap material to touch the lens drum shells and cut off the opening to prevent light from passing. During the exposure motion, i.e. during the rotation of the lens drum shell prior to the time when the pin contacts the actuating arm, the light trap shoe assemblies will assume a neutral non-contacting relationship so that the light trap shoes are spaced from the lens drum shells to permit the latter to freely rotate. Thus, only after the exposure has been completed, will the light trap shoes be brouhgt into a light trap contacting relationship with the lens drum shells. If any contact were made during the exposure by the light trap shoes upon the lens drum shells, it would be obvious that a variable scanning speed would occur, which in effect would cause streakiness in the exposed image.

As just indicated, no light trapping is accomplished by the light trap shoes during the exposure. This is permissible since the sockets into which the lens drum shells are assembled and in which they rotate are held to a minimum clearance and in addition are provided with light trap steps above and below the lens drum shells which serve to prevent all but a negligible amount of light from entering into the film magazine area of the camera during the exposure. The light trap shoe assemblies are necessary primarily only when the lens port covers are left open for any extended periods of time. The negligible amount of light that comes around the lens drum shells during an actual exposure is minute compared to the actual amount of light coming through the lens and exposing the film. This small negligible light leakage has not been found to appreciably effect fogging of the film. It is readily seen that if immediately after an exposure the lens port covers were to be closed, then light trap shoes would not be necessary. Since such an arrangement would not be practical, the light trap assemblies accomplish the desired function of preventing unwanted exposure of film.

*Lens drum shells and lenses*

The lens drum shells and lenses are shown more clearly in FIGURES 9, 14, and 15. As indicated in FIGURE 10, there are two such lens drum shell assemblies 5, 5, one of them being described in detail hereinafter. As indicated in FIGURE 15, the lens drums, in addition to containing the lenses, also contain a filter selector mechanism and iris actuating mechanism described in more detail hereafter.

As shown more clearly in FIGURE 9, the lens drum shells comprise two identical substantially hemispherical shells 202 and 204 which are fastened together by a pair of screws 205 and nuts 207. These lens drum shells have internal compartments to accept the various mechanisms. The lens drum shell 202 has assembled into it a plastic aperture slit housing 206 which is in the form of a generally cylindrical member having an inwardly extending flange 210 which will conform to the inner spherical surface of the shell 202. This slit aperture housing retains a slit aperture 208 having an aperture opening 212 of desired size (it being readily understood that slit apertures of various openings may be employed) which fits within an opening 214 in the lens drum shell. As shown in FIGURE 15, this aperture 208 provided with the aperture opening 212, has inwardly extending upper tab 216 and lower tab 218. The inwardly turned flange 210 on the aperture housing 216 serves as a means for retaining the spring-like aperture against outward movement as shown in FIGURE 15, since the tabs 216 and 218 will be locked around this flange 210. Additionally, the extreme upper and lower edges of the slit aperture 208 will be held underneath the inner surface of the lens drum shell 202. A similar opening 214 is provided in the lens drum shell 204, since as indicated previously the two shells are identically made, for admitting the maximum amount of light through the lenses to the slit openings. It is the slit openings which control the amount of the light image transmitted onto the film. The aperture slit housing 206 is retained in place by the lens column 200 which will bear against the inner end of this housing 206 in assembled position, as shown in FIGURE 15.

As stated above, the shells 202 and 204 are symmetrical. Each shell is provided on one side with a groove 222 and on the other side with a land 224. In assembly the lens drum shells are inverted so that a groove 222 of one lens drum shell will fit within and mate the land 224 of the opposite lens drum shell half. This assembly will accomplish a light trap condition around the joint area of the two shells. These two shells are held tightly in assembly by the screw 205 and nut 207 referred to previously. The nut 207 may preferably be made out of gear stock, so that once drawn into position in the plastic shell 202 it will remain in that position even though the screws 205 are thereafter removed for disassembly purposes. This is accomplished by relieving the center of pinion stock nut 207 and slitting the nut for approximately one half its length (not shown) to provide springlike portions which will tend to expand to a normal position when within the hole 226, and when drawn into seated position by the screw 205.

The two lens drum shells 202, 204, when assembled, will enclose within the opening 228, the filter selector mechanism 230 and the lens column 200.

As shown in FIGURE 15, the lens comprises two cells, i.e. a front cell 232 and a rear cell 234. The front cell contains the two lens elements 236 and 238, whereas the rear cell contains the lens element 240. As will be readily understood by those skilled in the art, the lens cell depicted is a standard three element camera objective lens. Appropriate spacer members 242 and 244 are provided to appropriately position the flanges of the lens cells 232 and 234, respectively, so that the lens cells are accurately positioned with respect to each other and to the lens column pivot axis with the second nodal point of the lens system being coincident with the pivot axis. Thus, image movement is eliminated since the pivot axis runs through this second nodal point. The lens cell 234 is threaded into the lens column as at 246 and the lens cell 232 is threaded into a ring or spacer 250, described hereinafter.

As shown in FIGURE 9, the lower portion of the lens column is closed by a dust cover 252 which is a semi-cylindrical band which is bent over at each end to form a spring-like grip onto the lower area of the lens column to close the assembly inspection opening 254 which leads to the filter selector operating mechanism. Additionally, this dust cover 252 fits within a groove 256 so that it is not readily separable without releasing the spring pressure against the lens column obtained by this member.

The lens column 200 is provided with an upper groove 260 and a lower groove 258. Mounted within these grooves are four pins, an upper pin 257 and a lower pin 256 being shown in FIGURE 9. These pins are 180° opposed to one another and serve as stop pins for the portions 262 and 264 of the lens drum shells 202 and 204. Thus, the lens drum shells will be quickly positioned about the lens column 200 when they are fastened together. This further accomplishes the positioning of the opening through which the light rays enter as being directly in line with or centered upon the lens axis. The pin 254 is also provided in the lens column, in order to connect it with the drive belt described hereinafter, and in order to synchronize the movement of both lens columns when they rotate during an exposure. In this connection, the land 266 adjacent the area in which the pin 254 is located on the lens column is a downwardly tapering surface which prevents any introduction of friction when the drive belt pulls off of the area 268 of the lens column.

*Filters and filter selector*

As shown in FIGURE 9, the filter housing 230 comprises two identical members 270 and 272 which, as shown in FIGURES 16 and 17, are formed with re-entrant land and grooved portions and pin members so that they can be placed in mating light trap interconnected position. The upper portion of the part 270 is provided with the groove 274, and the upper portion of the part 272 is provided with the land 276. The lower portion of the part 270 is provided with a land, and the lower portion of the part 272 is provided with a groove (not shown). Thus, the parts 270 and 272 can be identically made and need only be reversed so that they can be assembled with oppositely mating lands and grooves. Also, the parts are interconnected by the pair of pins 273 and 275 which fit into mating holes on the two parts. As shown in FIGURE 9, the filter assembly 230 will fit into a cavity 231 in the lens column 200. The identical halves 270 and 272 of the filter selector housing 230 are internally formed with re-entrant portions presenting the grooves 278 and 280. These grooves 278 and 280 form chambers in which the filters can slide and in which other elements can be assembled into the housing.

These grooves or tracks 278 and 280 are indicated in FIGURE 17 as accommodating the filters 282 and 284, respectively. The nature of these filters is clearly shown in FIGURES 18 and 19. The inner filter 284 (the filter closest to the lens or the center of the lens column), and the outer filter 282 are substantially identically formed. The inner filter 284 comprises a filter holder 297 having an enlarged central opening 308 to permit light to pass therethrough, and a series of tabs or bent-over portions 298, 300, 302 and 304 which accommodate and retain a rectangular filter 306 cut from gelatin filter material. The filter holder 297 may readily be stamped from thin metal sheets. The tab 302 has an outwardly extending portion which cooperates with means to be described hereinafter for raising and lowering the filter so that it may be positioned in line with the lens. Similarly, the filter assembly 282 comprises a filter holder 286 which has the central opening 297, and a series of bent-over tabs 288, 290, 292 and 294 to accommodate and retain the filter blank 296. This outer filter 282 is only retained in position by the three tabs 288, 290 and 292. In both instances the filter blanks 306 and 296 are prevented from horizontally moving out of the filter holders because of their assembly into the filter housing and their sliding within the indicated grooves. The filter blank 296 is retained only by the three tabs, as indicated, and the fourth tab 294 is bent in the opposite direction so that its extended portion can serve as a means by which it is raised and lowered into position by the filter control means described hereinafter.

When the two filter housing parts 270 and 272 are assembled, they will present a circular opening 377 to permit light to enter through the filters to the lenses, and this opening will be closed for dust protection by a ground glass cover 379 which is fitted within a groove 381 formed partially in each of the housing members 270 and 272.

Further interconnecting the two housings 270 and 272 is an assembly plate 310. This assembly plate has a central opening or window 311 (see FIGURE 20) to permit light to pass through the filters into the lenses, and is also provided with four holes 312, 314, 316 and 318 which are aligned with the holes 322 and 324 in the housing part 272 and the holes 320 and 326 in the housing part 270, to permit screws such as 328 and 330 (see FIGURE 17) to pass through the holes in the housing members and be threaded into and through the assembly plate 310. The filter selector assembly plate 310 is also provided with downwardly extending leg portions 336 and 338 which terminate in outwardly extending ears 332 and 334, respectively. At the juncture of the ears with the legs there is provided a cut-out or hole portion 333 and 335, as shown more clearly in FIGURE 21.

Two filter selector arms 358 and 360 are provided of sickle shape to serve as a means by which the filters are permitted or prevented from dropping down by force of gravity within their channels into position in the path of the rays passing to the lens. These filters can drop down only upon the upper surface 383 of a mounting plate 380. The mounting plate, as shown in FIGURE 21 also fits within the channels 278 and 280, but at the bottom of the filter housing.

The filter selector arm 358 is provided with an ear or outwardly extending tab 362 at its upper end, and similarly the filter selector arm 360 is provided with the tab 364 which is outwardly extending. It is these respective tabs 362 and 364 which cooperate with the arms or tabs 302 and 294, respectively, on the filter holders 284 and 282. These selector arms 358 and 360 have handle portions 366 and 368, respectively, and are assembled to the assembly plate 380. The arm 360 is assembled to the assembly plate by means of a screw 370 which, as shown in FIGURE 17, has a shoulder portion 376 to serve as a pivot bearing for the control arm 360, the threaded portion 370 which is threaded into the plate 380, and an extending pin or tenon 374 which serves as a locating pin extending through the assembly plate 310 and into a hole 375 in the lens column 200 to accurately position and locate the filter assembly (see FIGURE 9).

Similarly, the handle portion 366 of the filter selector arm 358 is fastened and assembled to the plate 380 by a screw 372 which, as shown in FIGURE 21, has a shoulder portion 386 and a slotted head 384 to provide a bearing surface for pivotal motion of the arm 358. Thus, both control arms 358 and 360 are rotatably mounted on the bearings 386 and 376 (latter shown in FIGURE 17).

Each control arm 358 and 360 is also provided with a pin by which it is actuated into its several operational positions. The arm 360 has fastened to it the pin 352, and the arm 358 has fastened to it the pin 350. These pins may be staked or otherwise fastened to their respective arms. The pin 350 is provided with a circumferential groove 354 and the pin 352 is provided with a circumferential groove 356 to retain one end of a spring. Thus, the spring 342 which has one end hooked into the notch 335 on the ear 334, has its other end retained within the groove 356 on the pin 352. Similarly, the spring 340 which has one end hooked within the notch 333 in the ear or tab 332, has its other end retained within the groove 354 on the pin 350. As indicated above, these springs load the selector arms and their tabs outwardly so that the tabs are in contact with the respective tabs on the filter holders. Also, the pins are urged inwardly against control members described hereinafter. To permit such motion of the pins which are affixed to the control arms and pass through the assembly plate 380, this plate is provided with enlarged openings such as 382 for the pin 352 and the opening 388 for the pin 350 (see FIGURE 22).

FIGURE 22 shows two positions for the filter selector arm 358. The dotted line position is that which the filter preselector arm will take when the pin 350 is urged to the right to permit the filter 284 to drop downwardly into position. The arm 360 is similarly actuated.

*Filter selector operating mechanism*

As indicated above, the pins 350 and 352 on the filter selector arms 358 and 360, respectively, are urged or moved outwardly against their spring action by a control or operating mechanism. This mechanism 400 shown in FIGURE 9 serves to actuate two cam pins 402 (only one being shown) which operates within a cam pin sleeve or lower pivot shaft 403, as shown in FIGURE 21. Referring now to FIGURES 24, 25 and 26, the operation of the two filter selector arms 358 and 360 as caused by the movement or positioning of the cam pin 402 will become apparent. FIGURE 25 indicates the position of the cam pin 402 when it has moved to its highest position by means of the filter selector lift plate 404. The cam pin 402 is formed with a main body portion 406, a first tapered surface 408, a reduced stem portion 410, a second tapered portion 412, a second land portion 414 of the same diameter as the portion 406, and a third tapered tip 416. In the uppermost position shown in FIGURE 25, the pin 352 controlling the selector arm 360 rests upon the second reduced land area 410 so that the arm 360 remains in normal unactivated position preventing any downward movement of the filter holder 282. At the same time the pin 350 on the selector arm 358 is moved outwardly against the restraining force of the spring 340, since it rests on the first land portion 406. In this position the filter holder 284 can drop down into position intercepting the light rays transmitted through the lens drum assembly, since the tab 362 has been removed from the position in which it restrains downward motion of the tab 302 attached to the filter holder 284.

As shown in FIGURE 26, the cam pin 402 is placed in its lowermost position at which time the pin 352 is urged outwardly away from the cam pin since it has been cammed outwardly by traveling over the tapered surface 412 and brought to rest upon the land 414. Thus, the upper portion of the selector arm 360 is moved towards the right so that its tab 364 is drawn out of the path of travel of the tab 294 on the filter holder 282. The filter holder can thus drop into its lower-most position. It should be noted that the movement of the several filter holders is caused by the force of gravity and although the filter selector dial is located on the bottom of the camera and is normally actuated when the camera is upside down. The camera must be returned to its normal picture taking position in order to cause the filters to fall downwardly. When the camera is inverted or turned over, the filters would fall back into their housed position, and if the filter selector cam pin 402 is in the position shown in FIGURE 26 the filter holder 284 will be prevented from any downward movement, when the camera is returned to its normal picture taking position.

When the cam pin 402 is placed in its third or central position, both the pins 350 and 352 rest upon the second land portion 410 and the selector arms 358 and 360 are in their normal position in which their tabs 362 and 364, respectively, are placed in the path of movement of the tabs 294 and 302 on the filter holders 282 and 284, respectively. Thus, in the position shown in FIGURE 24, the filter holders 282 and 284 (having been previously brought into their housed position) will be prevented from any downward movement when the camera is reverted to normal picture taking position.

The cam pin 402 operates within a cam pin sleeve and pivot shaft 218 (see FIGURE 15 and FIGURE 27). This cam pin sleeve is pressed into the aligned bores 420 and 422 in the lens column 200. The lens column has a chamber 424 into which the pins and springs on the filter assembly can project and operate. As shown in FIGURE 27, the cam pin 402 is in its uppermost position described with respect to FIGURE 25. As indicated previously, in this position the pin 350 rests upon the first land portion 406 and is urged outwardly away from this cam pin 402. The cam pin sleeve 418 is provided with two openings, 426 and 428, to permit the outward movement of the cam pins 350 and 352, respectively. The cam pin sleeve 418 is provided with a flange 430 which seats within the enlarged bore 432 at the lower end of the lens column 200. The lower portion of the cam pin sleeve 418 also serves as a pivot shaft and rotates within a Teflon bearing 434 which is pressed into a bushing 436, in turn pressed into housing 3B.

A filter selector lift plate 404 is provided with a slot 438 which fits within the groove 440 on the pin 402 to retain it and actuate it into the three positions described above. The pin 402 is caused to move vertically by this lift plate 404 by the control or operating mechanism 400 shown in assembled condition in FIGURE 9 and more clearly in exploded persepective in FIGURE 23. The vertical movement of the cam pin 402 would tend to cause the pins 350 and 352 to be pulled upward or downward in accordance with the vertical travel of this pin. However, the openings 426 and 428 in the cam pin sleeve will prevent any such upward or downward movement of the cam pin (see FIGURE 27).

The filter selector control mechanism comprises the filter selector dial 450 which is provided with two recessed areas 454 and 456 to present a centrally extending rib 452 to permit the fingers to grab the dial and rotate it. The dial 450 is also provided with the flange 451 to enable it to be retained by the cover 462. As shown in FIGURE 27, the cover 462 is fastened as by screws 464 into the housing and is provided with recessed areas to receive leather 466 or other material. The dial is also formed with an inwardly extending hub 453 which is provided near the periphery thereof with a blind bore 458 to accept a coupling screw 460 (see FIGURE 28). The coupling screw 460 interconnects the dial with a clamp plate 468. This clamp plate is provided with a central opening 470 and two holes, 472 to accommodate the coupling screw 460, and 474 to accommodate the screw 476. The two screws 476 and 460 are threaded into a detent pivot flange 480. This flange 480 is provided with a central hub portion 482, two threaded holes 484 and 486, two straight holes 488 and 490 and two blind holes 492 and 494. The screw 460 is threaded into the hole 486 and the screw 476 is threaded into the hole 484. Clamped between the clamp plate 468 and this pivot flange 480 are the spring retaining washer 496, a spring washer 498 and a thrust bearing nylon washer 500. The underside of the holes 474 and 472 in the clamp late 468 are countersunk. The plates 468 and 480 together with the washers 496, 498 and 500 are assembled into the lift screw 502. This lift screw is externally threaded as at 504 and provided with an internal mounting flange 506. In assembly, the clamp late 468 is placed on the lower side of the mounting flange 506 and the pivot flange or plate 480 is placed on the upper side of the mounting flange 506, with the three washers located between them. The spring washer 498 loads a pivot screw 508 which is threaded at one end 510 for fastening into the housing, and is provided with a long shoulder portion 512 which serves as a pivot for the lift screw 502. The lift screw is therefore essentially coupled by means of the coupling screw 460 to the selector dial 450 so that upon rotation of the selector dial which will carry the coupling screw 460 with it, the left screw 502 will also be rotated.

Various pre-selected positions of this lift screw 502 can be predetermined by the employment of the two blind bores or recesses 492 and 494, together with the upper portion of the threaded hole 486. These three holes are countersunk at their upper portion to cooperate with the spring loaded detent means shown in FIGURES 23 and 28. This spring loaded means comprises a leaf spring 514 which is fastened as by the screws 516 into a portion of the housing; and the bushing 518 which is pressed into the housing and provides a passage for the follower pin 520 and detent ball 522, in such manner that the spring 514 urges both the follower 520 and ball 522 against the upper surface of the pivot flange 480. Since three holes 492, 494 and 496 are employed, three detent positions are obtained corresponding to the three positions of the lift screw 502. As each one of these positions is reached, the follower ball 522 will drop into the respective countersunk hole. The holes 488 and 490 accommodate stop pins 524 and 526 which prevent continued rotation of the lift screw and limit the rotational motion in either direction that can be obtained by rotation of the lift screw and coupled dial selector 450.

Pressed into the holes 530 and 532 in the housing are the limit pins 534 and 536, respectively (see FIGURE 28). These limit pins 536 and 534 limit or restrict motion of a lift ring 540 which is internally threaded as at 542 to engage with the external threads of the lift screw 502. Thus, although the lift screw can rotate but not move vertically, the lift ring 540 is caused to move vertically since it is provided with two peripheral grooves 544 and 546, which cooperate with the pins 534 and 536 to restrain the motion of the lift ring 540 to a vertical motion. The lift ring 540 has pinned to it the lift plates 404 and 405 which are provided with the slots 438 and 439, to engage with the cam pins 402 in operating the filter mechanisms. A nylon thrust bearing 548 is provided between the lift screw 502 and the housing to reduce friction between the moving parts. The selector dial 450 and the adjacent portions of the retaining plate 462 can be appropriately marked to correspond with the three preselected positions determined by the detent recesses 492, 494 and 486, to indicate the three positions in which the cam pins 402 are moved by this filter selector and control mechanism. The multiple thread arrangement of the threads on the life screw and lift ring may be such that upon ⅔ of a single rotation of the lift screw, the lift ring will move as much as 3⁄16 to ¼ of an inch. Thus, a relatively great vertical movement of the lift ring is obtained upon a small rotational motion of the screw. All vertical play in the assembly is eliminated in view of the thrust washer and spring assembly which clamps the lift screw 502 tightly against the housing, but which permits rotation upon the shoulder portion 512 of the mounting screw 508. Since the spring washer 498 holds the lift screw 502 tightly against the thrust washer 548, any slight tilt in the two lift plates 404 and 405 is prevented and they are caused to move synchronously up and down, and parallel to the control cover 462. Also, the slots 438 and 439 in the lift plates 404 and 405 are of such width that they do not contact the reduced diameter 440 in the cam pin 402, but yet are smaller than the diameter of the head of the cam pin 402. This is done primarily to eliminate possible friction when the lens drum assembly 5 (see FIGURE 10) revolves. Thus, if the central axis of the slot 438 is not coincident with the vertical axis through the cam pin, the lift plate 404 will still not contact or rub on the cam pin in view of this clearance which permits this misalignment.

*Iris*

As shown in FIGURE 29, the lens column has a flatted surface 562 which is provided with three threaded holes 564, 566, 568. An inner iris diaphragm baffle ring 570 and an outer iris diaphragm baffle ring 572 are assembled against the flatted surface 562. Between these two baffle rings are the iris leaves 574 and 576. The iris leaves are identically shaped and one of the leaves is reversed for assembly purposes. Since the leaves are similarly shaped, only the leaf 576 is described. The iris leaf 576 is of generally S-shaped configuration, with a thin lower leg 578, a thicker intermediate portion 580, a cross-over portion 582 and the upstanding leg portion 584. The upper leg portion 584 is provided with two holes 586 and 588. The hole 588 will accept the iris follower pin 590, and similarly the hole 592 in the iris leaf 574 accepts the iris follower pin 594. The follower pin 590 is pressed into an iris leaf pivot arm 596; and the follower pin 594 is pressed into the inner iris leaf pivot arm 598. The iris leaf pivot arm 598 has a central bore 600 through a hub to form the hollow shaft 602, and a depending leg 604 which has the pin 594 pressed into it. The pin 594 has the peripheral groove 608 to accept a spring, as described hereinafter. The depending leg 604 further has a relieved surface 606 to permit the nesting and rotational movement of the outer pivot arm 596. This pivot arm 596 is similarly formed with a central bore 612 through a hub, forming the hollow shaft 610, and the depending leg 614, into which the pin 590 is pressed. The back surface of the pivot arm 596 is relieved as at 616 so that when the shaft 610 is placed into the shaft 602, the two arms can rotate with respect to one another from the position in which the two depending leg portions 614 and 604 are in contact, to a position limited by the diameter of the cam pin 660.

Mounted on the pin 590 is the iris follower roller 618, and mounted on the pin 594 is the iris follower roller 620. The iris pivot arm 598 has its shaft 602 rotatably mounted within a bushing 622 which is pressed into the hole 624 in the lens column. Thus, the bushing 622 is assembled into the hole 624 carrying with it the two iris pivot arms 598 and 596. A pivot pin 626 is then passed through the holes in the iris leaves, the follower arm and into the bushing to retain the assembly. This pin is retained in position, upon assembly, by the cam pin 660.

The two iris diaphragm baffle rings 570 and 572 are spaced apart by the spacer washer 628 and the half-moon spacer 630. The front cell lens fitting or ring 250 which is threaded at 633 to accept the front lens cell 232 (see FIGURE 15) is assembed by the screws 634 into the holes 564, 566, and 568, so that upon assembly of the elements as indicated in FIGURE 29 there will be provided a cavity within which the iris leaves can move to and fro.

The rollers 618 and 620, and the follower pins 590 and 594 are urged inwardly in the direction opposite to the arrows indicated in FIGURE 29, by an iris pin follower spring 640. This spring 640 has a wide upper looped portion 646 which rests against the upper portion 650 of the cavity within the lens column, and two depending legs 642 and 644 which are hooked at the ends thereof to rest within the recesses in the follower pins 590 and 594. The spring 640 retains the rollers 618, 620 upon the pins 590, 594 against outward movement. The two spring arms of the spring 640 serve to provide a constant force on the pins 590, 594 and therefore urge the follower rollers 618 and 620 inwardly against the iris cam pin 660 (see FIGURE 27).

The employment of the S shape of the iris leaves in conjunction with the tapered cone tip 662 of the iris cam pin causes the leaves to rotate about their pivot upon the pivot pin 626 when the cam pin is moved downwardly, so that they move in the direction of the arrows shown in FIGURE 29 with the leaves moving away from one another, but drawing their intermediate portions 580 towards one another. Thus the actual aperture opening (which is the space between the portions 580 of the leaves) is closed, as the two leaves move away from one another. The reason for causing these two leaves to operate in reverse, with the actual pivot point being above the follower pins and rollers, is to enable high speed operation or rotation of the lens drums. Because of the shape and weight distribution of these elements, any centrifugal force acting upon the iris leaves will tend to cause wide portion 580 to move outwardly away from the centrifugal pivot axis which in turn will cause the rollers 618 and 620 to press more firmly against the cone shaped portion 662 of the cam pin 660. Since these rollers are already in contact with the cam pin, they cannot move in that direction to change the iris setting or opening. Therefore, upon rotational motion of the lens drum, the iris leaves will remain stationary even though they may be subjected to centrifugal action. Had the iris leaves been constructed without the cross over portion 582, the high speed rotation would cause the rollers to move away from the cam pin 660 further opening the aperture, thus changing the light conditions. The iris opening is in the nature of a cat's eye, vertically arranged. This cat's eye configuration becomes more pronounced as the iris leaves are drawn together and approaches substantially a slit opening for very small aperture openings. Further, the employment of the two iris leaves in the cat's eye configuration permits a complete closure of the iris opening in order to enable bringing the lens out into the open in front of the camera for cleaning purposes while the magazine may still contain exposable film. This, then, avoids any necessity for occulting the lenses. The iris leaves also can be opened so that a full circle opening corresponding to the maximum lens grading can be attained.

The nature of the spring 640, with the rather large loop 646 has been found to be particularly advantageous in that a more constant spring force is attained throughout the camming action.

*Iris control and actuating mechanism*

Since there are two lens drum assemblies, there are two iris mechanisms in the camera of the invention, as indicated in FIGURES 27 and 30, the same reference numerals being applied to identical parts. Each iris control and actuating mechanism comprises a control knob 670 which is recessed at the top to provide for the bonding of leather or other material 672, and may be provided on its outer periphery with recesses or serrations 674. The control knob 670 is fastened by two (only one being shown) screws 676 to the iris cam 678. This iris cam is provided on its outer circumference with a spiral cam track 680, against which the upper portion of the cam pin 660 bears. Pinned to the iris cam 678, as by pins 684 (only one being shown) is the iris cam gear 686. This cam gear 686 is meshed with an intermediate gear 688 on which the iris openings may be engraved. Thus, if either control knob 670 is operated, the gearing 686, 688 will insure that the opposite control knob will also be actuated, which in turn insures that both cam pins 660 are raised and lowered in synchronism.

The intermediate gear 688 has pressed into it limit pins 690 at 180° intervals (only one of which is shown in FIGURE 30). The limit pins 690 cooperate with limit pins 692 pressed into the housing to limit the rotational movement of the gear 688, and hence the movement control knobs 670, so that the cam pin 660 does not ride off of the cam track 680. The gear 688 has a central hub which rides upon a spacer 696 which may be of nylon or Teflon. The stop pins 690 and limit pins 692 are so arranged as to permit approximately 56° of motion on either side, or a total of 112° travel of the dial and intermediate gear, in one embodiment of the invention. The iris cam 678 is fastened to the housing by a shoulder screw 698 which fits within the cavity 682. Mounted beneath the head of the shoulder screw 698 are a retainer washer 700, a spring washer 702, and a bearing washer 704, which may be of nylon material. The shoulder screw 698 passes through the hole 706 in the cam 678 to permit the cam to be rotated upon the shoulder portion thereof. The lower end of the screw 698 is threaded as at 708 into the camera housing. The cam and gear assembly rests upon a nylon bearing washer 710 to remove friction during rotation. The spring washer 702 eliminates any clearance that might occur between the cam gear 686 and the bearing washer 710. Thus, accuracy in synchronizing the movement of the two iris cam pins 660 is attained.

In order to cause both of the iris openings to be identical, and in view of manufacturing tolerances, it is necessary after assembly to disengage the came gear with the intermediate gear and slip it one or more teeth in order to arrange for synchronization between the two iris openings. With reference to FIGURES 27 and 29, it is seen that the control and drive housing 3a is provided with a bore 712. Fitted within this bore 712 is a main bushing 714 which is provided with a lower flange 716 and an upper flanged over portion 718 (which is flanged over upon assembly). The main bushing 714 serves to journal all of the lens column drive components. Retained against the flange 716 is the clockspring drive mechanism described hereinafter. Below the clockspring drive mechanism is a Teflon bearing 720, which serves as an upper lens column pivot bearing, there being additionally provided a lower metal pivot bushing 722. The bushing 722 is pressed into the top of the lens column 200.

Within the two bushings 720 and 722 is located the upper pivot shaft 724. This pivot shaft 724 is provided with a lower external flange 726, which rests against the lower bushing 722. The flange 726 is further held in place by the drive arm 742 described hereinafter, and the upper pivot bushing 720 rests against this drive arm.

The pivot shaft 724 is further provided with an internal flange 728 against which the spring 730 rests. The upper end of the spring 730 is retained by a spring retaining bushing 732 which is pressed onto the upper portion of the cam pin 660 and is freely slidable within the hollow pivot shaft 724 (the clearance being exaggerated in FIGURE 27 for purposes of clarity). Thus, the spring 730 urges the cam pin 660 upwardly against the spiral cam surface 680.

*Lens drum drive mechanism*

The means by which the lens drum assemblies are rotated are illustrated in FIGURES 9, 15, 27, 29 and 30–34. As indicated in FIGURE 9, each lens drum assembly is provided with a clock spring assembly or motor 740 and the drive arm 742. The drive arm is fastened as by the screws 744 to the top of the lens column and is provided with the two pins 746 and 748. As indicated in FIGURE 15, the pin 748 depends below the drive arm 742 and the pin 746 extends above the drive arm. The pin 746 is of special construction and comprises a headed pin 750 which is reveted into the hole 752 in the drive arm. Mounted on this pin is a roller 756, and pressed onto the top stud portion of the pin is a bushing 758. Thus, the roller 756 can freely rotate on the stud 754. This roller, as described hereinafter, is provided in order to minimize the pressure required to actuate the pushbutton release arm.

The clock spring assembly 740 consists of an upper flange 760 and a lower flange 762. Each flange has central hub portions 764 and 766, respectively (see FIGURE 15). In one area of these hubs 760 and 762 there are little tab portions 768 and 770, respectively, which are provided in order to capture one end of the clock spring. As shown more clearly in FIGURES 29, 31, and 32, the tabs 768 and 770 are bent over to grasp therebetween the interleaved clock spring 772 and plastic or Teflon material 774, which is provided to reduce frictional forces. The ends of the ribbon of Teflon 774 and the length of clock spring are formed into a fishtail shape in order to be grasped and retained by the tabs 768 and 770 as shown most clearly in FIGURE 31.

The two flanges are mounted upon a central bushing 776 with upper and lower Teflon spacers 778 and 780 to further reduce friction. The two flanges 760 and 762 are held together by a rivet 782 which is flanged over at both ends (see FIGURE 9 or 33). Mounted on the rivet 782 is a bushing or a spacer 784. The rivet 782 and spacer 784 are mounted at ear portions 786 and 788 of the upper and lower flange members 760 and 762.

The outer end of the spring 772 is formed into an anchor loop 790 which is fastened by eyelets 792 (see FIGURE 32). The loop 790 is mounted upon a bushing 794, which is flanged at one end as shown in FIGURE 30, and this bushing is retained by the screw 796 threaded into the housing. As the clock spring unwinds, it will rotate the spacer 784 into the position where it will contact the drive pin 746 mounted on the drive arm 742, and further motion of the spacer will rotate the lens column therewith (see FIGURE 15).

As shown in FIGURE 34, the two lens colunms 200, 200 are interconnected by a drive belt 798 which has its ends interconnected by the spring 800. One end of the spring 800 fits into an eyelet 802 and the other end of the spring fits into an eyelet 804 in the respective ends of the drive belt 798. The drive belt is affixed to each lens column by the pins 254, 254, and is wrapped around the surface 268 (see FIGURE 27).

As shown more clearly in FIGURE 33, the clock spring assembly 740 and associated drive shaft journalling components are mounted upon the main bushing 714. Retained against the lower flange 716 of this main bushing 714 is the thrust washer 806 which rests against the cocking gear 812. The cocking gear 812 and the cocking arm 814 are journalled upon the bearing 808, and further retained by the thrust washer 810. The mounting bushing 776 for the clock spring assembly is journalled on the bearing 816. One or more spacer washers 818, 820 are employed in order to remove any play in the assembly of these elements upon the bushing 714. The entire assembly is held in place by the snap ring 822 which is assembled into the peripheral groove 824. The members 806, 808, 810 and 816 are preferably made of Teflon so as to reduce frictional forces.

Pneumatic arrestor

As indicated previously in connection with the description of FIGURE 15, the drive arm 742 is provided with the depending stud or pin 748. In order to arrest the rotary motion of the lens drum assembly as it comes to the end of its travel, the pin 748 is brought into contact with a pneumatic arrestor 830 as shown most clearly in FIGURES 34 and 35.

The pneumatic arrestor comprises an outer cylindrical body 1840 which is held in position by being mounted through the openings 1842 and 1844 in a pair of mounting brackets 1832 and 1834. These mounting brackets are affixed to a portion of the camera housing by screws passing through mounting holes 1836 and 1838. The mounting brackets are further rigidly held in space relationship by the spacer member 1833 which is affixed to the brackets as by screws 1835. The cylindrical body 1840 consists of a central solid portion 1846 and two bores 1852 and 1856, which terminate short of each other to provide cavities into which cylinders 1848 and 1850 fit. The cylinders 1848 and 1850 are provided with flanges 1858 and 1860 which serve as stop and locating means against the ends of the central body 1846. The cylinders are press fitted into the central body in order to be retained thereby. The mounting blocks 1832 and 1834 bear against the flange portions 1858 and 1860 of the respective cylinders and retain the arrestor against any displacement by the action of pin 748 striking thereon.

Each cylinder is provided with a plunger riding therewithin. Thus, the cylinder 1848 has the plunger 1862 riding therewithin the cylinder 1850 has the plunger 1864 riding therewithin. The plunger 1862 has an enlarged piston portion 1866 and the plunger 1864 has an enlarged piston portion 1868. The plunger 1862 has the forward reduced portion 1870 and the plunger 1864 has the forward reduced portion 1872. A spring 1874 is captured between the bottom of the bore 1852 in the cylindrical body 1840 and the shoulder formed between the enlarged piston portion 1866 and reduced portion 1870 on the plunger 1862. Similarly, a spring 1876 is located within the cylinder 1850 between the bottom of bore 1856 and the shoulder formed between the enlarged piston portion 1868 and reduced portion 1872, on the plunger 1864.

The piston portions 1866 and 1868 serve as a means for preventing the plungers from being pushed out of the cylinders by cooperating with a reduced internal flange portion on the respective cylinders. Thus, the flange 1878 on the cylinder 1850 and the flange 1880 on the cylinder 1848 cooperate with the respective piston portions 1868 and 1866. The pistons are the only portion of the plungers which contact the inner walls of the cylinders. The springs are so selected as to provide sufficient force only to return the plungers to fully etended position as indicated by the position of plunger 1864. The springs do not provide any appreciable force to resist inward motion of the plungers. This resistance of inward motion of the plungers is provided by compression of the air by the piston portions of the plunger within the cylinder. The fit between the piston portions 1866, 1868 and the inner walls of the cylinders 1848, 1850 is such that only a capillary passageway exists to permit small amounts of air to be metered past the piston. This permits a retarding or an increasing retarding force to be placed against inward motion of the plunger as it is driven downwardly, and inwardly by the pin 748 on the drive arm. As the respective spring pushes the plunger outwardly from the cylinder, air will leak back past the leakage path provided between the piston and cylinder so that the plunger is made ready for the next arresting motion.

Housings and housing interconnections

As shown in FIGURE 1, the camera is divided into three housing portions, the front housing 2 (previously described), the main housing 3 and the magazine or rear housing 4. The main housing 3 as indicated in FIGURE 10 is composed of a central housing 3C, and upper housing 3A and a lower housing 3B. These housings are assembled by pin connections so constructed that when the set screws thereof are tightened, the upper and lower housings 3A and 3B are drawn tightly against the central housing 3C. The nature of such pins are clearly shown in the inset view on FIGURE 10 wherein one such pin interconnection 830 is shown in enlarged cross-section. Pressed into the central body 3C is a locating pin 832 which has a lower reduced portion 834 which is interrupted by a V-notch. A set screw 848 further secures the locating pin in position in the housing 3C. The pin has a main enlarged section 836 against which the housing portion 3A is to be urged. The pin thereafter has a reduced section 838 which is interrupted centrally thereof by the V-notched area 840. Provided on the housing 3A is the boss 842 which has the bore 844 provided centrally thereof for accepting the locating pin. The boss 842 is also provided with a set screw 846 (see lower pin connection in FIGURE 10). As the set screw is advanced inwardly it will come into contact with the V-notched area 840 in such manner as to draw the housing 3A downwardly against the area 836 of the locating pin 832. Thus, the set screw 846 serves as a means for drawing the main housing portions together, and the set screw 848 serves to further lock the locating pin in position.

The nature of the interconnection between the rear or magazine housing 4 and the main housing 3 is shown in FIGURES 51–54. The magazine and main housing are provided with a locating pin or hinge assembly 850 at one end and with a lock shaft assembly 852 at the other end. The nature of the locating pin assembly 850 is shown more clearly in FIGURE 54. The magazine housing 4, which is covered substantially throughout its outer surface by a leather or leatherette covering 854, is provided with two counterbored holes 856 which are vertically spaced (only one being shown in cross-section). A hinge bracket 858 is affixed to the magazine housing 4 by the screw 860 which is threaded into a T-shaped fastening 862. The latter passes through the slot 864 in the hinge bracket 858. The slot 864 is shown elongated in order to permit for factory adjustment and positioning of the tapered locating or hinge pin 870. The upper end of the hinge bracket 858 is provided with a hole 866. The hinge pin 870 is staked into the hole 866, as by heading over the portion 868 of the hinge pin. The hinge pin 870 passes through an enlarged opening 874 in the main housing 3 and is received into a tapered blind hole 872 in the accessory bracket 14. The adjustable nature permitting the positioning of the hinge bracket 858, enables tight and exact closure and fitting of the film magazine into the main body of the camera, in order to obtain a good light trap condition.

The magazine 4, after being hinged by the hinge pin or locating pin assembly 850 is locked into position by the lock shaft assembly 852, the nature of which is shown in FIGURES 52 and 83. A bracket 880 having a hooked end 882 is affixed to the main body 3; and, upon assembly of the magazine, 4, will pass by a lock shaft 884. The lock shaft has a flatted portion 886 as shown more clearly in FIGURE 53. Once the hooked end 882 of the bracket 880 passes beneath the lock shaft 884, the lock shaft is rotated as shown in FIGURE 52 by the handle or lever 888 which is pinned or otherwise affixed as at 890 to the lock lever shaft 884. The shaft 884 is further retained in position by a retaining spring 892. The retaining spring 892 is fastened as by the screw 896 into the magazine housing 4. The bent end 898 of the retaining spring is in contact with the shoulder 894 on the lock shaft 884 so as to urge it downwardly into the bore 900 in the magazine housing 4. Additionally, the retaining spring 892 provides sufficient force against the shaft to prevent the lock lever 888 from freely rotating, so that it will remain in the position into which it is placed by the operator. Also, the ribs 902 and 904 in the magazine 4 are provided with holes through which the lock shaft 884 passes.

The lock bracket 880 is assembled to the main housing 3 by means of a special flatted nut 908 which is internally threaded as at 909 and which passes through a rectangular hole 906 in the bracket 880. The rectangular hole thus acts as a ridge to hold the nut 908 as the screw 910 is threaded into the nut. The assembly of the screw 910 into the nut 908 also will assemble the accessory bracket 14 to the housing 3. Between the bracket 14 and the nut 908 is a bushing 912 which is provided with a lip or flange 914. This lip acts as a light trap to prevent light from entering past or underneath the bracket 14 and into the film area of the camera. The main body 3 is further provided with a guide pin 916 which is pressed into the hole 918 in the housing 3. The bracket 880 is provided with a guide slot 920 which is engaged by the guide pin 916 in order to provide a means for keeping the lock bracket 880 properly located and straight, such that when the camera is assembled at the factory and the magazine joined with the main body, the bracket 880 can be properly positioned and the screw 910 tightened to provide accurate closure of the magazine with the main body. Thus, when it is desired to release or remove the film magazine 4 from the main body, all that is necessary is to rotate the lock lever 888 to position the flatted portion 886 with respect to the lock bracket 880 as shown in FIGURE 53, at which time the magazine can be rotated outwardly about the pivot point 859 thus moving the hinge pins 870 out of their position in the accessory bracket 14. The magazine can be reassembled with the camera body by reversing this action.

*Cocking mechanism*

As indicated in FIGURES 27, 30 and 32, the clock spring 772 which is formed into the anchor loop 790 is mounted upon a bushing 794 which is retained by the screw 796 which is fastened into the upper housing 3A. Retained against the shoulder on the bushing 794 of each clock spring mounting are latch arms. As shown in FIGURES 27 and 36, each of the bushings 794 and 795 have mounted against their flanges the latch arms 932 and 934, respectively. Each of the pivotally mounted latch arms are provided with the upstanding ears 936 and 938. These ears are provided with holes 940 and 942 (see FIGURE 27).

A latch spring arm 966 and associated parts are shown inverted in FIGURE 94 as during assembly, i.e. the housing 3A actually is the upper of the three main body housings. The latch spring arm 966 is mounted into the housing 3A into a threaded hole 960 by a screw 962 and a spacer bushing 964. A similar latch spring arm 967 is associated with the latch arm 934. The latch spring arm 966 is provided with a lower flange 968 and an upper flange 970 which are spaced apart by the interconnecting web 972. The web is extended at each end and bent over to form a lower tab 974 and an upper tab 976. The upper tab 976 is provided with a hole 978. The flanges 968 and 970 are provided with aligned holes 980 and 982 through which the screw 962 may pass to be threaded into the hole 960 in the housing 3A. The spacer bushing 964 is placed between the two flanges and in alignment with the hole. The latch spring 944 has a long arm 984 and a short upper arm 986. These two arms are joined by a series of coils 988 which provide an opening through which the screw and bushing 964 may pass. Thus, upon assembly of the latch spring arm 966, the arm 984 of the latch spring 944 will pass through the hole 978 in the tab 976 and through the hole 940 in the ear 936 of the latch arm 932. The other arm 986 of the latch spring will rest against the outer surface of the bushing 62 housing the actuating pin 70 of the lens port cover actuating mechanism. The latch arm 934 is similarly arranged and mounted.

As shown in FIGURES 36, 42 and 95, the pushbutton 930, by a means described hereinafter, serves to actuate the exposure release arm 990 through a connection including the pin 992 which passes through a small hole 994 in one end of the exposure release arm. As shown more clearly in FIGURE 95, this exposure release arm has two square openings 996 and 998 which cooperate with a pair of trigger arms 1000 and 1002. The trigger arm 1000 has a lower leg 1003 and an upper arm 1004. The upper arm 1004 is provided with the hole 1006 which receives a bushing 1008 which is crimped into place by having its lower reduced portion 1010 crimped over. Fitted within this bushing 1008 is another bushing 1012 to permit rotation of the trigger arm 1000 therearound. A screw 1014 passes through the bushing 1012 and is threaded into a portion of the upper housing 3A. The trigger arm 1000 thus pivots about the bearing arrangement. The trigger arm 1000 is also provided with an outwardly extending ear 1016 which is provided with a hole 1018 to receive the stud 1020. The stud 1020 is formed with an enlarged flange portion 1022 and a reduced flange portion or stud pin portion 1024. The reduced portion 1026 passes into the hole 1018 and is crimped thereover to rigidly hold the member in position. The assembly is such that when the trigger arm 1000 is affixed in its pivotally mounted position by the screw 1014 into the housing, the exposure release arm 990 is then in such position that its elongated slot 996 accepts the stud pin 1024.

The trigger arm 1000 is also provided with the small hole 1028 at its upper extremity. Mounted around the bushing 1008 is a torsion spring 1030 which has a lower depending arm 1032 which fits through the hole 1028, and an upper extending arm 1034 which rests against a portion of the housing 3A as shown in FIGURE 95. The torsion spring is so arranged with respect to the trigger arm that it constantly urges the trigger arm 1000 in the direction of the arrow shown in FIGURE 95. In this arrangement the stud pin 1024 is urged to the right so that it bears against the side 1036 of the elongated opening 996. Referring to FIGURE 42, when the pushbutton 930 is depressed the pin 992 pulls the exposure release arm 990 towards the left as indicated. Thus, as the exposure release arm 990 is urged towards the left as viewed in FIGURE 95, the portion 1036 of the elongated slot 996 will urge the stud 1024 and hence the trigger 1000 towards the left to rotate it clockwise about its pivot means and against the spring force of the spring 1030 (i.e., in a direction opposite to the arrow).

Another trigger arm 1002 is provided to be actuated by the exposure release arm 990. This trigger arm is somewhat similar in form to the trigger arm 1000 and is provided with a lower hook portion 1038 and an upper portion 1040. The upper portion 1040 is provided with the hole 1048 into which the trigger arm stud 1042 is mounted. This stud is identical to the stud 1020 and has its reduced portion 1046 crimped over after insertion into the hole 1048. The enlarged flanged end 1044 serves to locate against the surface 1066 of the enlarged opening 998 in the upper end portion of the exposure release arm 990. The trigger arm 1002 is pivotally mounted by the same arrangement as mounts the trigger arm 1000. Thus, the bushing 1052 is assembled into the opening 1050 with the portion 1054 crimped over. Assembled into the bushing 1052 is another bushing 1056 to form the sleeve bearing. The screw 1068 when passed through the bushing 1056 and threaded into the housing 3A will form the pivotal mounting. Mounted around the bushing 1052 is the torsion spring 1058. The lower arm 1062 of the torsion spring is passed into the hole 1064 in the trigger arm. The upper arm 1060 of the torsion spring 1058 rests against a portion of the housing 3A. Thus, the spring 1058 urges the trigger arm 1002 in the direction of the arrow (clockwise) and when the exposure release arm 990 is drawn toward the left as viewed in FIGURE 95, the portion 1066 of the elongated opening 998 will contact the stud 1042 to pivot the trigger arm 1002 counterclockwise. Thus, as the exposure button 930 is depressed, the exposure release arm 990 is drawn to the left as viewed in FIGURE 95 causing the trigger arms 1000 and 1002 to rotate in the direction opposite to the arrows shown in this figure, so that their hooked or lever portions 1003 and 1038 are respectively withdrawn from locking or retaining engagement with the respective roller 756 on the drive pin 746. As explained hereinafter, only one of the trigger arms engages a drive pin 746 when the clock spring motors are cocked. This is shown most clearly in FIGURE 36 wherein the trigger arm 1000 has its leg 1003 engaging the pin 746 on the left drive arm 742. At this time, the right drive arm 742 is shown as having its drive pin 746 in the 180° rotated position away from any engagement with the trigger arm 1002. In the position shown in FIGURE 36, the camera is un-cocked as after an exposure and resultant 180° clockwise rotation of the lens drums and their attached drive arms 742. In this un-cocked position the cocking lever would be in a position as shown in FIGURE 1; (i.e., rotated counterclockwise substantially to its right extreme position).

As stated above, when the exposure release button 930 is depressed, the exposure release arm 990 will move towards the left as shown in FIGURE 36. At this time, both trigger arms 1000 and 1002 will rotate in opposite directions (i.e., arm 1000 clockwise and arm 1002 counterclockwise), with the leg 1003 of arm 1000 being withdrawn from latching arrangement with the drive pin 746 on the left drive arm 742. The dotted line positions in FIGURE 36 show the relative position of the two trigger arms when the exposure button is depressed.

Referring to FIGURE 37, the arrangement of the cocking lever assembly and cocking gear is shown in greater detail. The cocking lever 90 is mounted on a cocking gear shaft 1070 by means of a threaded fastening 1072. The screw 1072 passes through the hole 1076 in the cocking lever 90 and the hole 1075 in the cocking gear shaft 1070. The portion 1074 of the hole 1076 is accordingly threaded. The lower portion of the cocking gear shaft 1070 is flanged as at 1080 and fastened by the rivets 1082 and 1084 to a central cocking gear 1078. The cocking gear 1078 also has fastened to it the latch pin 1096 which is staked or otherwise fastened to the gear 1078.

The cocking lever and cocking gear is assembled into the housing 3A by means of a central bushing 1086 which is retained in place by the thrust ring 1088, and which rides upon the spring washer 1090. This assembly is further retained in position by a snap ring or a retaining ring 1092 which is held within the groove 1094 in the cocking gear shaft 1070. The gear 1078 is further spaced from the housing 3A by the thrust washer 1079.

The central cocking gear 1078 is meshed with the gears 812, 812. When the cocking lever 90 is rotated clockwise, the gear 1078 is accordingly rotated clockwise, and the two gears 812 are rotated counterclockwise. With reference to FIGURE 33, it is seen that each cocking arm 814 has pinned to it, as by the pins 815 and 817, the cocking gear 812. Also, the cocking arm 814 is provided with a depending lug or tab 819 which serves as the means for contacting the spacer member 784, to wind up the clock spring when the gear 812 is rotated. As shown in FIGURE 36, the left cocking arm 814 is in contact with the spacer member 784, having been previously cocked into that position prior to the exposure. Also, at this instant (i.e., prior to a cocking action, the right cocking arm 814 (shown in dotted lines) is in position so that it can carry the spacer member 784 around and cock the right clock spring while the left cocking arm 814 will be withdrawn from engagement with the left spacer 784 to permit the left clock spring to unwind (after being released by the arm 1000) and drive the lens drum assemblies.

Means are provided for permitting the cocking gear 1078 to be rotated when a cocking operation is desired, and for preventing rotation of the cocking gear 1078 during an exposure. Such means are shown in FIGURES 30, 36 and 38-41. These means comprise a pair of latch arms 932 and 934. As stated above, the latch arms are rotatably or pivotally mounted on the bushings 794 and 795. The latch arms are identical and only one will be described in detail in connection with FIGURE 38. The latch arm 932 comprises a central portion 1100 containing the hole 1102 for mounting on the bushing 794, and the arm portion 1104. The upper portion is cut out at 1106 to provide a pair of stop surfaces 1108 and 1110. These stop surfaces cooperate with the limit plate 1112, shown in plan view in FIGURE 38 and in side view in FIGURE 30. This limit plate is a rectangular thin plate which has bent up tabs 1114 and 1116. These tabs cooperate with the stop surfaces on the latch arms. Thus, for example, the tab 1114 will limit the travel of the latch arm 932 by its being contacted by the surfaces 1108 and 1110, alternately. The latch arm 932 is provided with the tab 936 and hole 940 (as described above) to receive the latch arm spring 944. The lower portion of the arm 1104 is provided with two hooked areas 1118 and 1120. The hook is so shaped as to receive and retain the latch pin 1096, and the forward hook or bumper 1120 serves as a camming means against the opposite latch arm when they are momentarily in contact (as shown in FIGURE 39). The surface 1122 serves as a cam surface in permitting the latch pin 1096 to drive the latch arm into the desired position during the cocking action.

With reference now to FIGURES 36, and 38–41, a cocking action starting with the position shown in FIGURE 36 will be described. In this position an exposure has just been made during which time the right clock spring has been unwound bringing the right drive pin 746 against the latch spring arm 967, pivoting it slightly counterclockwise. This pivoting motion will cock or bow the spring 944 to load the latch arm 934 for counterclockwise motion. However, the hooked portion 1118 will prevent the latch arm 934 from rotating, since it cannot clear the latch pin 1096. At the same time, the cocking arm 814 has its depending tab 819 in such position that when the right gear 812 is to be rotated it will rewind the spring by moving the clock spring housing in a counterclockwise direction, i.e., the tab 819 will bear against the spacer bushing 784 and move the clock spring housing counterclockwise or upwards as viewed in FIGURE 36 to the secondary position shown in FIGURE 38. Such movement will rotate gear 1078 counterclockwise and will also move pin 1096 therewith. This backing off of the latch pin 1096 will permit the latch arm spring 944 to pivot the latch arm 934 in a clockwise direction to clear a path for movement of the latch pin 1096. Simultaneously, the surface 1110 of the latch arm 934 will contact the tab 1116 on the limit plate 1112 to arrest further motion of the arm 934.

FIGURE 39 illustrates the succeeding action when the cocking lever 90 is rotated in a clockwise direction in order to cock the right clock spring. The cocking lever is rotated approximately 180° and moves the pin 1096 from the initial position shown in FIGURE 39 as $a$, to the position shown as $f$ in FIGURE 39. This rotation of the cocking lever 90 and the pin 1096 by the clockwise rotation of the gear 1078 causes the counterclockwise rotation of the right and left cocking gears 812. Considering the rotation of the right cocking gear 812, the right cocking arm 814 with its depending tab 819 in contact with the spacer 784, carries the spacer 784 towards the right as viewed in FIGURE 39, to the position $f$ corresponding to the $f$ position of the pin 1096. In this position the right clock spring has been substantially fully wound. It is also noted that the latch spring arm 967 is still urged in the counterclockwise direction by the right drive pin 746, thus cocking the latch spring 944 and maintaining the latch arm 934 in its central position. The left cocking gear 812 will also rotate counterclockwise and carry the left cocking arm with its depending tab 819 from position $a$ to position $f$. In the position $f$, the left cocking arm 814 has its tab 819 so positioned that when the next cocking action is to take place the left clock spring can be rewound by the tab 819 carrying the left spacer 784 in a clockwise direction, as will be readily understood. Since the left latch spring 944 is bowed to cause the latch arm 932 to rotate clockwise, the arm 932 will remain in position $a$ until it is caused to move by the latch pin 1096. When the latch pin 1096 reaches position $e$ shown in FIGURE 39, it will contact the surface 1122 on the latch arm 932 and cam it counterclockwise into position $f$. When the latch arm 932 is in position $f$, the latch pin 1096 has progressed to position $f$ also. In this position, the hook portions 1120 of the latch arms 932 and 934 are abutted, and since the latch pin 1096 is causing the motion of latch arm 932, it in turn will cause further movement of the latch arm 934.

Further motion of the cocking gear 1078 and its attached latch pin 1096 is shown in FIGURE 40. The cocking lever 90 is moved from position $f$ to position $h$. This motion carries the latch pin 1096 from position $f$ through position $g$ to position $h$. Since the pin 1096 is riding upon the cam surface 1122 of the latch arm 932, it will move the latch arm to position $g$, and then finally to position $h$, where the latch pin 1096 will have arrived in position $h$ and be locked by the hooked portion 1118 of the latch arm 932. The latch spring arm 966 is free from contact with the pin 746, and hence the left latch spring 944 is bowed so as to draw the latch arm 932 in a clockwise direction, thus retaining the latch pin 1096. During the motion of the latch arm 932, i.e., moving through positions $f$, $g$ and $h$, it will cam or urge the latch arm 934 counterclockwise against the spring force of the right latch spring 944. The pin 746 bows the right latch spring 944 by contacting latch spring arm 967, so as to urge the latch arm 934 against the limit stop tab 1116. This final motion of the cocking action will carry the right cocking gear 812 and the tab 819 on the cocking arm 814 from position $f$ to position $h$. This will complete the rewinding of the right clock spring, since the spacer 784 is also carried from its position $f$ to position $h$, as shown in FIGURE 40. At the same time, the left cocking arm 814 will have its tab 819 withdrawn from its position $f$ to position $h$, so that it will be able to receive the left spacer 784 when the left clock spring is unwound. Both right and left clock springs are now fully wound.

FIGURE 41 illustrates a counterclockwise exposure action, during which time the left clock spring drives both lens drum assemblies. The exposure is commenced upon actuation of the exposure button 930, which draws the exposure release arm 990 towards the left as indicated by the arrow in FIGURE 41. This motion, as indicated previously, will rotate both of the trigger arms 1000 and 1002 in the direction of the arrows. The upward motion of the trigger arm 1000 will release the drive pin 746 so that the left clock spring can be unwound to drive both lens drum assemblies. The right clock spring will not release, in this case, when the right trigger arm 1002 rotates upward in the direction of the arrow since the tab 819 of the right cocking arm 814 is now in a position to retain it. The left drive pin 746 and left spacer 784 will however travel in a counterclockwise direction, with the spring force being transmitted by spacer 784 to the drive pin, until the drive pin 746 abuts against the latch spring arm 966 and carries it clockwise to change the position of the left latch spring 944. At the same time, the left spacer 784 will be carried until it abuts against the left cocking arm tab 819. The clockwise motion of the latch spring arm 966 will change the spring loading on the latch arm 932. In the pre-exposure position, the left latch spring 944 is bowed so as to spring load the latch arm 932 in a clockwise direction, thereby retaining the drive pin 1096 in position; and when the exposure action has been completed, the left latch spring 944 is bowed (as shown by solid lines in FIGURE 41) so as to load the latch arm 932 in a counterclockwise direction. Upon the next cocking action when the drive pin 1096 is drawn upwardly, the latch arm 932 will be free to pivot out of the way of further contemplated motion of the drive pin 1096 in a counterclockwise direction. On the right side, the exposure action first operates to withdraw the right drive pin 746 from contact with the right latch spring arm 967, thus permitting the arm 967 to rotate clockwise and change the spring loading of the right latch arm 934. Just prior to the exposure action the right latch spring 944 is bowed so as to load the latch arm 934 for a clockwise motion, whereas when the drive pin 746 is withdrawn from engagement with the latch spring arm 967, the right latch spring 944 is bowed so as to draw the latch arm 934 in a counterclockwise direction. Continued rotation of the lens drum assemblies carries the right drive pin 746 into the position where it can be latched and retained by the trigger arm 1002. The captured pin 746 then serves to prevent unwinding or clockwise rotation of the right clockspring and spacer 784 at the time of the next cocking action when the right cocking arm tab 819 will be removed from its present contacting position, next to the right clockspring spacer 784. This will insure that the right clockspring will remain wound up until the next exposure action.

It is thus seen that the clocksprings alternately drive the lens drum assemblies, and upon a cocking action a clockspring is wound up, which will be employed in the second following exposure action, to drive the lens drum assemblies. The wound-up clocksprings are alternately held by the appropriate drive pin 746, which is latched by a trigger arm, or by the tab 819 on the cocking arm, as the case may be.

*Anti-double exposure mechanism*

In order to prevent unwanted double exposures, the camera of the invention is provided with a means which prevents the depression of the exposure button 930 until operation of the film transport lever mechanism. This anti-double exposure mechanism is illustrated in FIGURES 42–45. Mounted into the housing 3A is a brushing 1130 which is provided with an internal flange 1132. The exposure release button 930 has a reduced portion 1138 which, together with the flange 1132, provides a spring chamber 1134 in which the spring 1136 is assembled. The spring 1136 continually urges the exposure release button upwardly. The lower portion of the exposure release button 930 is slotted as at 1144 to provide two depending furcated portions 1140 and 1142. The slot 1144 permits the exposure release lever 1146 to pass therethrough. The exposure release lever 1146 is provided with an elongated slotted opening 1148 through which a shoulder screw 1150 may pass. The shoulder screw 1150 passes through an opening in the furcated portion 1140 and is threaded into the hole 1152 in the furcated portion 1142. Thus, depression of the exposure release button 930 will cause the shoulder screw 1150 to contact some portion of the slotted opening 1148 and rotate the exposure release lever 1146 downwardly. This sequence of motions is indicated by the arrows in FIGURE 42. To permit alternate operation of the exposure release lever 1146 by a cable release, the ear 1156 is provided. This ear is provided with a recess 1158 which is aligned with a threaded opening 1160 in the housing 3A. Thus, an appropriate cable release will be threaded into the opening 1160 and will be in alignment with the ear 1156. The plunger of such cable will then be able to contact the ear 1156 at the recess 1158 for actuation of the exposure release lever 1146.

Pinned to the outer end of the exposure release lever 1146, as by the pin 1168, is an exposure release lever hub 1171. This hub is generally of rectangular configuration and is provided with a lower slot 1170. This slot 1170 is shallow and serves to guide a lock pin spring 1172 which cooperates with a lock pin 1164, as described hereinafter. This lock pin spring 1172 is hook shaped, with its lower long extending arm being guided within the slot 1170, and its upper short extending arm 1174 being held slightly bent over by the pin 992 (see FIGURE 44). The pin 992 serves to interconnect the exposure release arm 990 with the exposure release lever hub 1171. Actuation of the exposure release lever 1146 by the button 930 serves to urge the spring 1172 in a counterclockwise direction. This motion is resisted by the action of the spring 1136, which urges the button 930, the lever 1146, and the spring 1172 in a clockwise direction.

The lever 1146 is cut out as at 1162 to provide an opening permitting the passage of the lock pin 1164. As shown in FIGURE 43, a bushing 1176 is pressed into the housing 3A. This bushing is provided with a lower slotted portion 1178 which permits the spring 1172 to pass therethrough. Sliding within this bushing 1176 is the lock pin 1164. The lock pin is provided with a slightly enlarged headed end 1180 which has a shallow slotted portion 1182. The pin 1164 is also provided with two opposed and slightly offset slots 1184 and 1186. The slot 1184 cooperates with the slot 1178 to receive the spring 1172, and the slot 1186 is arranged to receive the lever 1146. This pin 1164 is spring loaded by a spring 1188. The spring 1188 is provided with the leg 1190 which fits within the slot 1182 to urge the pin 1164 towards the left as viewed in FIGURE 43. The spring 1188 is further provided with the bent over leg 1192, which is fastened in position by the shoulder screw 1194, which passes through an opening in the leg 1192. As shown more clearly in FIGURE 45, the screw 1194 is threaded into the housing 3A as at 1196 and is provided with the bushing 1198. The bushing 1198 permits the lever 1146, and the hub 1166, to rotate or pivot thereabout. Mounted on either side of the spring leg 1192 are a pair of washers 1200 and 1202. These washers prevent the spring 1188 from slipping or rotating as the screw 1194 is tightened.

The anti-double exposure mechanism cooperates with the film transport lever mechanism (FIGURE 64) so that the surface 3040 of the rapid transport journal ring 2950 will contact the spherical end 2004 of the lock pin 1164, to urge it towards the right as viewed in FIGURE 43. Such action is shown by the arrows in FIGURE 43. In this position the slot 1186 in the pin 1164 will be so located as to receive the lever 1146. The exposure button 930 can thus be depressed, carrying the lever 1146 into the slot 1186. At the same time that this is being done, the spring 1172 is rotated out of the slot 1184 to permit the spring 1188 to urge the lock pin 1164 towards the left. Thus, when the button 930 is released after an exposure, the spring 1172 will ride on the outer surface of the pin 1164, and the lever 1146 will ride on the outer lip of the flange 1180 on the lock pin. Therefore, a second exposure cannot be made until film is transported and the lock pin is urged towards the right again so that the spring 1172 can latch into the slot 1184 to hold the lock pin in position where the slot 1186 of the pin 1164 can again line up with the lever 1146 thus permitting it to be depressed or rotated to effect another exposure.

*Flash gun circuit*

As indicated in FIGURE 1, a flash gun receptacle 17 is provided in the camera for plugging in a flash attachment. Any well known flash attachment may be employed. As indicated in FIGURE 46, this convenience outlet for a flash gun consists of two outer holes 1240 and 1242, into which a two-prong plug can be engaged; and also a concentric inner hole 1244 into which can be engaged a standard concentrically arranged flash gun extension wire plug. Such a standard plug would have a central pin and an outer shell. The central pin provides two contacting elements 1246 and 1248. These two concentric elements are separated by an insulating spacer means 1250. It is thus seen that a two wire circuit may be provided in which the connectors 1240 and 1242 lead to the terminals 1252 and 1254, or else the concentric connectors 1246 and 1248 are led to the terminals 1252 and 1254.

The synchronization and actuation of the flash circuit is shown in FIGURE 36. The two leads 1252 and 1254 are soldered as at 1261 and 1263, respectively, to spring contacting elements 1256 and 1258, respectively. The spring element 1256 is affixed to an insulating block 1260. The insulating block is in turn fastened to the camera housing as by the screws 1268 and 1270. The spring contact 1256 is fitted within a slot 1264 formed in the insulating block 1260, and is fastened to the insulating block 1260 by a screw or pin 1266. The other spring contact element 1258 is similarly fastened to its insulating block 1262.

As indicated in FIGURE 41, at the instant of an exposure, the contact tab 974 on the latch spring arm 966 is in contact with the spring contact 1256 since the latch spring 944 is bowed so as to rotate the latch spring arm 966 in a counterclockwise direction. At the instant of depression of the exposure button and the withdrawing of the trigger arms, the clockspring will commence to rotate the lens drum assemblies, and the right drive pin 746 will be withdrawn from contact with the latch spring arm 967. When this occurs, the right latch spring 944 will be permitted to rotate the latch spring arm 967 in a clockwise direction so that its tab 975 can be placed in contact with the spring contact element 1258. Thus a completed electrical circuit is formed from lead 1252, through the contact spring 1256 and the tab 974, through the metal parts of the camera and back through the tab 975, contact spring 1258, and the lead 1254. This electrical circuit will remain in closed circuit condition until the end of the exposure, when the left drive pin 746 will be brought into contact with the left latch spring arm 966 to rotate it in a clockwise direction and open the circuit by withdrawing the tab 974 from contact with the spring contact 1256. Since the exposures are made by alternate rotation of the lenses in a clockwise and then in a counterclockwise direction, the latch spring arms 966 and 967 will alternately be withdrawn from their respective contact springs to accomplish an open circuit from the time of the end of an exposure, until the next exposure is commenced. In this manner, the flash bulb or other flash attachment will be actuated continuously during an exposure, and will not be actuated when the clock springs are cocked.

*Exposure speed control*

As explained above, the two drum assemblies are driven alternately by the right and left clock springs through the drive belt 798. This drive belt 798 is pinned to the lens drum assemblies by the pins 254, 254 (see FIGURE 34). Tension is maintained on the drive belt 798 by the spring 800. Were the structures to be limited to that just described, then it would be obvious that when the clock spring is released, the lens drum assemblies would commence rotation and increase their rotation at a relatively increasing rate of speed. Thus it is necessary, in order to insure uniform image density and absence of streaking, to maintain a constant rate of travel of the lenses in their relative motion during the picture-taking or picture scanning period. To accomplish this, the invention provides for a pneumatic regulating means which controls or monitors the motion of the drive belt 798, and hence of the lens drum assemblies. As shown in FIGURE 34, the pneumatic regulator 1300 comprises a plunger 1314 mounted on a piston rod 1312, which is in turn mounted to a bracket 1302. The bracket is riveted (as by the rivets 1304 and 1306) to the drive belt 798. The bracket 1302 has the upstanding ears 1308 and 1310 which are provided with recesses to fit around and retain the piston rod 1312 at its outer grooved areas 1318 and 1320 (see FIGURE 48). The piston rod 1312 and and plunger 1314, move within the cylinder 1316, and serve to retard or monitor the motion of the drive belt 798 by compressing the air in one side (i.e., hereinafter referred to as the high pressure side) of the cylinder and metering it out of that side under a controlled metering orifice.

The piston-cylinder arrangement of the pneumatic regulator of the invention consists of the piston rod 1312, which extends out of both ends of the cylinder 1316. As shown in FIGURE 48, there are therefore three contact points which must be maintained in alignment. These points are the points of contact of the piston rod 1312 at each end seal of the cylinder, and also the contact of the plunger 1314 with the cylinder walls 1316. The alignment of three points is rather difficult to maintain, as will be readily understood, and consequently the invention provides a means whereby only two points need be aligned, i.e., namely, the points of contact of the end seals with the piston rod 1312. The construction of the piston plunger 1314 is such that a seal is obtained with the walls of the cylinder, while at the same time permitting a certain high degree of freedom of movement of the piston surface or the sealing surface with respect to the rod 1312. Were a simple O ring arrangement around the plunger 1314 to be employed, and where uniform and fine movement is required as in the instant invention, I have found that the O ring would jump along the walls of the cylinder 1316 in a series of skipping motions. To avoid such a result, the piston of the invention 1314 is constructed as shown in FIGURE 50. The piston body itself is made of two members 1314A and 1314B which are pressed onto the rod 1312, and which provide a peripheral groove 1322.

The newer frictionless materials such as Teflon have slow memories, i.e., when stretched they take a relatively long time to return to their former shape. This is in contradistinction to the characteristics of rubber, such as exhibited by rubber O rings, which have excellent memory and will return to their former dimensions quickly and with very small tolerance. As indicated above, the employment of O rings alone in the groove 1322 would be unsatisfactory, because of the skipping characteristics. It has therefore been found that by placing some better frictionless material, such as Teflon, surrounding the O rings, the friction can be greatly reduced. The employment of the two-part piston is necessary in order to avoid having to stretch the Teflon shoe 1324, as would be necessary if it were to be mounted over O rings found in a one-part piston. The frictionless material such as Teflon is well-known to be very much affected by temperature changes, i.e., its coefficient of expansion and contraction is great. Thus, when a good fit is obtained between the O rings 1326 and 1328, and the Teflon sleeve 1324, no fit at all would exist when the parts are subjected to low temperature, whereas a good fit would be obtained at higher temperature. Accordingly, the dimensions are so chosen that the O rings 1326 and 1328 place the Teflon shoe 1324 under pressure, and by making the sealing surfaces 1330 and 1332 of the Teflon shoe 1324 of very thin dimension, very little dimensional change due to temperature variations will occur in the Teflon around its periphery in the areas under direct pressure from the O rings. The employment of a T-shaped Teflon member 1324 as viewed in FIGURE 50 is, of course, necessary since the central rib extending into the space between the two O rings secures the shoe and prevents it from slipping off of or away from the piston. It requires only slight pressure to deform the portions 1330 and 1332, whereas little deformation will occur against the central rib portion of the Teflon band 1324. It is to be readily understood, of course, that other means than a pair of rubber O rings can be employed to exert outward pressure on the flanges 1330 and 1332 of the Teflon member. As the piston moves within the cylinder and compresses the air on the high pressure side thereof, that air will exert pressure against the O rings so as to seal them and prevent leaks past the piston.

I have found that under extreme low temperature conditions, the Teflon shoe 1324 will contract, thus compressing the O rings 1328 and 1326 in such manner that the seal may be broken between the surfaces of the Teflon shoe and the surface of the cylinder 1316. To avoid this condition there is provided a pair of stainless steel plunger seal supports 1372 and 1374. These supports will exert additional force on the O rings upon assembly, which force is transmitted to the Teflon shoe 1324 to compress it against the cylinder wall, preventing inward movement of the portions 1330 and 1332 away from the cylinder wall which would otherwise occur at extremely low temperatures.

In one camera constructed according to the teachings of the invention, it has been found that no air leaks would occur with the plunger incorporating the support rims 1372 and 1374, down to temperatures of ten degrees below zero. In such an embodiment the flanges 1330 and 1332 of the Teflon shoe were made of a thickness of only three thousandths of an inch. With such thickness the Teflon was found to be very pliable but still leak-proof, and the O ring plus the stainless steel rim combination were found to be sufficient to hold the shoe skirts or flanges against the cylinder wall in opposition to the force applied by the contraction of the shoe under freezing temperatures.

In order to cause uniform movement of the piston 1314 through the cylinder, the air on the high pressure side of the cylinder is forced out through the passages 1334 and 1335, alternately. This leakage of air from the high pressure end of the cylinder is metered so as to control the uniformity of movement of the piston. As the plunger 1314 moves through the cylinder, the air pressure at the compressed side of the system will build up, and this increase in pressure will slowly cause a decrease in the rate of movement of the piston through the cylinder. In order to arrive at a uniform movement, thus effecting a uniform scanning, a pair of relief valves 1336 and 1338 are provided (described more fully hereinafter) which have an adjustment to permit bleed-off of air from the high pressure side of the cylinder sufficient to maintain constant pressure. Therefore, the motion of the piston within the cylinder and, therefore, the motion of the drive belt, will be regulated so that the scanning velocity can be maintained constant. The excess air is bled off of the system through the vent ports 1340 and 1342 associated with the regulating valves 1336 and 1338 respectively. The construction is such that the vacuum created on the low pressure side of the plunger 1314 (see FIGURE 48) is sufficient to close the valve 1338 (assuming the plunger moves in the direction of the arrow) so that no air can either come into or leave that side of the cylinder, but on the high pressure side air is permitted to leave through the vent port 1340. Thus the pressure on the high pressure side is maintained constant.

When the piston 1314 has travelled to its extreme rightward position as viewed in FIGURE 48, it is obvious that some air in the system has been lost and therefore must be replaced. To accomplish this, the rod 1312 is provided with a series of notches 1344, 1346, 1348 and 1350, which are so arranged as to provide a means for placing both sides of the cylinder in communication with atmosphere, at the end of the stroke, so that the pressures can be equalized on both sides of the piston and any air lost in the system can be replaced. When the piston 1314 is in the right extreme position, the notches 1346 and 1350 will be arranged in a position to permit air to pass through the end seals 1352 and 1354, respectively. The thickness or length of the notches is such that it will span the O ring seals at the end of the piston rod. When the piston reaches the left extreme position, the notches 1344 and 1348 permit air leakage.

The end seals are contained in end caps 1356 and 1358, which are mounted on the end of the cylinder 1316. The end caps are provided with bore 1360 and 1362, respectively, into which the end seal cups are pressed. The end seal cup 1354 is similar to end seal cup 1352 and consists of an inverted cup 1364 provided with an internal flange 1366. An O ring 1368 is retained between the flange 1366 and the cap 1356, and an inverted tapered nylon insert 1369 is press fitted into the cup 1364 against the flange 1366. The reverse or inverse shape of the insert 1369 is such as to prevent it from popping out again; which would occur due to the fact that the force on the plunger rod 1312 is not applied at the axis or along the axis of the plunger rod, but is applied offset therefrom because of the bracket interconnection 1302. As a result of the side thrust that is placed on the rod, a bearing must be provided to absorb this side thrust and still retain a seal. This is accomplished by the nylon insert 1369. Were such an insert not provided, then the O ring 1368 would be compressed by the rod on one side, permitting an opening to occur on the other side of the O ring, thus causing leakage. A further air seal is provided by the lip 1370 formed around the insert or cup 1364. Since the cap 1356 is made of nylon, the lip 1370 will deform the nylon in the immediate area and act as a further seal and retention means. Further air seals are effected at the peripheral grooves in the cylinder at 1319 and 1320 and in the nipples 1380 and 1382 of the valve body at 1383 and 1385 (see FIGURE 47). These seals are effected at assembly by filling these grooves with sealing cement.

Referring now to FIGURES 48 and 47, it is seen that the plunger 1314 and the cylinder 1316 form a double ended pneumatic regulator containing provisions for a double stroke. As the plunger 1314 moves to the right as viewed in FIGURE 48, and as indicated above, the air to the right of the plunger will be compressed and flow out of the cylinder through an opening 1334 in the end cap 1358. Similarly, on the reverse stroke, when the plunger 1314 progresses from the right towards the left, the air to the left of the plunger 1314 will be compressed and flow out through the opening or channel 1335 in the left end cap 1356. The end caps are also provided with the bores 1376 and 1378, respectively. These bores serve to receive the left and right nipples 1380 and 1382, respectively, of the valve body 1384. With the plunger moving to the right as shown in FIGURE 48, the compressed air leaving the cylinder through the opening or channel 1334 will flow into the bore 1378 and through the channel 1386, which is drilled diagonally through the right nipple 1382 and the valve body 1384. Conversely, when the plunger 1314 is moving to the left as viewed in FIGURE 48, then the compressed air flowing through the channel or opening 1335 and into the bore 1376, will flow through the channel 1388 drilled into the left nipple 1380 and the valve body 1384. Both of the channels 1386 and 1388 lead to a central opening 1390 in the valve body 1384. Mounted within this opening 1390 is an orifice fitting 1392, which is provided with the central tapered bore or hole 1394 and a transverse bore 1396. This fitting 1392 has an enlarged headed end 1398 which serves to locate the fitting between a pair of O rings 1400 and 1402. The orifice is thus resiliently mounted and sealed between these two O rings. The passage 1394 is closed by the plug 1404, which is in turn held in place by the valve cap 1406 fastened to the valve body by the screws 1408 (only one being shown). Thus, the air flowing through the channel 1386 will flow through a connecting bore 1391, the passages 1394 and 1396, and the channel 1388. The reason for the resilient mounting of the orifice fitting is in order to accommodate for fabrication tolerances, wherein the valve needle 1410 may be slightly off center. Sufficient clearance is thus obtained between the stem of the orifice and the bore into which that stem fits, to provide the necessary movement which is permitted by the rubber cushioned mounting. The needle valve 1410 is of a special shape as described hereinafter and is press fitted into a valve stem 1412 provided with an appropriate bore 1414. The upper portion of this valve stem 1412 is threaded as at 1416 whereby the valve needle 1410 may be positioned into or out of the tapered bore 1394. This is accomplished by means of a gear 1418, when variable or different exposures are desired. Thus, as controlled by the position of the needle valve 1410, air will be metered out of one side of the cylinder 1316, and the amount of metering will determine the speed of movement of the plunger 1314.

It would appear therefore that substantially all of the air which is forced out of one side of the cylinder will flow through the valve, past the needle and orifice, and to the other side of the cylinder. As discussed above, this is not desirable since a progressively slower movement would be obtained due to the progressive increase in pressure in the high pressure side of the cylinder. In order to alleviate this condition a pair of relief valves 1336 and 1338 are arranged on each side of the valve stem 1412. The relief valve 1386 is in communication with the channel 1388, and the relief valve 1336 is in communication with the channel 1386 by means of the respective interconnecting channels 1424 and 1426. The two relief valves are identical and only the relief valve 1336 will be described in detail. The relief valve comprises the bore 1428 which is in communication with the channel 1424. The lower conical portion 1430 of the bore 1428 serves as a valve seat for the poppet valve 1432. This poppet 1432 has an O ring fitting 1434 to effect the seal and is provided with the flange 1436 to receive the valve spring 1438. The force applied by the spring 1438 urges the poppet valve to be seated, and this force is so adjusted that some of the air flowing through the channel 1388 (when it becomes the high pressure side) will exhaust through the channel 1424 leading up through the relief valve opening 1342. When the left side of the valve is operating as the low pressure side, and is at a pressure less than atmospheric, the spring 1438 will maintain the poppet seated so that a seal is maintained, preventing any inflow of fluid past the poppet valve. Adjustment of the spring pressure on the poppet valve is attained by the valve spring follower 1440, which is provided with a lower cup shaped opening 1442 to receive the upper portion of the spring 1438. Positioning of the spring follower 1440 is obtained by adjustment of the screw 1444. The follower 1440 slides within the plug 1446, which is threaded at 1448 to receive the adjustment screw 1444. The plug 1446 has a lower bore 1450 to permit the follower 1440 to slide therein. The lower external portion of the plug 1446 is threaded as at 1452 into the main valve body 1384, and is slotted so as to form a light spaced opening 1342 constituting the relief port. Thus, when the air pressure becomes greater than the pressure existing at the beginning of the picture taking scan it will force the poppet valve 1432 off of the valve seat permitting the excess air to bleed past that valve around the follower 1440, and up through the threaded portion 1452 and out through the relief 1342. Thus, the relief valves will maintain a constant pressure in the high pressure side of the cylinder depending upon the adjustment of the respective adjusting screw 1444. Once the pressure is maintained constant on the high pressure side of the cylinder, it will automatically be maintained constant in the low pressure side. The nature of the relief ports 1340 and 1342 is shown in both FIGURES 47 and 48 as constituting a little slotted portion in the top of the main valve body 1384. It is thus obvious that the relief valves enable the maintenance of a constant pressure in the high pressure side of the cylinder and cause the plunger to travel at a constant rate so that the pneumatic regulator is highly effective for purposes where a constant speed control is required.

It is evident from the above that adjustment of the position of the needle valve 1410 in the orifice fitting 1392 will determine the rate of travel of the plunger and hence the speed at which the lens drum assemblies will rotate. Such adjustment is therefore necessary when different exposures are to be taken in the camera. The means for affecting such adjustment is shown in FIGURES 30, 37 and 47. Changing of the exposure speed setting is affected by operation of the exposure speed knob 1460. This knob is secured by and rotatable about the mounting screw 1462 which is threaded as at 1464 into the upper housing 3A. The portion 1465 of the mounting screw serves as a shaft or shoulder upon which the gear 1466 may rotate. The gear 1466 is provided with the external teeth 1468. The lower portion of the control knob 1460 is provided with the bore 1470. The gear 1466 is reduced in diameter at one end sufficiently to press fit in this bore 1470 such as to lock the two parts together. Rotation of the knob 1460 will therefore rotate the gear 1466.

The pinion 1418 which is mounted on the upper part of the valve stem 1416 is in mesh with the lower portion of the teeth 1468 on the gear 1466. Thus as the knob 1460 is rotated, this rotation is transmitted to the gear 1418, which will then move the valve needle 1410 vertically to effect the desired change in the orifice. The arrangement of a small pinion 1418 in mesh with the elongated teeth 1468 will permit such vertical travel. Assuming that the knob 1460 is rotated clockwise, or in the direction of the arrow as shown in FIGURE 47, the gear 1466 to which it is press fitted will also be rotated clockwise, and the pinion 1418 with the valve stem will be rotated counterclockwise. Therefore the valve needle 1410 and right hand threaded valve stem 1416 will be raised upward moving the valve needle 1410 out of the orifice.

As referred to above the valve stem 1416 contains a right hand external thread 1411 and threads into the fitting 1413. This fitting 1413 is provided with a slotted reduced diameter portion at the top 1415 which is slightly pinched together prior to assembly so as to maintain tension on the threads of the valve stem and in turn to eliminate possible vertical play and resultant errors in the exposure settings. The fitting 1413 also has a recessed portion 1417 which accepts an O ring seal 1419. The seal 1419 is placed under slight compression between fitting 1413, valve body 1384 and the unthreaded lower portion of the valve stem 1412. Thus, leakage of air at this location is prevented. The compressive force referred to above which the fitting 1413 places against the O ring seal 1419, is effected by a set screw (not shown) which is tightened against the tapered surface 1421 thus forcing the fitting downwardly until the rim portion 1423 rests against the bottom of the bore 1425 in the valve body 1384.

An exposure dial 1474 is provided with an internal gear 1472 in mesh with the pinion 1418. The exposure dial will have appropriate indicia on the external surface thereof to indicate the various exposure speed settings. A pair of limit pins 1476 and 1478 are arranged so that the pin 1476 is pressed into the exposure dial 1474 and the pin 1478 is pressed into the top housing 3A. These two pins are so arranged that the dial can be rotated slightly less than a full 360° before the two pins come in contact. The pin 1476 will therefore first hit on one side of the pin 1478 and when it has rotated through its complete travel it will hit on the other side of the limit pin 1478. The limit pin 1478 also serves as a locating pin for the pneumatic regulator valve; fitting into a locating hole as shown in FIGURE 37.

The exposure dial 1474 is journaled within a journal fitting 1480, which fitting also serves as the journal for the iris intermediate gear 688.

As indicated above, the relief holes or slots 1340 and 1342 in the valve stem seats are provided as an equalizer means in order to attain a constant plunger velocity after the initial stroke distance. As indicated in the Equation 1 below, $$\frac{P_L}{P_H} = \frac{A - P_L}{P_H - A}$$

Where:

$P_L$ = Air pressure in low pressure side
$P_H$ = Air pressure in high pressure side
$A$ = Atmospheric pressure the behavior of the regulator when operating with vent holes in the valve, is such, that a constant plunger velocity will be reached when the above equation is satisfied, i.e., the load on the plunger is $P_H - P_L$.

In order to obtain uniform spacing of the exposure speed calibrations it is desirable that the valve stem and orifice be of a particular configuration. The curve of the valve stem tip has been determined by me to be as follows:

Equation 2

$$Y = \sqrt{R^2 - \left[2\left(\frac{9X}{D}-1\right)\right]\left[\frac{1}{10^6}\right]}$$

Where:

X=any distance of travel of valve needle out of orifice, measured from point of seating
Y=radius of valve needle at X distance
R=½ of the maximum diameter of the valve needle (Maximum diameter of valve needle should equal diameter of needle at point of seating in orifice)
D=maximum vertical travel distance of the valve needle into the orifice Alternatively, if it is desired to curve the orifice walls rather than the valve stem tip, and then employ a valve stem with a ball tip, the orifice walls should be formed according to the following equation:

$$Y = RT\sqrt{R^2 + [2^{(100Y-1)}]\left[\frac{1}{10^6}\right]} \quad (3)$$

Where:

Y=clearance between valve stem ball tip at its maximum diameter and the orifice wall at the distance X
X=distance or travel of valve needle out of orifice measured from point of seating
R=radius of ball on valve stem ball tip
(N.B. valve stem radius must be r=R)

In the latter instance the orifice walls may readily be formed by a forming or burnishing tool of the desired shape.

As indicated above, a valve needle having a tip form generated in accordance with the above equation, or a valve having its orifice walls generated in accordance with the above, will provide for equal spacing or the exposure calibrations on the exposure dial. In one embodiment constructed according to the teaching of the invention, nine equal increments of vertical travel of the needle provided a progressive doubling of the exposure from ½₅₀ of a second, down to a time exposure of two seconds (film exposure time rather than total duration of the scan).

FIGURE 49, schematically represents the piston 1314 mounted on the rod 1312 in the cylinder 1316, and for purposes of analysis, the cylinder is divided into six sectors. Assuming that the piston 1314 is loaded by a force L acting towards the left, the piston will initially jump at the beginning of the stroke to the position or through the distance $D_{S'}$, at which time both the high pressure and low pressure relief valves are closed. In this position the forces on each side of the piston will be balanced and performance characteristics of the regulator can be computed from the following formula:

$$ABC\left(\frac{S-E}{S-J}\right) + F = ABC\left(\frac{U+E}{U+J}\right) \quad (4)$$

Where:

A=area of plunger in sq. in. minus cross sectional area of rod
B=actual (uncorrected to sea level) barometric pressure in in. Hg
C=conversion factor to change barometric reading to oz. per sq. in.
E=distance plunger rod needs to travel at beginning of each stroke before seal is effected at end seals (i.e., withdrawing of notches 1344 or 1350 from end seal)
F=friction load or load in oz. which when applied to plunger will overcome friction of plunger on cylinder walls and of plunger rod in end seals
J=initial jump distance
L=load in oz. applied by drive spring to plunger rod
S=actual plunger stroke length plus that additional length (i.e., imaginary extension) of cylinder which would be equivalent to the undisplaced air in the valve passage at the far end of stroke
U=undisplaced volume of air at near end of plunger or at beginning of stroke converted to an equivalent (i.e., imaginary extension additional length of cylinder)

The right side of the equation represents forces attempting to move the plunger through the cylinder towards the left, and the left side of the equation represents forces resisting this movement. Solving the above equation for the frictional load, we obtain:

$$F = \frac{ABC(S+U)(E-J)}{(U+J)(S-J)} + J \quad (5)$$

Solving the above equation for B, the following is obtained:

$$B = \frac{(L-F)(S-J)(U+J)}{AC(J-E)(S+U)} \quad (6)$$

If the above basic equation is solved for J, the initial jump distance, the equation may be expressed as:

$$J = \frac{-[ABC(S+U)-(L-F)(S-U)] \pm \sqrt{[ABC(S+U)-(L-F)(S-U)]^2 + 4(L-F)[ABCE(U+S)+US(L-F)]}}{2(L-F)} \quad (7)$$

Where:

A=area of plunger in sq. in. minus cross sectional area of rod=constant
B=actual barometric pressure (in. Hg) (uncorrected to sea level)=variable
C=conversion factor to change barometric reading to oz./sq. in.=constant
D=travel distance of plunger from start of stroke to any position in cylinder
E=distance plunger rod needs to travel at beginning of each stroke before seal is effected at end seals
F=load in oz. which when applied to plunger rod will overcome friction of plunger (under pressure) on cylinder walls and friction of plunger rod in end seals
J=distance in the cylinder through which the plunger (when exposure button is activated) will initially "jump" before becoming stabilized
L=load in oz. applied to plunger rod by drive spring
S=plunger stroke length plus that additional length which would be equivalent to the undisplaced air in the valve, etc., at the far end of the stroke
U=undisplaced volume of air at near end of plunger or at beginning of stroke converted to an equivalent linear imaginary extension of the cylinder The above equations express conditions existing at the initial jump position of the plunger and were derived based on the assumption that both ends of the cylinder were closed, and also that the relief valves were closed. The following equations are adjusted to express performance characteristics of the pneumatic regulator existing during the stroke after the initial jump and also with the relief valve closed. After the initial jump J, the plunger will continue the stroke at a speed related to the quantity of air being metered through the valve orifice. At all times during this continued travel, the forces on either side of the plunger will remain in equilibrium as expressed by the following equation:

$$P_H\left(\frac{S-J}{S-D}\right)+F-\left(\frac{U+D}{S-D}\right)Y=P_L\left(\frac{U+J}{U+D}\right)+Y+L \quad (8)$$

Wherein the same symbols are employed as in Equation 4, and wherein:

$D=$ travel distance of plunger from start of stroke to any position in cylinder $P_H=$ air pressure force at jump position in high pressure side of cylinder=

$$ABC\left(\frac{S-E}{S-J}\right)$$

$P_L=$ air pressure force at jump position in low pressure side of cylinder=

$$ABC\left(\frac{U+E}{U+J}\right)$$

$Y=$ that portion of the final total air pressure (in oz. per plunger area) in the low pressure side of the cylinder, contributed by air which passed from the high to the low pressure side of the cylinder (i.e., through the orifice) as the plunger moved the distance $(D-J)$.

If the above equation is solved for Y, the following equation is obtained:

(9)
$$Y=\frac{P_H\left(\frac{S-J}{S-D}\right)-P_L\left(\frac{U+J}{U+D}\right)+(F-L)}{\left(\frac{U+D}{S-D}\right)+1}$$

and if the values given above for $P_H$ and $P_L$ are substituted, this equation reduces to:

(10)
$$Y=\frac{ABC(S+U)(D-E)+(U+D)(S-D)(F-L)}{(U+D)(U+S)}$$

The pressure in the high pressure side ($P_{HD}$) at any position after the initial jump position can be expressed as follows:

(11)
$$P_{HD}=P_H\left(\frac{S-J}{S-D}\right)-\left(\frac{U+D}{S-D}\right)Y$$

Substituting for $P_H$ the value $$ABC\left(\frac{S-E}{S-J}\right)$$

and simplifying, we get:

(12)
$$P_{HD}=\frac{ABC(S-E)-Y(U+D)}{(S-D)}$$

The pressure in the low pressure side ($P_{LD}$) at any position after the initial jump position can similarly be expressed as follows:

(13)
$$P_{LD}=P_L\left(\frac{U+J}{U-D}\right)+Y$$

Substituting for $P_L$ the value $$ABC\left(\frac{U+E}{U+J}\right)$$

and simplifying, we get:

(14)
$$P_{LD}=\frac{ABC(U+E)+Y(U+D)}{U+D}$$

Substituting the value of Y from Equation 10 in the above formulae, and simplifying, they become:

(15)
$$P_{HD}=ABC-\frac{(U+D)(F-L)}{U+S}$$

and

(16)
$$P_{LD}=ABC+\frac{(S-D)(F-L)}{U+S}$$

Since, the differential pressure remains constant throughout the stroke after the initial jump, it is always equal to $L-F$, or:

(17)
$$P_O=P_H-P_L=P_{HD}-P_{LD}=L-F$$

where $P_O=$ differential pressure in oz. per plunger area.

The rate of air molecules passing through the orifice throughout the complete stroke of the pneumatic regulator after the initial jump will therefore also remain constant. However, I have found that the time periods for equal sector movements of the plunger tend to increase as the stroke progresses when the relief valves are closed or inactive. Therefore, the quantity of air that must be passed through the orifice in order to maintain the equilibrium, is progressively greater for each equal sector distance travelled by the plunger. Since the force or differential pressure urging the molecules through the orifice remains always constant, the progressively greater quantity required for each successive equal sector of travel in the cylinder will take progressively greater time periods to pass through the orifice. This condition is corrected by the addition of relief valves to the regulator. However, for testing purposes, it is necessary to know these values both with and without relief valves operating.

Since Y represents the contribution of pressure to the low pressure side of the cylinder by molecules having passed through the orifice for any distance D travelled by the plunger, then Y multiplied by the factor $(D+U)$ will be the relative quantity (Q) of molecules having passed through the orifice for the distance D,

(18)
$$Q=Y(D+U)$$

This equation can be applied to each sector as follows:

(19)

$Q_1=Y_1(D+U)=$ relative quantity of air passing orifice for the first sector travel, $Q_2=(2D+U)-Y_1(D+U)$, etc.

From the foregoing it is seen that the total relative quantity of air passing through the orifice as the plunger travels through the second, third, fourth and fifth sectors (the picture-taking "scan") is:

(20)
$$Y_5(5D+U)-Y_1(D+U)$$

Since the time period of the plunger passing through each sector is directly proportional to the quantity of air passing through the orifice for that sector travel, the ratio of "sector time to total scan time" can be expressed as follows:

(21)

Time ratio for 2nd sector=first picture taking sector=

$$R=\frac{Y_2(2D-U)-Y_1(D-U)}{Y_5(5D-U)-Y_1(D-U)}$$

(22)

Time ratio for 3rd sector=second picture taking sector=

$$R=\frac{Y_3(3D+U)-Y_1(D+U)}{Y_5(5D+U)-Y_1(D+U)}, \text{ etc.}$$

From the basic formula for Y, we obtain:

(23)
$$Y_1 = \frac{ABC(S+U)(D-E) + (U+D)(S-D)(F-L)}{(U+D)(U+S)}$$

$$Y_2 = \frac{ABC(S+U)(2D-E) + (U+2D)(S-2D)(F-L)}{(U+2D)(U+S)}$$

etc. Substituting the above values for Y in the previous ratio formulas and simplifying, then:

(24)
$$R_1 = \frac{ABC(S+U) + (F-L)(S-U-3D)}{4[ABC(S+U) + (F-L)(S-U-6D)]}$$

$$R_2 = \frac{ABC(S+U) + (F-L)(S-U-5D)}{4[ABC(S+U) + (F-L)(S-U-6D)]}, \text{ etc.}$$

Using the above formulas and calculating the "sector to total scan time" ratios in one particular embodiment of the invention, it was found that the difference between each sectored ratio remains constant unless an air leak is occurring or the friction F does not remain constant as the plunger travels. Such a change in the friction value would be caused by irregularities in the force or load L being applied by the drive spring.

The behavior of the pneumatic regulator at altitudes other than sea level is important in order to enable one to properly calibrate the exposure speed. It is known that there will be a change or error in exposure time when taking the camera to high altitudes if, for example, the exposure settings on the camera were calibrated at sea level. The exposure duration at any one setting will be directly proportional to the quantity of air molecules passing through the orifice. Because of the decrease in atmospheric pressure with altitude, the quantity of air molecules passing through the orifice at high altitudes will be less than the quantity passing through at sea level. Thus, the exposure duration will also be less.

The relative quantity of air molecules which pass through the orifice at any exposure setting, when the relief valves of the pneumatic regulator are closed or not operating, is equal to $Y(D-U) = "Q"$. Substituting the value for Y derived previously, then:

(25)
$$Q = \frac{ABC(S+U)(D-E) + (U+D)(S-D)(F-L)}{U+S}$$

Where D equals any travel distance of the plunger from the beginning of the stroke.

The expression:

(26)
$$\frac{Q_{2H} - Q_{1H}}{Q_{2L} - Q_{1L}}$$

represents the fraction by which low altitude, or sea level, exposures will be shortened or decreased when the camera is operated at high altitude. $Q_{1H}$ represents relative quantity of molecules passing through orifice for a plunger travel to any position along the plunger stroke. $Q_{2H}$ similarly represents a second position further along the stroke than the first position $Q_{1H}$. The H stands for high altitude and L for low altitude.

The above plunger speed comparison expression is applicable only under the condition of a simple regulator without relief valves, or if the regulator has relief valves the latter would be closed or made inactive. The plunger of such a simple regulator decelerates as it moves from the beginning to the end of the stroke. Because of this decelerating stroke condition, it is advantageous to have low altitude versus high altitude speed comparisons at any point along the stroke. This can be had by substituting in the above expression and simplifying. Thus, the expression (26) becomes:

$$\frac{\text{Relative high altitude time}}{\text{Relative low altitude time}} =$$

$$\frac{AB_H C(S+U) + (L-F)(2D-S+U+X)}{AB_L C(S+U) + (L-F)(2D-S+U+X)} \quad (27)$$

Where $B_H$ = high altitude barometric reading and $B_L$ = low altitude barometric reading, and where D = distance from beginning of stroke to a point or beginning of a segment of the stroke being compared, and where X = length of the segment being compared.

The above equations must be modified to account for the presence of the relief valves. In order to permit the camera to perform at maximum altitude, the relief valves must be set so that they will not begin to release pressure on the high pressure side of the cylinder until at or after the initial jump J occurs at maximum high altitude. I have found that the relief valve will not begin to bleed off air until the plunger arrives at the beginning of the picture-taking scan, i.e., the beginning of sector 2. For safety purposes, however, the values are so chosen that J is assigned a maximum value slightly less D.

As in the case of the simple regulator, without relief valves, the exposure duration of the camera, with the "constant speed" regulator, will be directly proportional to the relative quantity of molecules (Q) passing through the orifice. Since the relative quantity of molecules passing through the orifice will be directly proportional to the pressure in the low pressure side of the cylinder, and since the latter will remain constant, it can be said that the exposure or travel time of the plunger will be directly proportional to $P_{LD}$ (the pressure in the low pressure side of the cylinder). Therefore, at any one exposure setting, the ratio of high altitude to low altitude exposure time can be expressed as follows:

$$\frac{\text{Relative high altitude time}}{\text{Relative low altitude time}} = \frac{H_{LH}}{H_{LL}} =$$

$$\frac{AB_H C + \frac{(S-D)(F-L)}{U+S}}{AB_L C + \frac{(S-D)(F-L)}{U+S}} =$$

$$\frac{AB_H C(U+S) - (S-D)(L-F)}{AB_L C(U+S) - (S-D)(L-F)}$$

Where: $B_H$ = the high altitude barometric pressure, and $B_L$ = the low altitude or sea level barometric pressure.

From the above, and from experiments made with cameras constructed in accordance with the teachings of the invention, I have found that the quantity of air molecules being "bled off" by the relief valve for like points or segments in the plunger stroke, remains constant regardless of the altitude, up to a maximum operating altitude.

Film magazine

As discussed previously, the camera is comprised of three housing portions: the front housing 2, the main housing 3, and the rear housing 4 which may be termed the magazine. This magazine, as indicated in FIGURES 51, 55 and 56 contains several mechanisms. As viewed in FIGURE 55, the right-hand side of the film magazine contains the rapid rewind mechanism 1500. The left-hand side of the magazine as viewed in FIGURE 55 contains the rapid transport mechanism 1600. Closely adjacent to the rapid transport mechanism, and as described hereinafter, is found the frame counter mechanism 1700.

Contained within the magazine 4, and as shown in FIGURE 51, is the film bed pressure assembly 1800.

The film magazine is also provided with a continuous land 1482, which mates with an appropriate opposing continuous groove 1488, only a portion of which is shown in cross-section in FIGURES 51 and 52.

*Film bed*

The details and relationship of parts of the film bed are shown in FIGURES 56, 57 and 58. As shown in FIGURE 57, the film bed assembly 1900 comprises an upper frame 1902 and a lower frame 1904. Affixed to the two frames are two pairs of film bed rails 1906 and 1908, and 1910 and 1912. The rails and frames are held in position by a series of drive screws 1914. The rails are similarly constructed and are generally curved in configuration. Rail 1908 is provided with an upstanding rib 1916 and rail 1912 is provided with an upstanding rib 1917, to permit the employment of a pair of fiducial marks 1918 and 1920, respectively, to be cut into them. The fiducial marks are formed so as to have a vertical portion 1922 and a slanted portion 1924, which place a shadow on the film upon its exposure. The slanted portion 1924 is oriented towards the center of the camera, and the vertical portion 1922 is cut into the rib exactly opposite the axis of the lens when the lens is pointed straight ahead. The distance between the two vertical walls of the two fiducial marks 1918 and 1920 will therefore represent the interocular distance of the camera, or the distance between the axes of rotation of the two lens columns. The two frames 1902 and 1904 are further held together by the two end vertical ties 1926 and 1928, and the central tie member 1930. The end vertical tie member 1926 is provided with a pair of elongated slots 1932 and 1934, the end tie member 1928 is provided with the slots 1936 and 1938. These slots are provided to cooperate with the focusing shaft screw tenons as discussed hereinafter.

The clearance slots 1940 and 1942 are provided to clear similarly shaped bosses on the main body housing 3. Each of the end tie members is provided with a lip 1944 to serve as a means for preventing light rays from getting around the rollers and onto the film, and also to prevent light from getting from one frame aperture to the other frame aperture. Each of the end tie members 1926 and 1928 is provided with a recess 1946 (see also FIGURE 91) to receive the end of the film pressure assembly spring as discussed hereinafter. The end tie members are further provided with a pair of outer lands 1948 and 1950 which serve to prevent scratching of the central portion of the film in the event that the film becomes lax or not tightly stretched around the rollers.

The upper and lower frame members are provided with a series of guide chutes, the guide chutes 1952, 1956 and 1958 being shown in the lower frame 1904. These guide chutes serve to guide the buttons on the film pressure assembly as described hereinafter. These guide chutes also serve to prevent any damage or scratching between surfaces of the pressure assembly and surfaces on the film bed.

The film bed frames are tapered on their external surface at the edge thereof, as at 1960 on the lower frame 1904, which act in a manner similar to the guide chutes in order to guide the film, so that when the magazine is loaded with film stretched across the rollers on the pressure assembly, the tapered portion 1960 receives the film and guides it onto the rails 1906, 1908, 1910 and 1912.

Considering FIGURES 57 and 58, the nature of the central tie member 1930 and its mounting is depicted. The central tie member 1930 is provided with the recesses 1962 and 1964 which serve the same purpose as the recesses 1940 and 1942. The central tie member is further provided with a pair of oversize access holes 1966 and 1968 for the screws 1972 and 1974. A locating pin 1970 is press fit or otherwise assembled to the member 1930. The access holes 1966 and 1968 serve as a means enabling adjusting the film bed with respect to the main housing 3, as shown in FIGURE 58. The screws 1972 and 1974 pass through an alignment plate 1976 which is provided with a hole 1978 and an elongated vertical slot 1980. The locator pin 1970 and the screw 1972 pass through the vertical slot 1980, whereas the screw 1974 passes through the hole 1978. The housing 3 is provided with the hole 1982 to receive the locator pin 1970 (the hole 1982 being of larger diameter than the pin) and the two threaded holes 1984 and 1986 receive the screws 1972 and 1974, respectively. The elongated slot 1980 permits a certain amount of lateral play for the screw 1972 for properly aligning and locating the film bed into the housing 3 of the camera. This adjustment permits movement to the right or the left in order to align the fiducial marks coincident with the axis of the lens. Once the locator plate 1976 is locked into position to align the film bed, the film bed will have no further lateral play. In the alignment of the film bed, the lower screw 1974 serves as a means about which the locator plate is pivoted in order to locate it, with the diameter of the hole 1982 being slightly greater than the diameter of the locator pin 1970 to permit the slight motion necessary for adjustment.

*Film pressure assembly*

The film pressure assembly is shown in FIGURES 55, 56, 57 and 59–62. The assembly consists of two side frames 2000 and 2002 which are formed with bent over flanges 2004 and 2006, respectively. These side frames are generally formed in the double arcing configuration shown in FIGURE 60 to mate with the similarly shaped film bed 1900. The frame members are held in spaced parallel relationship, in part, by the three shafts 2010, 2012 and 2014, upon which the rollers 2032, 2030 and 2034 are mounted, respectively. The nature of one of such identical rollers is shown in FIGURE 61. In this figure, the shaft 2012 is shown as having two reduced portions 2020 and 2024 to accommodate sleeve bearings 2028 and 2026, respectively, which are preferably made of Teflon. Rotatably mounted on the bearings 2026 and 2028 is the roller 2030, which is preferably made of a plastic or hard rubber material. Nylon buttons 2016 and 2018 having extended tenon shaft portions are press fitted into the shaft 2012 and serve to lock the shaft to the side frames 2002 and 2000. The rollers 2032 and 2034 are identically constructed to the roller 2030 as shown in FIGURE 61.

The two side frames 2000 and 2002 are also held in spaced relationship by the spacers 2036 and 2042. As shown in FIGURE 62 the spacer 2036 is essentially a solid shaft having a pair of nylon buttons 2040 and 2038 pressed into holes on each end thereof. All of the buttons 2016, 2018, 2038 and 2040, etc., are formed to have a rounded outer portion so as to guide the film pressure assembly into the film bed upon assembly of the magazine into the main body. The two side frames are further held in spaced relationship by a limit plate 2044. The limit plate is affixed to each side frame by a pair of screw fastenings 2046 and 2048. The limit plate serves to control and limit the movement between the mounting base plate 2050 and the frame structure. The limit plate further serves as a mounting means for the film pressure pad spring 2052 which is fastened thereto as by the screw fastenings 2056 and 2054. The ends of the film pressure pad spring 2052 are fastened as by the eyelets 2058 and 2062 to the film pressure pads 2060 and 2064, respectively.

When the film pressure assembly is not engaging the film with the film bed, such as when the magazine is removed from the main body of the camera, the spring 2052 urges both film pressure pads 2060 and 2064 upwardly with the outturned flanges, e.g., 2070, 2072, etc. contacting the rollers 2030, 2032 and 2034. When the film pressure assembly is engaging the film, the spring 2052 urges the pressure pads against the film with the flanges out of contact with the rollers. As shown in FIGURES 57 and 60, the two film pressure pads 2060 and 2064 are generally arcuate in configuration to form a mating relationship with the film bed 1900. In order to prevent scratching of the image portion of the film, the film pressure pads 2060 and 2064 are formed with raised side rail portions such as 2066 and 2068. The pressure pad 2064 is similarly constructed.

The limit plate 2044 is formed with four large counterbored holes 2074, with which the pins 2076 cooperate. The pin 2076 has a tapered head 2078 which moves within the tapered hole 2074, the pin 2076 being pressed into a hole 2080 in the base mounting plate 2050. This arrangement serves in part to cage the film pressure assembly when the magazine is removed from the camera. The pin 2076 has sufficient clearance between it, its head 2078 and the hole 2074 so that the film pressure assembly can move universally even after it is assembled to the camera magazine. The purpose of this is to enable proper fit of the film pressure assembly within the upper and lower frames of the film bed, even though the magazine may be misplaced due to manufacturing tolerances. The base plate 2050 has a pair of holes 2082 and 2084 for mounting to the magazine housing and has assembled to it a pair of film pressure assembly springs 2086 and 2088. The spring 2088 being shown in FIGURE 60 as being fastened by the screw 2090 to the base plate 2050. The limit plate 2044 is provided with a pair of access holes 2092 and 2094 to permit a screwdriver or other implement to be used to assemble two screws 2090 (only one being shown) to the base plate 2050, i.e., fasten the springs 2086 and 2088 to the plate 2050.

The film pressure assembly springs 2086 and 2088 bear at each end, as shown in FIGURE 59, on the spacer members 2036 and 2042 to exert a pressure urging the film pressure assembly upwardly towards the film bed. In doing so, the film pressure pads 2060 and 2064 will align themselves with the film bed so that the rails 2066 and 2068 will be juxtaposed to the rails 1908 and 1906, respectively. The main springs 2086 and 2088 have sufficient uniform spring motion to permit the film bed to move in and out during the focusing operation as described hereinafter. Thus, at any forward position of the film bed the pressure of the main springs 2086 and 2088 will urge the film pressure assembly into the film bed forcing the film to take the curved path of the film bed. This is shown most clearly in FIGURE 51, wherein the film pressure assembly 1800 is shown as urged into position juxtaposed to the film bed 1900, with the film 4000 following the curvilinear path around the rollers 2030, 2032 and 2034, and between the film bed rails formed on the film pressure pads 2060 and 2064, and the rails 1906 and 1908 on the film bed.

*Film supply and take-up chambers*

The film supply chamber 2100 is shown in FIGURES 51, 55, 80, 82 and 83. The film take-up chamber 2200 is shown in FIGURES 51, 55, 68 and 77.

The film supply chamber 2100 is adapted to hold the film cassette 2102, as shown in FIGURE 51. The cassette illustrated is the standard 36 exposure 35 mm. cassette. However, the camera is provided with means to enable the use of a larger cassette should it become available, in view of the fact that four ordinary frames are required to make one complete stereoscopic exposure in the camera of the invention and a larger film supply is desirable. Such a new, more desirable cassette would be one containing 72 exposures. The camera is therefore provided with the exposure cassette adapter 2104, which preferably is made out of plexiglass material. The adapter 2104 is generally curvilinear in configuration and is provided with the central lock pin or snap button 2106. The snap button 2106 is held in place by a spring retainer 2108. This spring retainer, as shown in FIGURE 83, is a two-pronged bent retainer element which is fastened by the screw 2110 to a flatted area 2112 in the magazine. The enlarged opening is provided in the center of the spring 2108 in order to insure centering of the adapter 2104 when it is assembled into the magazine housing.

In cameras known heretofore, the supply spindle is a short one and engages the bar in the cassette nearest the end of the cassette. However, most cassettes also have a bar down towards the center of the cassette. The spindle in the camera of the invention engages the bar towards the center of the cassette. The reason for this construction is that greater tension is required to pull the film through the magazine of the invention when transporting film, and consequently the cassette must be held at a central position to prevent its cocking and binding the film. In cameras known heretofore, such a construction is not necessary since there is not much tension put on the cassette during the process of transporting film. FIGURE 80 illustrates a cassette 2152 in outline configuration, which is held by the take-up spindle 2150 engaging the central bar 2154 of the cassette 2152. The cassette is centered by the adapter 2104, which in turn is held between a pair of parallel ribs 902 and 904.

*Film supply and rewind mechanism*

The film supply and rewind mechanism is illustrated in FIGURES 55, 56, 79, 80, 81 and 83–85. The rapid rewind or film supply mechanism 1500 comprises a crank ring 1502, which is substantially circular in nature and extends for about 270°. This ring 1502 is pivotally mounted by the pins 1504 and 1506 to a pivot block 1512. The pins 1504 and 1506 are pressed into the bores 1508 and 1510 in the pivot block. The pivot block is further provided with a counter-bored hole 1514 into which a shoulder screw 1516 is passed. The shoulder screw has its threaded portion 1520 threaded into the crank support ring 1518 into the hole 1526. The pivot block 1512 is further provided with a blind bore 1522 and the crank support ring 1518 has a pin 1524 pressed into the hole 1520. The pin 1524 is aligned to move within the blind hole 1522 in the pivot block so that the pivot block and crank ring may pivot around the shoulder portion of the shoulder screw 1516, with the pin 1524 serving as a limit pin for the pivoting motion. The pivot block 1512 is further provided with a drive pin 1528 which is pressed into the inner arcuate surface of the pivot block. The side surfaces of the pivot block 1512 are provided with outwardly extending bosses 1530 and 1532. As shown in FIGURE 79, the boss 1530 has a canted surface 1534 which serves as a limit shoulder for the pivoting movement of the crank ring 1502. The surface 1534 will limit the downward rotation movement of the crank ring as viewed in FIGURE 79. The pivot block 1512 is also provided on one side with detent holes 1537 and 1538. The pivot block is further provided with a clearance groove 1540 on its under surface which permits clearance between the block 1512 and the magazine housing when the ring is in the open or rewind position. Thus, the block will not strike against the magazine housing, which would be the case if it were straight out. The crank ring 1502 is provided with a flatted portion 1542, and pressed into the hole 1544 in this flatted portion 1542 is the pivot pin 1546 on which is rotatably mounted a rewind knob or button 1548. When the pin 1546 is pressed into the hole 1544, the surface 1542 serves as a limit or retaining surface to retain the knob 1548, and the outer shoulder 1547 on the pin 1546 which serves as another shoulder to retain the knob 1548 on the pin. In closed position as shown in FIGURE 80, the knob 1548 partially passes through the recess 1549 in the crank support ring 1518, and fits within the recess 1550 in the magazine housing.

The crank ring 1502 is provided with a peripheral recess 1552, and a further deeper recess 1554. Within the recess 1554 is affixed a spring 1556 which is fastened by the screw 1558 into the threaded hole 1560 in the crank ring. The spring 1556 provides pressure to urge a follower 1561 against a ball 1562 which is mounted within the hole 1564 in the crank ring. As shown in FIGURE 81, the ball 1562 is urged into the recess 1537 which would correspond to the inactive or closed position of the crank ring, and as indicated in FIGURE 79 the ball may be urged into the recess 1538 in the active or open position of the crank ring.

A drive knob 1566 is provided to be rotated within the inner circumference 1503 of the crank ring. The drive knob 1566 is provided with the crown portion 1568 having a series of notches 1569. The notches cooperate with the drive pin 1528, which can enter therein and serve to rotate the drive knob 1566 and the spindle to which it is mounted. For this purpose, the drive knob 1566 is provided with a central squared portion 1570 which fits on a mating squared shaft portion 1571 on the drive spindle 1572. The screw 1574 fastens the knob 1566 on the spindle 1572, and upon assembly rests within the counter bored hole 1575. As shown in FIGURE 80, the squared shaft portion 1571 of the spindle 1572 prevents its rotation with respect to the knob 1566. The sleeve 2151 is provided with a circumferential groove 1576 which cooperates with the ball 1578 and spring 1580 so that the spindle 2150 may be held latched in closed position to prevent the drive knob from popping out during transporting of film.

The ball 1578 and spring 1580 fit within a blind bore 1582 formed within a bushing 1584. Another reason for desiring to prevent the drive spindle from falling out of latched position is to prevent light from entering into the clearance between the spindle sleeve 2151 and spindle bushing 1584. FIGURE 80 indicates the partially outwardly drawn position of the drive knob when it is desired to load a film cassette into the chamber 2100. The spindle 1572 has a headed end 1573 which is formed with an enlarged flange 1575 and is slotted as at 1577 to receive the rib 2154 of the film cassette. The enlarged flange 1575 cooperates with the central boss 1586 on the bushing 1584, to prevent the pulling out and removal of the spindle when loading film. The bushing 1584 is fastened by a pair of screws 1587, 1587 to the magazine housing. The screws pass through slotted portions in a thrust bearing 1589. The bushing 1584 has a reduced shoulder 1590 to retain the crank support ring 1518, which is provided with a mating shoulder 1591. These two mating shoulders 1591 and 1590 also form a light trap.

Referring now to FIGURES 84 and 85, it is seen that in order to rewind film the crank ring 1502 is lifted out of its inactive detented position, shown in FIGURE 80, into its active raised position wherein the crank ring rests against the surface 1534, and the detent ball 1562 is forced into the detent 1538. In this raised position, film can be cranked by rotating the spindle 1572, but only when the crank ring is rotated in one direction. Thus, as shown in FIGURE 85, when the crank ring is rotated in the counterclockwise direction, the drive pin 1528 will engage into a recess 1569 of the drive knob 1566, to rotate it and the spindle to which it is mounted in a counterclockwise direction, so that film may be rewound into the cassette. When the crank ring 1502 is thus rotated in the counterclockwise direction, the pivot block 1512 will pivot counterclockwise around the shoulder screw 1516 so that the pin may engage and drive the drive knob. In the event the crank ring is rotated in the clockwise direction as shown in FIGURE 84, then the pivot block 1512 will pivot or rotate clockwise around the shoulder screw 1516 and withdraw the drive pin 1528 from any engagement with the drive knob 1566. Thus, any clockwise rotation of the crank will not rotate the spindle.

Cooperating with the rollers on the film pressure assembly and with the film leading to the film cassette is an idler roller 1592, which is mounted on a roller shaft 1594 which is journalled in the magazine housing as shown in FIGURES 82 and 83. The roller also serves to prevent binding of the film as the film comes out of the cassette. The roller 1592 is mounted on two bearings 1593 and 1595.

The ribs 902 and 904 project higher on one side, i.e., the inner side of the housing, than on the outer side, as shown in FIGURE 82. This construction prevents the larger 72 exposure cassette from rotating within the chamber since the tangent exit slot of the cassette would bear against the left portion of the rib 904 as shown in FIGURE 82. In the case of the 36 exposure cassette mounted within the adapter 2104, the size of the adapter projects high enough to prevent such rotation.

The chamber 2100 is also provided with a boss 1596 which positions the cassette so that the spindle and sleeve 2150 can readily fit within the opening in the cassette. The shoulder or land 1596 limits the downward movement of the cassette and also prevents inserting the cassette in the wrong direction end for end. If the cassette were inserted incorrectly, the larger diameter of the cassette would set down on the boss or land 1596 and prevent engagement of the spindle.

*Film advance, film take-up and film loading*

The description of the following mechanisms in the camera will be made conjointly with a description of the loading of film into the camera. As discussed above, a film cassette 2152 is first placed into the film supply chamber 2100 by withdrawing the spindle 2150 downwardly as shown in FIGURE 80 until the flanged end 1575 of the spindle 1572 is withdrawn into the recess 1598, so that the end of the flange 1575 is flush with that portion of the chamber. Thereafter, the cassette is properly loaded in the chamber and the spindle 2150 is again reinserted into the mating bore in the cassette until the slotted end 1577 engages the internal bar 2154 in the film cassette. Film may then be drawn out of the cassette with the emulsion side facing upwardly so that it can be engaged into the film take-up spindle.

In connection with the seating of the film in the film bed, I have found that the film as ordinarily supplied in commercially available cassettes will not exactly seat flatly along the curved film bed rails of the camera of the invention, with a variation as much as .015″ to .020″ being detected. This variation in location of the film occurs at or adjacent to the film pressure rollers and will cause the film to be out of focus in these areas. The cause of such bulging in the film was found by me to be due to the reverse bending of the film required at the location of the pressure rollers. This portion of the film, when flexed with the emulsion side out over the pressure rollers, acts as a lever against the free portion of the film extended away from the pressure rollers and around the opposite curve of the focal plane. The resultant leverage or force placed on this adjacent free area of film causes the bulging. The bulge appears most prominent in the middle of the film and tapers to a negligible effect in the area immediately adjacent to the rails.

An additional problem encountered in employing commercially available film was determined to be due to the relative stiffness of the film when it is transported through the film bed assembly. I have determined that the force necessary to overcome the resistance of the film to the reverse flexing around the pressure rollers is greater than the force applied by the pressure assembly, and therefore the pressure assembly will move away from the film bed and allow the film to take a partial straight line path between the supply and take-up spindles. Consequently, after the metering sprocket is locked (as described hereinafter) the length of film which is pulled from the cassette is less than the metered portion and thus insufficient to lie along the full contoured path of the film bed. This may result in inaccurate spacing of the pairs of stereo frames as well as providing insufficient film along the full focal plane curve to accommodate the full 120° scan of the camera. As shown in FIGURE 96, these conditions are alleviated by weakening the area of the film which lies over the pressure rollers so as to provide a difference in the rigidity of the film in this area vs. the rigidity of the film in the focal plane area. This weakened area of the film will then fall in an area between frames which will be removed prior to mounting for viewing. Thus, the film 4000 which is normally provided with the series of perforations 5002 and 5004 on each edge thereof may be additionally provided with a series of cross perforations 5006 and 5008 in the area between frames, and I have found that such a weakening of the film in this area will substantially eliminate the bulging problems caused by the rigid film. The pattern of perforations shown in FIGURE 96 can be so arranged as to guide the camera user in his cutting or separating of the frames of each stereo pair for mounting purposes without having to use any special calibrated film cutter equipment. Thus, if the film is cut on the outside of the two rows of perforations as indicated in FIGURE 96, then the film portions will be properly sized for mounting in a viewer. The two rows of perforations are of standard perforation size and span the width of the perforated film, and the spacing between the perforations in each row matches the spacing between the standard perforations on the edge of the film. This arrangement was found to be best for overcoming the possible malfunctions indicated above and also does not result in scratching of the emulsion surface on the film. However, even without the perforations, results obtained with ordinary film employed in the camera of the invention have been found to be commercially acceptable for the normal human eyesight, since perfect focusing cannot normally be detected throughout the length of each frame.

When the film 4000 has been drawn over the pressure assembly and toward the film take-up chamber 2200, the end tab of the film is ready to be assembled into the take-up spool. The film advance and rewind dial 3202 would first be set in film advance position, in order to permit the metering lock arm to engage the metering lock cam, as described hereinafter. This action will lock the teeth on the metering sprocket so that the film can be placed thereover, and the leader of the film extending from the cassette can be placed into the take-up spindle 2204 (see FIGURES 64 and 65).

The take-up spindle 2204 has a partially hollowed out bore 2206 and a central smaller bore 2208. The spindle 2204 is mounted on the shaft 2210 and held thereto by a set screw 2212 which is fastened against a flatted portion 2214 on the take-up spindle shaft 2210. The take-up spindle 2204 is slit as at 2216 for substantially most of its length. This slit is a chordal slit which is tangent to the inside diameter of the hollowed out portion 2206. The tangential relationship is shown more clearly in FIGURE 68, wherein the film 4000 has been threaded into the slit 2216 and is retained by the film leader clamp 2218 against release. The film leader clamp 2218 is a thin sheet of metal which is rolled into a substantially cylindrical shape with overlapping edges. A retainer pin 2220 is provided to prevent the leader clamp from being forced out of or dropping out of the bore 2206.

After the leader end of the film has been placed within the slit 2216 and against the spring clamp 2218, the cylinder 2204 may be rotated by manually rotating the take-up knob 2302 which will rotate the shaft 2210 and therefore the spindle 2204. A small amount of film can then be wound around the spindle 2204. The film need only be rotated approximately 180° opposite the film metering sprocket, as shown in FIGURE 68.

The manual take-up knob 2302 has a central rib portion 2304 and hollowed out portions 2306 and 2308 to permit ready gripping by the fingers. A set screw 2310 is provided to affix the knob 2302 to a flatted portion 2312 on the shaft 2210. When the film 4000 has thus been rotated to its position approximately 180° opposite the metering sprocket 2402, the teeth 2404 on the metering sprocket (see FIGURE 68), will engage within the perforations 5002 and 5004 on the film 4000. The film is prevented from coming off of the teeth 2404 by the film container and sprocket guide 2224.

As shown in FIGURE 64, the sprocket guide 2224 has relieved portions 2226 and 2228 to fit over the sprocket teeth 2404. The edges of the sprocket guide are provided with lands or ribs 2230 and 2232 which are spaced from the film to form a clearance or gap to permit the film to ride freely, but still retain it on the sprocket teeth. The positioning of these lands on the sprocket guide is controlled by a pair of detent springs 2234 and 2236 which are fastened to the magazine housing as by the screws 2238 and 2240, respectively. FIGURE 68 illustrates the assembly of one of these springs, i.e., detent spring 2234.

FIGURE 67 illustrates the film sprocket guide in open position with the detent spring 2234 riding on the outer surface of the film container flange 2242, prior to latch-in position. Each of the detent springs 2234 and 2236 is formed into a V-like configuration at 2235 and 2237, respectively. These detent portions of the detent springs will engage into mating V-shaped slots 2239 and 2241 in the film take-up container flanges 2242 and 2244, respectively. The film container 2246 is formed of the two flanges 2242 and 2244, which are assembled at the ends of a shell 2248 of generally semi-cylindrical configuration. The flange 2242 is provided on its underside with the peripheral groove 2243, and the flange 2244 is provided on its upper surface with the peripheral groove 2245 to receive the shell, which is then staked or otherwise secured. The shell 2248 also has the outward lip or flange 2250 to enable the assembly of the sprocket guide 2224. The sprocket guide may be permanently fastened or riveted to the flange 2250 of the shell 2248. Both flanges 2242 and 2244 are provided with elongated central slots 2252 and 2254, respectively. These slots enable the assembling and disassembling of the film container for repair purposes.

The film container 2246 is retained in position by spring retaining discs 2256 and 2258 placed at either end thereof. These discs are identically shaped except that the upper disc has a lower depending spring tab 2260, and the lower disc has an upwardly extending spring tab 2262. The spring tabs 2260 and 2262 project into recesses 2264 and 2266, respectively, on the flanges 2242 and 2244, respectively. These spring retaining discs lock the film container into position but permit it to rotate. The film container will rotate on the nylon bearings 2268 and 2270.

With the film threaded into the film take-up spindle 2204 and within the film container, and with the metering sprocket locked, the film is ready to be transported into the film container. Prior to transporting film, the magazine will be assembled into the main camera body as discussed previously. Also, prior to assembling the magazine into the camera, the frame counter dial 2702 (see FIGURES 56, 78 and 88) will be set to a position one frame prior to the frame position number one, i.e., the position indicated at 2703. This position would be determined by an index mark 2705 which would be formed in the magazine housing. The reason for this orientation is that at least one length of film would have to be transported, since this length would have been exposed during the loading operation.

In order to transport film, the film advance release button 2802 would first be depressed. This film advance release button 2802 (shown in FIGURES 56 and 63) is slidably mounted within a bushing or hub 2804 which may be threaded into the housing as at 2806. The release button 2802 is flanged at its upper end at 2808 so that it cannot fall out of the bushing, and the flange also serves as a contacting portion for the film advance arm 2810. The film advance arm is shown in FIGURES 63 and 55 as constituting an elongated centrally U-shaped member. One end of the arm is generally L-shaped with an upper short portion 2812 and a depending portion 2814. The portion 2814 is rounded at its extreme right end 2816 to form a contacting portion for the flange 3808. The U-shaped central portion is formed by the depending leg 3818 which combines with the central portion 2812 and the opposite depending leg 2814 to form a housing for the torsion spring 2820. A hole is drilled through the legs 2814 and 2818 to accommodate a spaced bushing 2822, and this assembly is held in position by the screw 2824 which passes through a hole 2826 in the magazine housing and threads into a tapped hole 2828 in an opposing wall of the magazine housing. The magazine housing 4 is so formed as to provide a well between the walls 2830 and 2832 to accommodate this assembly. The torsion spring 2820 is wrapped around the bushing 2822 with one leg of the spring 2834 being positioned against the upper portion 2812 of the film advance arm and the lower end 2836 of the spring rests against the housing so that the lever arm is urged in a clockwise direction against the release button 2802, thus urging it constantly outwardly. The lever arm will thus pivot about the bushing 2822 and when the release button 2802 is depressed, the lever arm will rotate counterclockwise and the opposite headed end 2840 of the leg 2814 will move downwardly as viewed in FIGURE 63. This action is shown in FIGURE 69 wherein the two positions of the film advance lever arm 2810 are indicated. The broken line position is the position to which the lever arm is drawn when the film advance button has been depressed. In this position, the film advance arm contacts the metering sprocket lock arm 2842.

As shown in FIGURES 69 and 70, the metering sprocket lock arm comprises a generally flat sheet metal part with an upper lock tab 2844 and a lower flange 2846 which has a downwardly extending tab 2848. The metering sprocket lock arm has a central hole 2850 therethrough into which is riveted or crimped the bushing 2852. A shoulder screw 2854 is passed through this bushing and threaded into the magazine housing as shown in FIGURE 70, so that the metering sprocket lock arm can pivot about the shoulder screw. The metering sprocket lock arm is loaded by the torsion spring 2856 which has one end thereof 2858 resting against the base of the magazine housing and the other end thereof resting against the underside of the flange 2846 and retained in place by the tab 2848, so that the metering sprocket lock arm 2842 is constantly urged in a counterclockwise direction as viewed in FIGURE 69 by the spring 2856.

When the film advance lever 2810 is depressed as indicated by the broken line position in FIGURE 69, and the metering sprocket lock arm is rotated clockwise as indicated by the broken line position in FIGURE 69, the tab 2844 is lifted out of a slot 2862 in a metering sprocket lock flange 2864.

As shown in FIGURES 78, 86 and 87, the metering sprocket lock shaft 2866 is formed so as to be provided with an upper small reduced area 2868; sprocket wheel bearing portions 2870 and 2872; a central reduced portion 2874 provided with a threaded hole 2875; a retainer groove 2876 which accepts the retainer ring 2877. The retainer ring 2877 will loosely hold in assembly the bushing 2879 and spacer member 2883. The bushing 2879 and spacer 2883 will fit on the area 2878 of the shaft 2866. A gear 2881 is pressed onto the surface 2880 of the metering sprocket shaft 2866, and against the lock flange 2864. A reduced bearing surface 2882 cooperates with the curved surface 2843 on the lock arm 2842.

When the metering sprocket lock arm 2842 is rotated clockwise as shown in FIGURE 69, in addition to the tab 2844 being lifted out of the slot 2862 in the metering sprocket lock flange 2864, the squared opening 2887 in the arm 2842 will also be repositioned so that the flatted portion 2886 on a worm and metering sprocket cam shaft 2884 will be relieved of the restraining force imposed by the spring loaded lock arm 2842. The shaft 2884 will then be free to rotate. This shaft, as shown in FIGURE 78, is driven by the metering sprocket shaft 2866 through the gears 2881 and 2914. The shaft 2884 comprises a smaller reduced end 2888, the main shaft portion 2890 which has formed centrally thereon the helical worm 2892, a flange 2894 and a shaft area 2896 upon which the gear 2914 is mounted. The gear 2914 is provided with the hub 2916 which has a threaded hole 2917 to enable the set screw 2918 to fasten the gear to the shaft 2884.

As further shown in FIGURE 86, when taken in conjunction with FIGURE 78, the shaft 2884 is held in position by the diamond shaped bushing 2898. The bushing 2898 is formed with the central hub portion 2902 providing the bearing surface 2904, and two wing portions 2908 and 2906 which are provided with the holes 2912 and 2910, respectively. These holes enable the bushing to be fastened to the magazine housing and also serve to position the bushing 2898 and the shaft 2884. The other end of the shaft pilots on its reduced end 2888 into a bore 2889 in the magazine housing. Similarly, the metering sprocket shaft 2866 pilots on its reduced end 2868 in a bore 2867.

When the metering sprocket lock arm 2842 rotates counterclockwise to permit the rotation of the two shafts 2884 and 2866, it also removes its spring loading from a pin 2942 which was contacted by the undersurface 2943 of the lock arm 2842. This pin 2942 is pressed into the hole 2940 in a lower clutch release arm 2928 as shown in FIGURE 76. This clutch release arm 2928 is mounted on the surface 2922 of a shaft 2920 by a pin connection 2932. The body 2938 of the arm 2928 is relieved as at 2941 to provide clearance for the operation of the gear 2914 as indicated in FIGURE 68. The release of the spring pressure against the pin 2942 will permit the shaft 2920 to rotate and permit movement of the upper clutch release arm 2926. This arm comprises a long, thin extending member 2936 and a central hub 2924 which is fastened to the shaft 2920 by the set screw 2930. The arm 2926 passes through a slot 2952 in a rapid transport journal ring 2950 (see FIGURE 64). The operating relationship of the arm 2926 is indicated in FIGURE 77 as contacting a downwardly extending leg 2956 of the clutch spring 2954. When the metering sprocket lock arm is rotated, and the lower clutch release arm is freed from motion, the upper clutch release arm 2936 will release its pressure against the leg 2956 of the clutch spring 2954.

Considering FIGURES 64 and 65, the depression of the film advance button 2802 which in turn operated the film advance arm 2810, the metering sprocket lock arm 2842 and the clutch release arms 2926 and 2928 will now permit the rapid transport of film. This is attained by the release of the torsional load on the clutch spring 2954. The clutch spring 2954 is mounted on a hub 2968 of a planet carrier 2970. The hooked end 2958 of the clutch spring is retained and looped around the pin 2964 which is pressed into a flange plate 2966.

The flange plate 2966 provides a bearing and retaining means for the journal ring 2950. This is accomplished by the hub portion 2967 which serves as the bearing for the journal ring and the flange portion 2972 which retains the journal ring in position. This flange plate is fastened in position by the two screws 2974 and 2976 which thread into the magazine housing and which pass through arcuate slots 2978 and 2980, respectively.

These arcuate slots permit the rotational adjustment or positioning of the flange plate 2966 so that the pin 2964 to which the end of the torsion spring is anchored can be repositioned. Internally the flange member 2966 has a recessed area 2982 adjacent the pin 2964 to accommodate the end 2958 of the spring 2954, and also is provided with the land 2984 to support the base coil of the spring 2954 and the internal land 2986 to support the base hub 2968 of the planet carrier 2970. The recess 2982 is of such dimension as to permit slight movement of the hooked end 2958 of the spring 2954 away from the pin to take care of the backlash necessary to permit the film to seat properly on the film bed. Also, it serves as a stop against which the hook portion of the spring bears with pressures applied to the longer end 2956 of the spring to provide a clutching action against the hub 2968 of the planet carrier 2970. The planet carrier 2970 is centrally positioned by the bushing 2960, on whose surface 2962 the planet carrier rotates. The bushing 2960 is pressed into the magazine housing on its surface 2963.

As stated above, the flange plate retainer member 2966 retains the journal ring 2950 upon its flange 2972. This flange 2972 will bear against an internal flange 2990 on the journal ring 2950. A thrust spacer member 2992 is inserted between the bottom of the journal ring 2950 and the magazine housing. The journal ring provides a housing for the planetary gear drive mechanism shown in FIGURES 64, 65 and 66. This planetary gear system comprises the central sun gear 2222 which is pressed onto the shaft 2210, and the planet gears 2992, 2994 and 2996 which are rotatably mounted on the studs 2998, 3000 and 3002, respectively, formed on the planet carrier 2970. The external ring gear 3004 completes the planetary gear assembly which is housed within the journal ring 2950.

As stated previously, the planet carrier is journalled upon the surface 2962 of the bushing 2960. The ring gear 3004 and the rapid transport arm 3008 are fastened to the land 3006 in the journal ring 2950 by the screws 3010, 3012 and 3014, which pass through appropriate holes in the transport arm 3008, the ring gear 3004, and into the threaded holes 3016, 3018 and 3020 in the journal ring. Thus, the manipulation of the transport arm 3008 will rotate the journal ring 2950 and the ring gear 3004.

Rotation of the ring gear is limited to arcuate travel by means of a stop pin and spring detent arrangement. The journal ring 2950 has a stop pin 3022 pressed into a hole 3024 on the underside thereof (see FIGURE 64); and this pin cooperates with a stop pin 3026 pressed into a hole 3028 in the magazine housing (see FIGURE 65). These two stop pins 3022 and 3026 will limit rotational movement in one direction, and rotational movement in the other direction is limited by the spring detent 3030 which is fastened by the screw 3032 to the magazine housing and which has the bent portion 3034 which is adapted to latch into a recess 3036 in the journal ring 2950. (See FIGURE 66.) Thus, the rapid transport arm 3008 will oscillate the ring gear between the two extreme stop positions determined by the pins 3022 and 3026 on the one hand, and the detent 3030 on the other hand. This oscillatory movement of the ring gear will be transmitted through the planetary gears to the sun gear 2222. Since the sun gear is fastened to the shaft 2210, it will rotate it and also the film take-up spindle 2204, to transport film into the film container 2246.

The journal ring 2950 is provided with a large side opening 2952 which has the flatted cam surface 3040. This cam surface 3040 operates the anti-double exposure lock pin 2004 (see FIGURE 43). A floating retaining washer 3041 serves to retain the planetary gears in position. Access holes 3042, 3044 and 3046 are provided to reach the screws 2974 and 2976 for adjustment purposes.

Referring again to the operation of transporting film, we have seen that the rotation of the metering sprocket lock arm which was caused by operation of the release button 2802 removed the pressure against the pin 2942 on the lower lever arm 2928. By this release of pressure, the shaft 2920 is free to rock and the upper arm 2936 will release pressure on the clutch spring 2954. Since the spring 2954 is mounted to grip the hub portion 2968 of the planet carrier 2970, it serves as a clutch or brake. In FIGURE 64, the arm 2936 is shown as contacting the leg 2956 of the spring 2954, thus preventing it from acting as a brake, and when the lever arm 2936 is permitted to rotate it will free the end of the spring 2954, thus permitting it to act as a brake and prevent rotation of the carrier 2970. This prevention of rotation of the planet carrier will cause the planet gears to rotate on their stub shafts and therefore transmit rotary motion from the ring gear 3004 to the sun gear 2222. Rotation of the arm 3008 will result in opposite rotation of the spindle 2204 and the winding of film from the supply side to the take-up side.

Since the film which is being drawn into the film container 2246 has the notches 5002 and 5004 which engage the sprocket teeth 2404, the movement of the film will rotate the metering sprocket 2402. Fastened to the metering sprocket shaft 2866 in the threaded hole 2875 is a drive screw 3050. As viewed in FIGURE 68, the movement of the film towards the left as indicated by the arrow will cause clockwise rotation of the metering sprocket 2402. This metering sprocket will transmit its rotation to the metering sprocket shaft 2866 through the drive screw 3050. The metering sprocket 2402 has two outer enlarged portions 2401 and 2405 on which the sets of sprocket teeth 2403 and 2404 are provided. The relieved portions 3052 and 3054 provide clearance to avoid scratching of the film, and a central reduced diameter portion has a window opening 3056 through which the drive screw 3050 projects. Mounted over the window opening is an adjustment band 3058 which is arcuate in shape and is provided with a window opening 3060 and two slotted holes 3062 and 3064. This adjustment band 3058 is fastened to the reduced portion 3055 of the metering sprocket 2402 by the screws 3066 and 3068 which fasten into the holes 3070 and 3072, respectively. The purpose of the adjustment band is to provide backlash by means of the slot 3060 which is wider than the diameter of the head of the driving screw 3050. Backlash is necessary to permit the partial pull-off of film from the take-up spindle 2204. This backlash or take-up of film is necessary in order to permit the film to fit tightly about the focal plane of the film bed. The adjustment feature is also necessary in order to eliminate the effect of the film taking a straight line path from the rollers to the metering sprocket and also around the rollers. This straight line path is caused by the fact that the pressure assembly is spring loaded to permit focusing. The pulling of the film on the film pressure assembly causes this partial straight line path. An additional reason for the adjustment band is to enable the location of the perforations on the film with respect to the fiducial marks on the rails of the film bed. The fiducial marks can thus be made to lie between two perforations rather than on a perforation. The adjustment of the band 3058 will accomplish the misalignment of the window openings 3056 and 3060 to vary the amount of backlash between the metering sprocket 2402 and the shaft 2866.

The sprocket 2402 will therefore drive the shaft 2866 and the gear 2881 which is pressed thereon. This gear will transmit its motion to the gear 2914 as described previously, and thus cause the rotation of the cam shaft 2884. Since the rotation of the film metering sprocket has been preceded by the depression of the button 2802 and the lifting of the tab 2844 out of the slot 2862 on the flange 2864, both shafts 2866 and 2884 will be free to rotate. The relative position of the two shafts is shown in FIGURES 69 and 71–74. The gears 2881 and 2914 are arranged so that the gear 2881 drives the gear 2914 at a ratio of 3:4. The relative positioning of the cam 2886 and slot 2862 for each full rotation is shown beginning with FIGURE 69. FIGURE 69, as indictaed above, illustrates the position of the parts at the moment the metering sprocket lock arm 2842 is raised. As the film rotates the shaft 2866 one full rotation, the positions shown in FIGURE 71 will be attained. In this position the slot 2862 is in alignment with the tab 2844, however, the arm 2842, even though it is spring urged counterclockwise by its spring 2856, will still not move counterclockwise to drop the tab 2844 into the slot 2862 since the cylindrical surface of the cam 2886 is still bearing against the squared opening 2887 and preventing such motion. After a third full revolution, the positions shown in FIGURE 73 are attained where the cam 2886 still prevents downward motion of the lug or tab 2844 into the slot 2862. When the fourth full revolution is attained as shown in FIGURE 74, the slot is in alignment with the tab 2844 and the flatted surface of the cam shaft 2886 is presented squarely to the opening 2887 so that the arm 2842 can rotate counterclockwise and drop the tab 2844 into the slot 2862. Thus, sufficient film will have been transported over the metering sprocket so as to present new unexposed film for the next exposure, and also the previously completely exposed film will have been drawn into the film container. Further transporting of film will not be permitted until the button 2802 is depressed, since the metering sprocket arm is now locked by the tab 2844 and film cannot pass over it. In the commercially available film, the camera would employ 32 perforations of film for the two stereo images. The sprocket as shown in FIGURE 78 contains two sets of eight teeth 2404, 2404. Accordingly, this is the reason for the requirement of four revolutions of the metering sprocket shaft to attain the transporting of the 32 perforation length of film. During the rotation of the two shafts from FIGURE 69 to FIGURE 74, the tab 2844 will ride on the outer rim or surface of the flange 2864, and the button 2802 can be released once the rotating of the metering shaft has commenced. Also, when the parts have reached the position shown in FIGURE 74, the rotation of the metering sprocket lock arm counterclockwise will again bring the surface 2943 of the lock arm into contact with the pin 2942, thus rocking the clutch lever shaft and clutch arms to deactivate the clutch spring 2954. This action will release the pressure against the hub 2968 of the planet gear carrier 2970 so that the planet carrier 2970 can bodily rotate. When this happens, the drive between the transport arm 3008 and the take-up spindle 2204 is broken since the gear carrier will revolve freely and the gears 2992, 2994 and 2996 will freely planetate on their gear hubs. Thus, even if the operator continues to actuate the transport arm 3008, no additional film will be transported over the metering sprocket and it is impossible to tear any film.

As stated previously, the operation of the transport arm 3008 in its oscillatory motion causes only unidirectional motion of the shaft 2210. This is attained by the elements shown in the upper broken away portion of FIGURE 64. This one-way rotation is assured by the anti-rewind clutch spring 3100. Since the sun gear 2222 is affixed to the shaft 2210, this spring 3100 will effectively provide a one-way clutching of the sun gear.

Actuation of the one-way anti-rewind clutch spring 3100 is obtained by the leg 3112 of the spring. A journal bushing 3102 pressed into the magazine housing 4 forming a bearing for the shaft 2210 and also serves as an upper caging means for the spring 3100. The journal bushing 3102 comprises a reduced portion 3104 which accepts the nylon bushing 2270, a larger area 3106 is the diameter that makes a press fit into the magazine housing 4 as shown in FIGURE 65, the relieved area or groove 3108 is provided to retain the journal in pressed position and the enlarged head 3110 serves as the support for the leg 3112 of the spring 3100. The spring 3100 also is provided with the downwardly extending hooked leg 3114. This spring fits within a spring clutch cam 3116. This cam member is formed with an upper flange 3118 and a lower hub portion 3120. The upper flange portion is provided with a curved elongated slot 3122 to enable adjustable fastening of the cam member to the housing, as shown in FIGURE 65. The cam member is fastened within a recess 3121 in the magazine housing by the screw fastening 3124. The elongated slot 3122 permits the positioning of the cam 3116 and thus will change the location of the leg 3114 of the spring. This cam member 3116 is provided with an internal bore 3117 which serves as a chamber for the spring 3100 and also has a bore 3130 which serves to capture the leg 3114 of the spring. The clutch spring 3100 is therefore anchored by its leg 3114 extending into the hole 3130. The upper leg 3112 of the spring will therefore be freely extending so that it can be moved to enable the spring to grasp tightly against the shaft 2210 when it is desired to clutch it. The cam member 3116 is further provided with the elongated slot 3126 in the flange 3118 which is adjacent to and runs into the central bore 3117. The cam member 3116 is also formed with a side opening 3132 through which the spring leg 3112 will project. The clearance opening 3126 will permit the assembling of the cam member 3116 over the spring. The land 3128 serves as the base of the chamber housing the spring. The leg 3112 of the spring 3100 will be permitted to rotate approximately 45° between the ends of the opening 3132 in the hub 3120 of the cam member 3116. When the spring is expanded, the chamber 3117 will maintain the spring concentric with the shaft and away from it so that no friction is imposed upon the shaft by the spring. The spring is actuated into this open position by the leg 3112 being moved by a spring actuator or actuating arm 3140. The actuating arm 3140 is generally U-shaped and comprises a central portion 3142 which has an upstanding flange 3144 and the leg members 3146 and 3148. The leg portion 3148 has a depending tab 3150 which serves as the actuator for the spring extension 3112. The leg portion 3146 has a hole 3154 to accept a spacer bushing 3152. The spacer bushing is flanged at 3156 and has a central bore 3158 to accept the screw fastening 3160. The screw 3160 is threaded into the housing to hold the spacer 3152 in position. The actuating arm 3140 is thus rotatably mounted around the bushing 3152. The leg 3146 is also provided with a depending tab 3162. The tab 3162 has a cut-out portion 3164 to serve as an anchor for the spring 3166 which loads the arm 3140. As shown in FIGURE 69, the spring 3166 urges the arm 3140 in a counterclockwise direction around the pivot provided by the bushing 3152. The other end of the spring 3166 is hooked around a pin 3170 into a groove 3172 on the pin. (See FIGURE 64.) The pin 3170 is pressed into the magazine housing and also serves as a stop pin to limit the movement of the selector dial 3202. Another stop pin 3174 pressed into the housing is provided to serve as a second stop pin for the selector dial. The selector dial has a pin 3204 pressed into the outer circumference which serves as the limit means in contacting the two stop pins 3170 and 3174. The selector dial 3202 will thus be permitted to move a distance of approximately 90° as shown in FIGURE 75.

FIGURE 75 shows the parts in the rewind position of the selector dial 3202. The selector dial is formed with a flange portion 3206, and outer boss 3208 and an inner boss 3210. The selector dial is cut away to provide two cam surfaces 3212 and 3214 for actuating the arms 3140 and 2842 as shown in FIGURES 69 and 75. The selector dial 3202 has a central blind bore 3216 so that it can be freely rotatably mounted on the hub 3120 of the cam member 3116. The selector dial 3202 is retained in position by the cap member 3240 which is provided with a land or stepped portion 3242 for this purpose. This stepped portion rests on the flange 3206 and permits the boss 3208 to project through the opening 3244 in the cap member 3240. The underside of the cap 3240 will be appropriately inscribed to indicate the film advance and film rewind positions.

The selector dial when rotated into the film advance position, presents the cam surfaces 3212 and 3214 parallel to the leg 3144 of the arm 3140 and the leg 2843 of the arm 2842. This position is shown in broken lines in FIGURE 69. When the selector dial 3202 is rotated through its 90° travel into the position shown in FIGURE 75, the cam surfaces 3212 and 3214 have moved the two arms 2843 and 3144 apart so that the tab 2844 is lifted out of the slot 2862 and held in such position, and also the opening 2887 is raised away from the cam shaft 2886 to permit its free movement. At the same time, although the pressure of the surface 2943 has been removed from the pin 2942, the activating arm 3140 having been rotated clockwise by the cam 3202 continues to maintain pressure on the arm 2928 keeping the clutch spring 2954 open permitting freedom of movement of the take-up spindle 2204. During this same motion which causes clockwise rotation of the actuating arm 3140 around its pivot, the tab 3150 will contact the extension 3112 of the spring 3100 and will cause the spring to unwind from the shaft 2210, thus releasing its clutching effect on the shaft. The film can freely be unwound from the spindle 2204 and out of the film container over the sprocket 2402 which will then rotate clockwise as viewed in FIGURE 75, and counterclockwise as viewed in FIGURE 68, so that the film 4000 will be rewound into the film cassette. Thus, all of the conditions necessary to permit winding of film will be met, and in addition the elements which clutch the sun gear and planet carrier will be released from the planetary drive mechanism so that operation of the transport lever 3008 will not interfere with the rewinding of the film.

The cap member 3240 (see FIGURE 64) is provided with the three holes 3260, 3262 and 3264 for assembling the cap to the magazine housing. The cap is also provided with the blind holes 3266 and 3268 to accept locating pins 3270 and 3272 provided in the magazine, as shown in FIGURE 69, for proper assembly of the cap to the magazine housing. The selector dial 3202 is provided with a central rib 3274 to enable ready manipulation thereof.

*Frame counter mechanism*

The frame counter mechanism 1700 is illustrated in FIGURES 56, 78, 86, 87 and 88. As shown in FIGURE 78, the worm 2892 formed on the cam shaft 2884 is in mesh with the worm gear 1706 mounted on a frame counter shaft 1708. A knob 1710 is provided with finger grip notches 1712 and a central bore 1714 to form a housing for a spring 1716 which rests against a land portion 1718 forming the bottom of the bore. The other end of the spring 1716 bears against a shoulder screw 1720. The shoulder screw is threaded into a threaded hole 1722 in the shaft 1708. The spring normally urges knob 1710 against housing 4 but yieldingly permits the lifting up of the knob 1710, which will in turn lift the dial 2702 out of its position with respect to the indicia mark 2705. The dial will then be rotatable into different positions to align the indicia mark 2705 with the various frame numbers printed on the dial 2702. The knob 1710 is staked or otherwise affixed to the dial 2702 and is also provided with two drive pins 1723 and 1724 which are pressed into the bores 1726 and 1728, respectively. These drive pins cooperate with the teeth of a gear 1730 pressed onto the shaft 1708 against a spacer 1732 which also serves as a bearing surface. The shaft 1708 rotates within the bore 1740 in the magazine housing.

FIGURE 86 indicates the frame counter knob and dial in operating position, and FIGURE 88 illustrates the knob and frame counter dial 2702 in raised position with the pins 1723 and 1724 raised out of engagement with the gear 1730 for reorienting of the indicia 2703 on the dial 2702 with the indicia mark 2705 on the housing. On the opposite end of the shaft 1708 is a reduced section 1742 having the flatted area 1744. Mounted on this reduced section is a drive gear hub 1748. The drive gear hub has a hub extension 1750 and a through bore 1751. A radial threaded hole 1752 is provided to receive the set screw 1754 for fixedly mounting the gear hub 1748 on the flatted portion 1744 on the shaft area 1742. Mounted upon the hub 1750 is the worm gear 1706. This worm gear is provided with two arcuate slots 1760 and 1762 to receive the screw fastenings 1756 and 1758. The drive gear can thus be adjusted within the limits of the arcuate slots 1760 and 1762. The screw fastenings 1756 and 1758 are threaded into the tapped holes 1764 and 1766 in the gear hub 1748. Thus, the worm gear 1706, the hub 1748 and the shaft 1708 will rotate as a unit and therefore rotate the gear 1730 as the film is drawn over the metering sprocket 2402. The film frame counting dial 2702 will therefore be rotated when the drive pins are in engagement with the gear 1730 and as the film is drawn over the metering sprocket.

*Focusing mechanism*

The focusing mechanism is illustrated in FIGURES 10, 51, 57 and 89 through 93. The focusing mechanism moves the film bed 1900 towards and away from the lens drums so as to carry the film towards and away therefrom. All the motion occurs inside of the camera and thus there are no parts to be extended out away from the camera.

The movement of the film bed is accomplished by a series of four focusing shaft screws 3602, 3604, 3606 and 3608. These screws have pinion gears 3610, 3612, 3614 and 3616, respectively, pressed on a reduced section of said screws. Referring now to the detail of one of the said focusing screws (shown in FIGURE 92), it is seen that the screw 3602 which has the gear 3610 pressed on one end thereof is formed with a reduced tenon 3620 at the other end thereof. The main body housing 3 is provided with the opening 3622 into which an internally threaded bushing 3624 is pressed. The focusing screw 3602 can thus be threaded upwardly or downwardly through the bushing 3624. Riding within the slot 1932 is a plastic flanged bearing 3626 into which the tenon 3620 projects. Thus, as the four focusing screws are threaded to move vertically upwardly or downwardly, they will push upon the film bed 1900 upwardly or downwardly so as to permit the film bed to move towards or force it away from the lenses. This motion is resisted by a focusing detent spring 3630 as well as the film pressure assembly 2002, which provides pressure against the film bed at the relieved area 1946 and on the film bed rails, respectively, to constantly urge the flanged bearing 3626 into contact with the shoulder formed between the threaded portion and the tenon 3620 on the focusing screw 3602. The remaining three focusing screws are similarly constructed.

As shown in FIGURES 89A, 89B and 57, the pinion gears 3602 and 3604 are in mesh with a ring gear 3632 and the pinion gears 3606 and 3608 are in mesh with the ring gear 3634. The gears 3632 and 3634 are fastened to the focusing drums 3636 and 3638, respectively. The two focusing drums 3636 and 3638 are identically constructed and only the drum 3638 will be described in detail. The drum is generally cylindrical in shape and on its outer periphery it has a single cable groove 3640. The cable 3642 will lie within the grooves in the focusing drum. A clearance opening 3644 is provided through the focusing drum in order to obtain access to a limit screw 3646 (see FIGURES 91 and 57) which is fastened into the main housing. The gear 3634 is also provided with an access hole 3648 which is aligned with the clearance opening 3644 on assembly to permit a screwdriver or other implement to be inserted to reach the screw 3646. This limit screw limits the rotary movement of the drum as shown in FIGURE 90. The underside of the drum 3638 has an arcuate slotted opening 3650, and the head of the stop screw 3646 will hit the edges 3652 and 3654 at the extremes of the rotary travel of the focusing drum.

The central part of the drum 3638 is provided with the through hole 3660 to permit rotation thereof. An intermediate circular groove 3662 is provided to form an inner drum 3664 around which the cable may be wound.

The focusing drum 3638 has the upper surface 3651 against which the gear 3634 will be assembled, and also a locating lip 3652 for the gear 3634. The gear 3634 is then fastened to the focusing drum 3638 by the screw fastenings 3674 and 3676 which pass through the holes 3678 and 3680, respectively. The screws are then threaded into the threaded holes 3682 and 3684 in the focusing drum.

The focusing drum is provided with the counter bore 3686 which has a central threaded and tapped hole 3688 to receive the screw 3690 and washer 3692 for clamping the cable 3642.

The drum is provided with an elongated open slot 3694 within an enlarged opening 3696 to receive a tensioning drum 3698. This tensioning drum has an extended tenon or stud 3700 which lies within the slot 3694 and is provided with a cable groove 3702 on its external surface. The drum 3698 is spring loaded towards the right by the spring 3704 which is housed within the enlarged opening 3696 as shown more clearly in FIGURE 90. In order to permit the cable 3642 to tangent on the tensioning drum 3698, the focusing drum is provided with the flatted surfaces 3710 and 3712.

The underside of the focusing drum 3638 is provided with a plurality of detent grooves 3720, 3722, 3724, 3726 and 3727. These detent grooves or recesses cooperate with a detent ball 3728 as shown in FIGURE 91 and as described hereinafter.

Mounted on the ring gear 3634 is a curved block 3730 which is fastened to the ring gear by a pair of drive screws 3732 and 3734. In order to disassemble this post from the ring gear when necessary, the holes into which the drive screws are assembled, 3736 and 3738, pass completely through the post 3730. Thus, when it is desired to knock the drive pins back out again for disassembly this can be done. The curved block 3730 has a hole 3740 through the center thereof for mounting of the knob 3742. The knob is bifurcated into the two leg portions 3744 and 3746. The leg 3746 has a clearance hole 3748 and the leg 3744 has a threaded hole 3750. The screw fastening 3752 will thus pass through the hole 3748 in the leg 3746, through the hole 3740 in the post 3730 and will be threaded into the hole 3750 in the leg 3744.

A generally semi-circular dial and cover plate 3760 is fastened to a hub portion of the housing by the two screw fastenings 3762 and 3764. This dial and cover has inscribed on its outer periphery a series of focus positions for various distances 3766. The dial 3760 has an arcuate slot 3768 provided in the upper surface thereof through which the post 3730 can project, so that the gear 3634 will be rotated by the knob 3742 when the latter is affixed to the post 3730. The central portion 3770 of the cover 3760 may be relieved to provide for a leather covering as shown.

Threadedly mounted into the main body 3 as at 3780 is a mounting pivot shaft 3782 (see FIGURE 91). The focusing drum 3638 is mounted on this pivot shaft and held in position by a series of washers 3784 which include a spring washer, all of the washers being retained in position by the snap fastener 3786 which may be of a type adapted to tightly snap into position along any portion of the cylindrical surface of the pivot shaft 3782 to accommodate manufacturing tolerances. The detent recesses 3720, 3722, 3724, 3726 and 3727 cooperate with the detent ball 3728 as discussed previously. The detent ball is loaded by the follower spring 3630 as shown in FIGURE 91. The ball 3728 rides within a detent fitting 3800. The fitting is cylindrical with a bore 3802 and has a flanged portion 3804. The fitting 3800 is pressed into the camera housing with the flange 3804 flush with the surface of the housing opposed to the focusing drum under surface. A ball follower 3806 also slides within the bore 3802 and is urged into contact with the ball 3728 by the spring 3630. The spring force is transmitted by the two bifurcated portions 3808 and 3810 of the spring 3630 to the flange 3812 of an adjustment cap 3814. The adjustment cap 3814 has the flange 3812 and is provided with a central threaded hole 3816 to receive an adjusting screw 3820. When the adjusting screw 3820 is threaded inwardly, it will put back pressure on the furcations 3808 and 3810 of the spring 3630 to increase the pressure downwardly on the follower 3806 and hence on the ball 3728. The detent adjustment cap 3814 is provided with the counter bore 3822 to receive the lower end of the bushing 3800, and in which sufficient clearance is provided to accommodate for the adjusting motion of the detent adjustment cap 3814. The purpose of the detents and recesses is to permit click focusing when the camera is facing away from the operator so that he will know in which position his focusing knob has been placed. Thus, the recess 3720 may correspond to a distance of 30 feet, the recess 3722 may correspond to a distance of 15 feet, the recess 3724 to 9 feet, the recess 3726 to 6 feet, and the recess 3727 to 4 feet. It is then only necessary to count the number of clicks from the home position in order to determine where the focusing knob is located. The focusing detent adjustment cap 3814 also functions to form a light trap with the bushing 3800.

The spring 3630 has a dual function. It spring loads the ball detent 3728, and additionally serves to yieldingly retain the film bed against the action of the focusing shafts. The spring 3630 is fastened to a raised portion or boss 3840 on the camera housing by the screws 3842, 3842 and is provided on its opposite extremity with the two bifurcated spring legs 3844 and 3846. These legs bear within the recess 1946 on the film bed to urge the film bed into the camera and towards the lens, which will then be opposed or loaded by the adjustment of the focusing shaft screws as indicated in the drawings.

As shown in FIGURE 89B, the cable 3642 is so arranged that both ends 3850 and 3852 pass underneath the washer 3692 on the same side of the screw 3690, and between it and the center shaft 3782. The cable end 3850 will pass around the tensioning drum 3698, out around the bottom of the focusing drum 3638 towards the other focusing drum 3636 (as shown in FIGURE 89A), then around the tensioning drum and inner hub 3664 of the focusing drum 3636 and back around the tensioning drum and around the upper outer surface of the focusing drum 3636 back to the focusing drum 3638. The cable then travels again around the tensioning drum 3698 and terminates in the end 3852. The various grooves in the drums are so arranged with respect to one another that the cable will not be interfered with in its travel. As indicated in FIGURE 57, the cable will pass over a series of intermediate pulleys which are mounted on the camera housing in such manner as to cause the cable to pass around the lens drum assemblies. One of such pulleys 3860 comprises a sheave 3862 having a groove 3864 on its outer circumference. This sheave is mounted to rotate about the flanged bushing 3866. A second bushing 3868 is pressed onto the first bushing 3866 and a pair of washers 3870 and 3872 between the flanges of each bushing and the sheave 3862 serve to reduce friction between the rotating pulley and the bushings. The combined bushing 3866 and 3868 is fastened to the camera housing by the screw 3874. The flanged surfaces of the combined bushing 3868 and 3866 are so spaced as to permit sufficient clearance to enable the pulley 3862 to freely rotate no matter how tight the screw fastening 3874 is threaded into the camera housing.

The cable which ties the two focusing drums together causes both of them to operate in an interlocking manner so that either of the knobs 3742 or 3743 can be operated to actuate the focusing mechanism.

It is believed that from the above, the operation of the camera will be readily understood by those skilled in the art. Although specific embodiments of the various features of the invention have been described and illustrated, it is to be understood that various modifications and rearrangements of parts can be made while still falling within the scope of the invention.

What I claim is:

1. A stereoscopic panoramic nodal camera comprising, in combination: means for supporting a film in stationary position during exposure; a pair of lens means for projecting a pair of images upon said film having their axes parallel and horizontally spaced apart; means enabling the simultaneous rotation of said pair of lens means each about a separate axis; and means for biasing said axes so as to continually maintain said axes in non-displaceable spatial relationship to one another.

2. The camera of claim 1 including resettable drive means interconnected to impart rotational motion to said lenses and resetting means therefor, said drive means being so constructed and arranged as to alternately rotate said lens means in clockwise and thereafter in counterclockwise direction through successive picture exposures, whereby any need for lens occulting means is eliminated during operation of said resetting means.

3. A stereoscopic panoramic nodal camera comprising, in combination: means for supporting a film in stationary position during exposure; a pair of lens means for projecting a pair of images upon said film having their axes parallel and horizontally spaced apart; and means enabling the simultaneous uniform rotation of said pair of lens means, said latter means including resettable drive means and resetting means therefor, said drive means being so constructed and arranged as to alternately rotate said lens means in clockwise and thereafter in counterclockwise direction through successive picture exposures while applying a substantially constant force to said lens means to maintain a substantially constant spacial relationship therebetween, whereby need for lens occulting means is eliminated during operation of said resetting means.

4. A stereoscopic panoramic nodal camera comprising, in combination: means for supporting a film in stationary position during exposure; a pair of lens means for projecting a pair of images upon said film having their axes parallel and horizontally spaced apart; means enabling the simultaneous rotation of said pair of lens means about said axes; and filter means for each of said lens means, said filter means being located within said lens means and so mounted that the moment of inertia of the lens means remains substantially constant regardless of the positioning of the filter means into and out of the field of view of the lens means, whereby the instantaneous exposure characteristics of said camera remain unaffected by the operation of said filter means.

5. A stereoscopic panoramic nodal camera comprising, in combination: means for supporting a film in stationary position during exposure; a pair of lens means for projecting a pair of images upon said film having their axes parallel and horizontally spaced apart; means enabling the simultaneous rotation of said pair of lens means; and light trap means for preventing the transmission of light around the periphery of the revolving lens means, actuating means cooperating with portions of the light trap means to normally place same in contact with each of said lens means but to withdraw same therefrom during picture scanning movement.

6. A stereoscopic panoramic nodal camera comprising, in combination: means for supporting a film in stationary position during exposure; a pair of lens means for projecting a pair of images upon said film having their axes parallel and horizontally spaced apart; means enabling the simultaneous rotation of said pair of lens means; and means including pneumatic motion arrestor elements juxtaposed to said pair of lens means for successively contacting a portion thereof, progressively retarding and then stopping rotational movement thereof at the end of their picture scanning motion, whereby jarring of said several means which would be occasioned by such rotative movement is substantially eliminated.

7. A stereoscopic panoramic nodal camera comprising, in combination: means for supporting a film in stationary position during exposure; a pair of lens means for projecting a pair of images upon said film having their axes parallel and horizontally spaced apart; means enabling the simultaneous rotation of said pair of lens means; and pneumatic means including a movable element and means for varying the pressure on both sides of said movable element in such manner as to insure uniform motion of said element during the picture scanning cycle, said element cooperating with said means for enabling rotation for monitoring said lens means rotation to accomplish uniform drive thereof throughout the picture scanning cycle, whereby any streakiness and horizontal lack of uniformity which would be caused by variations in the rotational speed of the lens means is substantially eliminated.

8. A stereoscopic panoramic nodal camera comprising, in combination: film bed means providing a double arcuate path for supporting film in stationary position during exposure; means for projecting a pair of images upon said film; a detachable magazine including unexposed film supply and storage means, and exposed film takeup and storage means; and means for successively positioning and accurately seating film portions against said film bed means, said film positioning and seating means including a roller-pressure pad assembly and wherein a double acting spring means is arranged to apply floating spring pressure to said pad, said film positioning and seating means further being so constructed and arranged as to retain said film portion stationary in a double arcuate focal plane during exposure.

9. A stereoscopic panoramic nodal camera comprising, in combination: film bed means providing a double arcuate path for supporting film in stationary position during exposure; means for projecting a pair of images upon said film; and focusing means for bodily positioning said film bed means in a plurality of successive parallel positions, audible signalling means cooperating with said focusing means for indicating the relative different successive parallel positions of said film bed means.

10. A stereoscopic panoramic nodal camera comprising, in combination: means for supporting a film and holding it stationary in a curvilinear path during exposure; a pair of lens means for projecting a pair of images upon said film having their axes parallel and horizontally spaced apart; means enabling the simultaneous rotation of said pair of lens means each about a separate axis; means for biasing said axes so as to continually maintain said axes in non-displaceable spatial relationship to one another; said means enabling lens means rotation being so constructed and arranged as to effect rotation of said lens means on their respective second principal axes, whereby high resolution is obtained; said lens means being arranged to project said image pairs each over separate arcuate distances wherein the conjoint instantaneous portions thereof are at a constant interocular distance, said latter means including a pair of slit apertures in proximity to said film; and said lens means being so constructed and arranged as to exhibit a low and substantially constant moment of inertia during the picture scanning cycle with substantially friction-free rotation, thereby enabling the taking of both timed and instantaneous exposures without requiring an increase in slit width of said apertures.

11. A stereoscopic panoramic nodal camera comprising, in combination: means for supporting a film in stationary position during exposure; a pair of lens means for projecting a pair of images upon said film having their axes parallel and horizontally spaced apart; and means enabling the simultaneous rotation of said pair of lens means each about a separate non-displaceable axis with a minimum of friction, said means enabling lens means rotation including motive power means and a spring loaded drive band interconnecting said pair of lens means and urging them toward one another.

12. The camera of claim 11 wherein said motive power means comprises a pair of clock coil springs which are wound with relatively friction-free material sandwiched between the coils thereof and said lens means are journalled within relatively friction-free material.

13. A stereoscopic panoramic nodal camera comprising, in combination: means for supporting a film in stationary position during exposure; a pair of lens means for projecting a pair of images upon said film having their axes parallel and horizontally spaced apart; and means enabling the simultaneous rotation of said pair of lens means, said latter means including resettable drive means and resetting means therefor, said drive means being so constructed and arranged as to alternately rotate said lens means in clockwise and thereafter in counterclockwise direction through successive picture exposures, whereby need for lens occulting means is eliminated during operation of said resetting means, means for transporting and storing film, and trigger means structurally interrelated with said drive and resetting means for actuating said drive means to permit driving engagement with said lens means.

14. The camera of claim 13 including means cooperating with said trigger means for preventing operation of said trigger means prior to operation of said film transporting means.

15. The camera of claim 14 including means for disabling said means preventing operation of said trigger means.

16. The camera of claim 13 wherein said drive means comprise a pair of clock springs, each one mounted in structural interrelationship with said pair of lens means, and each being arranged to separately and alternately drive both of said lens means.

17. The camera of claim 16 wherein said pair of clock springs are arranged so as to unwind and drive said lens means in opposite directions.

18. The camera of claim 16 wherein said resetting means is arranged to wind-up said clock springs alternately so that both springs are reset at the commencement of picture scanning.

19. A stereoscopic panoramic nodal camera comprising, in combination: means for supporting a film in stationary position during exposure; a pair of lens means for projecting a pair of images upon said film having their axes parallel and horizontally spaced apart; means enabling the simultaneous rotation of said pair of lens means; filter means for each of said lens means, said filter means being located within said lens means and so arranged that the moment of inertia of the lens means remains substantially constant regardless of the positioning of the filter means into and out of the field of view of the lens means, whereby the instantaneous exposure characteristics of said camera remain unaffected by the operation of said filter means; each of said filter means being provided with a plurality of filter elements; and means for positioning said filter elements, said latter means having operating controls accessible externally on the camera.

20. The camera of claim 19 wherein said filter positioning means is so constructed and arranged as to simultaneously locate one filter element within each of said lens means in image intercepting relationship.

21. The camera of claim 20 wherein said filter positioning means comprises actuating elements within said lens means which are operatively connected to said operating controls by substantially friction-free interconnections.

22. The camera of claim 21 wherein said filter positioning means includes a selector means operatively arranged to select identical pairs of filter elements for coordinate positioning, one from each of said lens means.

23. A stereoscopic panoramic nodal camera comprising, in combination: means for supporting a film in stationary position during exposure; a pair of lens means for projecting a pair of images upon said film having their axes parallel and horizontally spaced apart; means enabling the simultaneous rotation of said pair of lens means; light trap means for preventing the transmission of light around the periphery of the revolving lens means, actuating means cooperating with portions of the light trap means to normally place same in contact with each of said lens means but to withdraw same therefrom during picture scanning movement; said actuating means including operating elements located upon said revolving lens means.

24. The camera of claim 23 wherein said operating elements are so located upon said revolving lens means as to urge said portions of the light trap means into lens means contacting position at the end of picture scanning and to release same only during picture scanning.

25. The camera of claim 24 including means biasing said portions of the light trap means normally out of contact with said lens means.

26. A stereoscopic panoramic nodal camera comprising, in combination: means for supporting a film in stationary position during exposure; a pair of lens means for projecting a pair of images upon said film having their axes parallel and horizontally spaced apart; means enabling the simultaneous rotation of said pair of lens means; light trap means for preventing the transmission of light around the periphery of the revolving lens means, actuating means cooperating with portions of the light trap means to normally place same in contact with each of said lens means but to withdraw same therefrom during picture scanning movement; and lens port covers, one for each of said lens means normally closing off light access to said lens means.

27. The camera of claim 26 including means for automatically actuating said lens port covers to open position, permitting light access to said lens means immediately prior to picture scanning.

28. The camera of claim 27 including means biasing said lens port covers towards open position permitting light access to said lens means, and releasable latch means for retaining said lens port covers in closed position.

29. The camera of claim 28 including means for adjusting said biasing means to load said lens port covers towards open position with predetermined force.

30. A stereoscopic panoramic nodal camera comprising, in combination: means for supporting a film in stationary position during exposure; means adapted for projecting a pair of images upon said film including a pair of adjustable cat's eye iris means each arranged so that its aperture becomes elongated in the vertical direction upon the operation thereof, thereby reducing the horizontal width of the circle of confusion on the film and thus providing higher resolution; said iris means each including adjustable leaves; and means for adjustably positioning said leaves including operating controls accessible externally on the camera.

31. The camera of claim 30 wherein said iris leaf positioning means is so constructed and arranged as to synchronously adjust the leaves of said pairs of iris means into identical predetermined positions.

32. The camera of claim 30 including a pair of rotatable lens means, said pair of iris means being located one within each of said lens means.

33. The camera of claim 32 wherein said adjustable positioning means comprises actuating elements within said lens means which are operatively interconnected to said operating controls by substantially friction-free interconnections.

34. The camera of claim 32 wherein said iris leaves are biased normally to close the opening therethrough.

35. The camera of claim 34 wherein said adjustable positioning means are spring biased to counteract the centrifugal effect of said lens means rotation.

36. A stereoscopic panoramic nodal camera comprising, in combination: means for supporting a film in stationary position during exposure; a pair of lens means for projecting a pair of images upon said film having their axes parallel and horizontally spaced apart; means enabling the simultaneous rotation of said pair of lens means; pneumatic means including a piston operating within a cylinder and also including means for metering fluid flow from one side of the piston within said cylinder to the other side of the piston; said means enabling lens means rotation including drive means operably interconnected with said pneumatic means; said pneumatic means being so constructed and arranged as to permit operation of said drive means at a predetermined uniform rate of speed during picture scanning, whereby any streakiness and horizontal lack of uniformity which would be caused by variations in the rotational speed of the lens means is substantially eliminated.

37. The camera of claim 36 wherein said pneumatic regulator means comprises a cylinder and double acting plunger, said regulator means being constructed so as to interchange gas from the high pressure side of the cylinder to ambient and to the low pressure side of the cylinder.

38. The camera of claim 37 including externally positionable means to regulate the rate of interchange of gas.

39. The camera of claim 36 including means enabling free interchange of gas between both ends of the cylinder and ambient at the end of each lens means rotation through a picture scan, whereby pressures are equalized throughout said cylinder and regulator means thus permitting instant recycling.

40. The camera of claim 38 wherein said regulating means includes relief valving arranged to maintain constant gas pressures within the high and low pressure sides of the pneumatic regulator means during picture scanning.

41. The camera of claim 38 including means permitting linear calibration indexing of said rate of gas interchange.

42. The camera of claim 40 including means for substantially eliminating gas leakage within said pneumatic regulator means during picture scanning.

43. A stereoscopic panoramic nodal camera comprising, in combination: a main housing including film bed means providing a double arcuate path for supporting film in stationary position during exposure; means for projecting a pair of images upon said film; a detachable magazine including unexposed film supply and storage means, and exposed film take-up and storage means; means for accurately assembling, positioning and securing said magazine to said main housing; means for successively positioning and accurately seating film portions against said film bed means, said film positioning and seating means actuating means cooperating with portions of the light trap means to normally place same in contact with each of said lens means but to withdraw same being so constructed and arranged as to retain said film portion stationary in a double arcuate focal plane during exposure; and means enabling the rapid transportation of film from said unexposed film supply and storage means to said exposed film take-up means.

44. The camera of claim 43 including means permitting only a predetermined amount of film to be transported prior to each picture scan.

45. The camera of claim 43 including means enabling the rapid rewinding of film from said exposed film storage means to said film supply means.

46. A stereoscopic panoramic nodal camera comprising, in combination: film bed means providing a double arcuate path for supporting film in stationary position during exposure; means for projecting a pair of images upon said film; focusing means for bodily positioning said film bed means in a plurality of successive parallel positions, audible signalling means cooperating with said focusing means for indicating the relative different successive parallel positions of said film bed means; said focusing means comprising four synchronized focusing elements arranged two on each side of said image projecting means and in contact with said film bed to effectuate the bodily positioning thereof.

47. The camera of claim 46 including means for synchronously operating said four focusing elements.

48. The camera of claim 47 wherein said latter means includes a plurality of pulleys and a radio dial cable interlinking said pulleys and focusing elements through a multiple contoured path.

49. The camera of claim 48 including means for maintaining said cable under tension.

50. A stereoscopic panoramic nodal camera comprising, in combination: means for supporting a film in stationary position during exposure; a pair of lens means for projecting a pair of images upon said film having their axes parallel and horizontally spaced apart; and means enabling the simultaneous rotation of said pair of lens means each about a separate non-displaceable axis with a minimum of friction, said means enabling lens means rotation including a shaft for each lens means, journals of relatively friction-free material for the ends of said shafts, said means enabling lens means rotation further including motive power means and a spring loaded drive band interconnecting said pair of lens means and urging them toward one another, thereby causing said shafts to maintain constant contact against a portion of said journals.

51. A stereoscopic panoramic nodal camera comprising, in combination: means for supporting a film in stationary position during exposure; a pair of lens means for projecting a pair of images upon said film having their axes parallel and horizontally spaced apart; means enabling the simultaneous rotation of said pair of lens about their axes; filter means for each of said lens means, said filter means being located within said lens means and so arranged that the moment of inertia of the lens means remains substantially constant regardless of the positioning of the filter means into and out of the field of view of the lens means, whereby the instantaneous exposure characteristics of said camera remain unaffected by the operation of said filter means; each of said filter means being provided with a plurality of elements; track means parallel to said axes within which said filter elements slide; and means for positioning said filter elements within said tracks, said latter means having operating controls accessible externally on the camera.

References Cited by the Examiner

UNITED STATES PATENTS

| | | | |
|---|---|---|---|
| 586,097 | 7/1897 | Jeffrey | 95—15 |
| 683,573 | 10/1901 | Pasquarelli | 95—15 |
| 728,584 | 5/1903 | Dickson | 95—15 |
| 766,874 | 8/1904 | Cheesman | 95—16 |
| 893,819 | 7/1908 | Stewart | 95—15 |
| 1,136,761 | 4/1915 | Becker | 95—15 |
| 1,302,359 | 4/1919 | Garbutt | 95—64 |
| 1,572,246 | 2/1926 | Riddell | 95—16 |
| 1,799,879 | 4/1931 | Wittel | 95—64 |
| 2,148,011 | 2/1939 | Burke | 95—16 |
| 2,298,586 | 10/1942 | Phillips | 95—18 X |
| 2,386,575 | 10/1945 | Simmon | 95—31 |

(Other references on following page)

UNITED STATES PATENTS

| | | | |
|---|---|---|---|
| 2,573,543 | 10/1951 | Childs | 95—18 X |
| 2,725,804 | 12/1955 | Herzfeld | 95—18 |
| 2,729,153 | 1/1956 | Heidecke | 95—18 |
| 2,764,073 | 9/1956 | Liu | 95—16 |
| 2,778,289 | 1/1957 | Stellpflug | 95—18 |
| 2,893,300 | 7/1959 | Fajardo | 95—16 |
| 2,906,183 | 9/1959 | Rochwite | 95—18 |
| 2,926,561 | 3/1960 | Keeble | 95—16 X |
| 2,941,458 | 6/1960 | Crockwell | 95—15 |
| 2,943,548 | 7/1960 | Thalhammer | 95—16 |
| 3,078,758 | 2/1963 | Caldwell | 95—16 X |

FOREIGN PATENTS

| | | |
|---|---|---|
| 617,510 | 4/1961 | Canada. |

JOHN M. HORAN, *Primary Examiner.*

NORTON ANSHER, *Examiner.*